(12) United States Patent
Vincelette et al.

(10) Patent No.: US 10,837,274 B2
(45) Date of Patent: Nov. 17, 2020

(54) PRESSURE SENSOR ARRANGEMENT USING AN OPTICAL FIBER AND METHODOLOGIES FOR PERFORMING AN ANALYSIS OF A SUBTERRANEAN FORMATION

(71) Applicant: WEATHERFORD CANADA LTD., Edmonton (CA)

(72) Inventors: Andre R. Vincelette, Quebec (CA); Jason Scott Kiddy, Gambrills, MD (US); John Niemczuk, Kensington, MD (US); Christopher S. Baldwin, Laurel, MD (US); Paul Lefebvre, Laval (CA)

(73) Assignee: WEATHERFORD CANADA LTD., Edmonton (CA)

( * ) Notice: Subject to any disclaimer, the term of this patent is extended or adjusted under 35 U.S.C. 154(b) by 0 days.

(21) Appl. No.: 16/371,350

(22) Filed: Apr. 1, 2019

(65) Prior Publication Data
US 2019/0226321 A1 Jul. 25, 2019

Related U.S. Application Data

(63) Continuation of application No. 15/675,505, filed on Aug. 11, 2017, now Pat. No. 10,246,989, which is a
(Continued)

(51) Int. Cl.
*E21B 47/06* (2012.01)
*G01L 1/24* (2006.01)
(Continued)

(52) U.S. Cl.
CPC .......... *E21B 47/06* (2013.01); *E21B 43/2406* (2013.01); *E21B 43/2408* (2013.01);
(Continued)

(58) Field of Classification Search
None
See application file for complete search history.

(56) References Cited

U.S. PATENT DOCUMENTS 3,627,065 A 12/1971 Murphy
4,344,485 A 8/1982 Butler
(Continued)

FOREIGN PATENT DOCUMENTS

| CA | 2570674 A1 | 2/2006 |
|---|---|---|
| CA | 2675436 A1 | 7/2008 |
| WO | 91/13329 A1 | 9/1991 |

*Primary Examiner* — Michael Stahl
(74) *Attorney, Agent, or Firm* — Patterson + Sheridan, LLP

(57) ABSTRACT

A sensor arrangement using an optical fiber and methodologies for performing an analysis of a subterranean formation, such as a subterranean formation containing a hydrocarbon based fluid. The sensor arrangement may be used to measure one or more physical parameters, such as temperature and/or pressure, at a multiplicity of locations in the subterranean reservoir. The sensor arrangement may comprise a sensor array comprising an elongated outer casing for insertion in the subterranean formation and into a fluid in the subterranean formation. The sensor array may comprise an optical fiber defining an optical path that links one or more temperature sensors and one or more pressure sensors and transports measurement data generated by the temperature and pressure sensors. A data processing system may be connected to the sensor array to receive measurements from the sensor array and to compute one or more values of a property of an extraction installation operating on the subterranean formation.

20 Claims, 37 Drawing Sheets

Related U.S. Application Data continuation of application No. 15/147,704, filed on May 5, 2016, now abandoned, which is a continuation of application No. 13/129,481, filed as application No. PCT/US2010/001200 on Apr. 22, 2010, now Pat. No. 9,347,312.

(60) Provisional application No. 61/202,945, filed on Apr. 22, 2009.

(51) Int. Cl.
*E21B 43/24* (2006.01)
*E21B 47/135* (2012.01)
*G02B 6/50* (2006.01)

(52) U.S. Cl.
CPC ............ *E21B 47/135* (2020.05); *G01L 1/242* (2013.01); *G01L 1/243* (2013.01); *G01L 1/247* (2013.01); *G02B 6/504* (2013.01)

(56) References Cited

U.S. PATENT DOCUMENTS

| | | | |
|---|---|---|---|
| 4,359,899 A | 11/1982 | Claycomb | |
| 4,459,477 A | 7/1984 | Asawa et al. | |
| 4,530,078 A | 7/1985 | Lagakos et al. | |
| 4,553,428 A | 11/1985 | Upchurch | |
| 4,741,208 A | 5/1988 | Vandevier | |
| 4,761,073 A | 8/1988 | Meltz et al. | |
| 4,832,121 A | 5/1989 | Anderson | |
| 5,010,764 A | 4/1991 | Taylor | |
| 5,046,559 A | 9/1991 | Glandt | |
| 5,148,869 A | 9/1992 | Sanchez | |
| 5,215,146 A | 6/1993 | Sanchez | |
| 5,273,111 A | 12/1993 | Brannan et al. | |
| 5,311,614 A | 5/1994 | Caron et al. | |
| 5,350,014 A | 9/1994 | McKay | |
| 5,350,018 A | 9/1994 | Sorem et al. | |
| 5,413,175 A | 5/1995 | Edmunds | |
| 5,417,283 A | 5/1995 | Ejiogu et al. | |
| 5,589,937 A * | 12/1996 | Brininstool | G01L 1/243 250/227.14 |
| 5,626,193 A | 5/1997 | Nzekwu et al. | |
| 5,684,912 A | 11/1997 | Slaney et al. | |
| 5,771,973 A | 6/1998 | Jensen et al. | |
| 5,803,171 A | 9/1998 | McCaffery et al. | |
| 5,826,654 A | 10/1998 | Adnan et al. | |
| 5,844,667 A | 12/1998 | Maron | |
| 5,860,475 A | 1/1999 | Ejiogu et al. | |
| 5,877,426 A | 3/1999 | Hay et al. | |
| 5,892,860 A | 4/1999 | Maron et al. | |
| 5,899,274 A | 5/1999 | Frauenfeld et al. | |
| 5,931,230 A | 8/1999 | Lesage et al. | |
| 6,016,072 A | 1/2000 | Ternullo, Jr. et al. | |
| 6,016,702 A | 1/2000 | Maron | |
| 6,050,335 A | 4/2000 | Parsons | |
| 6,116,085 A | 9/2000 | Moffatt et al. | |
| 6,158,510 A | 12/2000 | Bacon et al. | |
| 6,160,762 A | 12/2000 | Luscombe et al. | |
| 6,186,232 B1 | 2/2001 | Isaacs et al. | |
| 6,218,661 B1 | 4/2001 | Schroeder et al. | |
| 6,233,374 B1 | 5/2001 | Ogle et al. | |
| 6,233,746 B1 | 5/2001 | Skinner | |
| 6,246,048 B1 | 6/2001 | Ramos et al. | |
| 6,257,334 B1 | 7/2001 | Cyr et al. | |
| 6,269,198 B1 | 7/2001 | Hodgson et al. | |
| 6,281,489 B1 | 8/2001 | Tubel et al. | |
| 6,304,686 B1 | 10/2001 | Yamate et al. | |
| 6,422,084 B1 | 7/2002 | Fernald et al. | |
| 6,450,037 B1 | 9/2002 | McGuinn et al. | |
| 6,490,931 B1 | 12/2002 | Fernald et al. | |
| 6,519,388 B1 | 2/2003 | Fernald et al. | |
| 6,563,970 B1 | 5/2003 | Bohnert et al. | |
| 6,597,821 B1 | 7/2003 | Bohnert et al. | |
| 6,630,658 B1 | 10/2003 | Bohnert et al. | |
| 6,662,872 B2 | 12/2003 | Gutek et al. | |
| 6,740,866 B1 | 5/2004 | Bohnert et al. | |
| 6,776,045 B2 | 8/2004 | Fernald et al. | |
| 6,820,489 B2 | 11/2004 | Fernald et al. | |
| 6,898,339 B2 | 5/2005 | Shah et al. | |
| 6,901,101 B2 | 5/2005 | Frick | |
| 6,955,085 B2 | 10/2005 | Jones et al. | |
| 6,957,576 B2 | 10/2005 | Skinner et al. | |
| 7,032,675 B2 | 4/2006 | Steele et al. | |
| 7,035,523 B2 | 4/2006 | Yong | |
| 7,047,816 B2 | 5/2006 | Jones et al. | |
| 7,090,014 B2 | 8/2006 | Good et al. | |
| 7,197,934 B2 | 4/2007 | Wittrisch et al. | |
| 8,676,008 B2 | 3/2014 | Grosso et al. | |
| 9,347,312 B2 | 5/2016 | Vincelette et al. | |
| 2004/0067002 A1 | 4/2004 | Berg et al. | |
| 2004/0182166 A1 | 9/2004 | Jones et al. | |
| 2005/0211434 A1 | 9/2005 | Gates et al. | |
| 2006/0011820 A1 | 1/2006 | Chow-Shing et al. | |
| 2006/0204164 A1 | 9/2006 | Ivtsenkov | |
| 2007/0018299 A1 | 1/2007 | Koo et al. | |
| 2007/0280584 A1 | 12/2007 | Childers | |
| 2007/0295499 A1 | 12/2007 | Arthur et al. | |
| 2008/0017312 A1 | 1/2008 | Kim | |

* cited by examiner

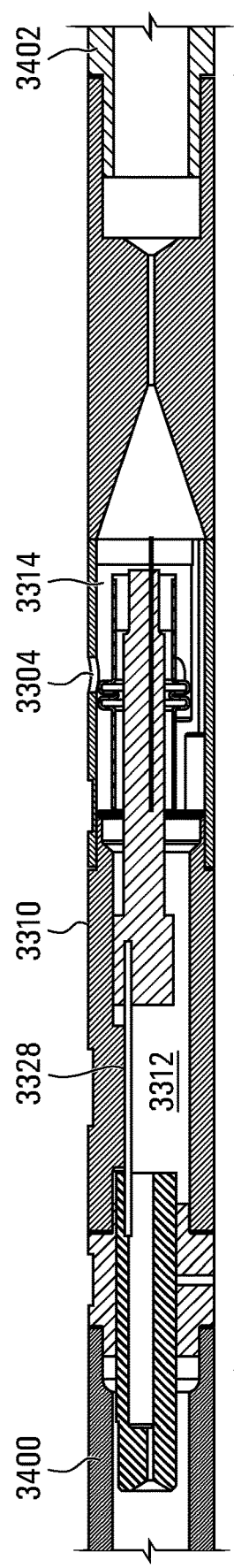
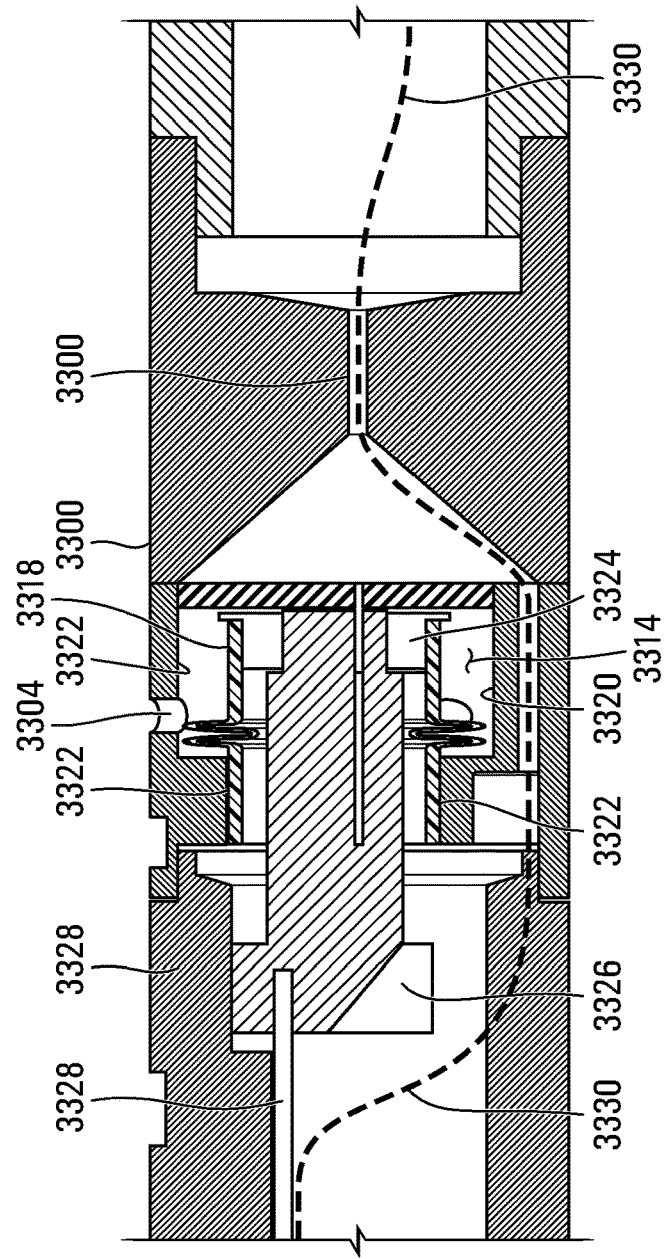
FIG. 34
FIG. 35

PRESSURE SENSOR ARRANGEMENT USING AN OPTICAL FIBER AND METHODOLOGIES FOR PERFORMING AN ANALYSIS OF A SUBTERRANEAN FORMATION

CROSS-REFERENCE TO RELATED APPLICATIONS

This application is a continuation of U.S. patent application Ser. No. 15/675,505, filed on Aug. 11, 2017, which is a continuation of U.S. patent application Ser. No. 15/147,704, filed on May 5, 2016, now abandoned, which is a continuation of U.S. patent application Ser. No. 13/129,481, filed on May 16, 2011 and granted as U.S. Pat. No. 9,347,312, which is a National Phase Entry of PCT/US2010/001200, filed on Apr. 22, 2010, which claims the benefit of U.S. Provisional Patent Application Ser. No. 61/202,945, filed on Apr. 22, 2009, all of which are herein incorporated by reference in their entireties.

FIELD OF THE INVENTION

The invention relates to techniques and devices for deriving operational parameters and/or geological parameters of a subterranean formation such as an installation for extracting a hydrocarbon based fluid from a subterranean reservoir. More specifically, the techniques are implemented by measuring temperature and/or pressure at a multiplicity of locations in a well located in the subterranean reservoir. The well can be an injection well, used to introduce in the reservoir a fluid to mobilize the hydrocarbon based fluid, a production well for extracting the hydrocarbon based fluid to the surface or an observation well. In a specific and non limiting example of application of the invention, the hydrocarbon based fluid is heavy oil extracted by a Steam Assisted Gravity Drainage (SAGD) process. Other areas of application of the invention include geological and mining survey, water tables mapping, water tables control, geothermal mapping, geothermic energy control, oil and gas characterization and extraction process control. Yet other areas of applications include industrial processes especially for monitoring and control in harsh conditions. The invention can also be used for acoustic information gathering such as an hydrophone, a geophone, or a microphone for surveillance or acoustic survey of the material properties between the acoustic emitter and the sensor array, for example, structural monitoring.

BACKGROUND OF THE INVENTION

Tar sands are geological formations located in subterranean veins capped by impermeable rock, leading to a natural compatibility to form a subterranean pressurized steam chamber to heat up the tar sand veins and mobilize the heavy oil. In this specification "heavy oil" refers to bitumen that requires energy to separate from the geological phase and flow to the surface in contrast to light oil that is free to flow and naturally pressurized and so only requires a direct path to the surface to be extracted.

The U.S. Pat. No. 4,334,485 issued to Roger M. Butler discusses a method to continuously steam tar sand veins via a horizontal injector well running parallel over a horizontal producer well near the bottom of the vein that pump up to the surface the heavy oil flowing into it by gravity. This is the process now known as SAGD in the industry. Butler proposes an initial phase where steam is injected in both wells to heat up the zone in between and mobilize the heavy oil in it, called the conditioning phase which insures proper flow into the producer. Once, this "pool" of liquefied heavy oil covers the producer well, the injection of steam into it is stopped and the heavy oil that flows into it is pumped to the surface naturally or artificially by a using pump or gas lift. Steam is continuously injected by the injector well over the producer well creating a steam chamber that grows up in the tar sand vein, mobilizing trapped heavy oil that then flows down to a producer pool by gravity.

The extraction of heavy oil from tar sands is challenging both from a technological and a commercial perspective. Many operational parameters need to be properly set to optimize the rate of oil recovery. Examples of operating conditions include: the rate at which heavy oil is recovered and the temperature and amount of steam injected in the steam chamber, among many others. However, the gathering of information about the conditions in the subterranean reservoir is difficult. In practice, an SAGD installation provides the operator with a few data points only. While the data points are useful, in most cases they are not sufficient to make clear choices about the operational conditions to be implemented.

Accordingly there is a need in the industry to provide novel techniques and devices to provide a better understanding of the conditions occurring in a subterranean reservoir from which a hydrocarbon based fluid is extracted.

SUMMARY OF THE INVENTION

In a first broad aspect, the invention provides a sensor array for measuring one or more physical parameters in a subterranean formation containing a fluid. The sensor array has an elongated outer casing for insertion in the subterranean formation and into the fluid. A first sensor is placed inside the casing for performing a measurement of the fluid at a first location in the subterranean formation. A second sensor is located inside the casing, the second sensor being spaced apart from the first sensor to perform a measurement of the fluid at a second location that is remote from the first location. An optical path, such as an optical fiber links the first and the second sensors. The optical path transporting measurements generated by the first sensor and by the second sensor conveying.

In a second broad aspect, the invention provides a sensor array for measuring one or more physical parameters in a subterranean formation containing a fluid. The sensor array includes an elongated outer casing for insertion in the subterranean formation and into the fluid. A temperature sensor is located inside the outer casing for performing a measurement of the fluid at a first location in the subterranean formation. A pressure sensor is placed an extremity of the elongated outer casing, the pressure sensor including a deformable component which undergoes deformation in response to a pressure variation established across the deformable component. The pressure sensor also includes an optical fiber connected to the deformable component such that a deformation of the deformable component is communicated to the optical fiber to alter one or more optical characteristics thereof, the optical fiber defining an optical path linking the temperature and the pressure sensors, the optical path transporting measurements generated by the temperature and the pressure sensors.

In a third broad aspect the invention also provides a sensor array for measuring pressure at a multiplicity of locations in a subterranean formation containing a fluid. The sensor array including an elongated outer casing for insertion in the subterranean formation and into the fluid. A plurality of pressure sensors are mounted at spaced apart locations on the array to provide pressure measurements a different locations within the subterranean formation. Each pressure sensor including a sealed area within the elongated outer casing maintained at a reference pressure and a deformable component within the elongated outer casing exposed to a pressure differential between the reference pressure and pressure of the fluid, the deformable component undergoing deformation in response to variations of the pressure differential. An optical pathway is coupled to the deformable component, whereby deformations of the deformable component alter one or more optical characteristics of the optical pathway.

In a fourth broad aspect, the invention provides a device for measuring pressure in a subterranean formation containing a fluid, the device including an elongated outer casing for insertion in the subterranean formation and into the fluid and a deformable component inside the casing, the deformable component undergoing deformation in response to a pressure differential established across the deformable component. An optical path is also provided in the casing. A mechanical link is provided between the optical path and the deformable component, the mechanical link altering one or more parameters of the optical path in response to deformation of the deformable component.

In a fifth broad aspect, the invention provides a system for computing a property of an extraction installation having a subterranean formation containing a fluid and a well. The system has a sensor array in the well, the sensor array including a plurality of spaced apart temperature and/or pressure sensors for measuring temperature and/or pressure at a plurality of locations in the subterranean formation. The system also includes a data processing system connected to the sensor array to receive measurements from the sensor array, the data processing system including a CPU, a machine readable storage in data communication with the CPU and a user interface, the machine readable storage being encoded with a program instructions for execution by the CPU to compute one or more values of a property of the extraction installation. The computation uses as a factor the temperature and/or pressure measurements from the sensor array and a balance selected in the group consisting of mass, energy and momentum of the fluid in the subterranean formation.

In a sixth broad aspect the invention includes a method for computing a property of an extraction installation having a subterranean formation containing a fluid and a well. The method includes placing a sensor array in the well, the sensor array including a plurality of spaced apart temperature and/or pressure sensors for measuring temperature and/or pressure at a plurality of locations in the subterranean formation. The method also includes providing a data processing system connected to the sensor array to receive measurements from the sensor array, the data processing system including a CPU, a machine readable storage in data communication with the CPU and a user interface, the machine readable storage being encoded with a program instructions for execution by the CPU to compute one or more values of a property of the extraction installation. The computation uses as a factor temperature and/or pressure measurements from the sensor array and balance selected in the group consisting of mass, energy and momentum of the fluid in the subterranean format.

BRIEF DESCRIPTION OF THE DRAWINGS

FIGS. 13b, 13c and 13d are variants of the motion modifier structure shown in FIG. 13a.

FIG. 14b is a variant of the of the flow meter shown in FIG. 14a.

FIG. 18a is a front elevational view of a sensor array including a pressure sensor according to another example of implementation of the invention.

FIG. 18b is a cross-sectional view taken along lines A-A in FIG. 18a.

FIG. 34 is a longitudinal cross-sectional view of a variant of the pressure sensor shown in FIG. 33.

FIG. 35 is an enlarged view of the some components of the pressure sensor shown in FIG. 34.

DETAILED DESCRIPTION OF AN EXAMPLE OF IMPLEMENTATION

Generally speaking, the invention can be used in geological and mining surveys, water tables mapping, water tables control, geothermal mapping, geothermic energy control, oil and gas characterization and extraction process control.

A specific example of implementation of the invention will now be described in connection with FIGS. 1 and 2 that illustrate a typical SAGD heavy oil extraction process. However, it is to be expressly noted that the invention is not limited to this type of heavy oil extraction and can be used in many other different extraction processes. Examples of other processes include Cyclic Steam Stimulation (CSS), Toe to Heel Air Injection (THAI) and Vapor Extraction Process (VAPEX), among others. Also note that these processes are not mutually exclusive and can be used in combination with one another to extract heavy oil.

Figure 1:
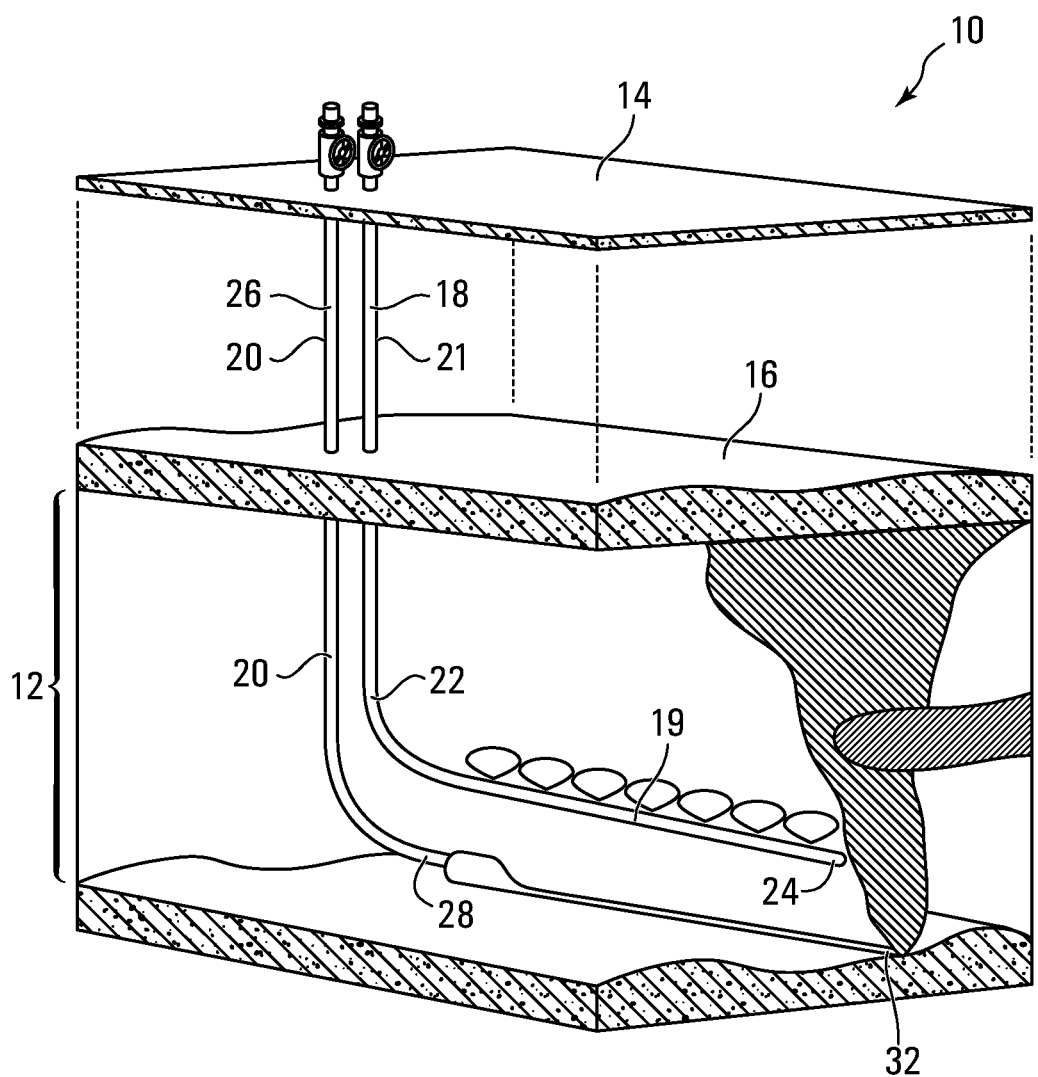
FIG. 1 is a simplified perspective view of a subterranean SAGD installation.

In addition, while the example will be made in connection with the extraction of heavy oil, the invention can also find applications in the context of light oil extraction and extraction of natural gas FIG. 1 shows a typical SAGD installation 10. A tar sand vein 12 runs underground. Typically, a tar sand vein is located at depths ranging from 200 feet to 1500 feet below the surface 14. An impermeable cap rock 16 or other overburden exists immediately above the tar sand vein.

To extract heavy oil, the SAGD installation typically includes two main wells, namely an injection well and a production well. The injection well 18 is vertically drilled through the cap rock 16 and once it reaches the tar sands vein 12, is oriented horizontally to run within the tar sand vein 12. The bend 22 between the horizontal section 19 and the vertical section 21 is referred to as "heel" while the extremity 24 of the horizontal section 19 is called the "toe". The horizontal section 19 can extend along considerable lengths to span as much of the tar sand vein 12 as possible. For example, the horizontal section 19 can be several hundredths of feet long and can even reach up to 3000 feet and even more.

The diameter of the horizontal section 19 of the injection well 18 may vary according to the application, but typically it is of 8 to 16 inches. To prevent the horizontal section 19 from collapsing, it has an outer casing or liner (not shown). The outer casing is a tube made of any suitable material, such as steel that is perforated with slots or other type of apertures. The slots are provided to allow an exchange of fluid between the interior of the horizontal section 19 and the surrounding tar sand vein 12.

The production well 20 is configured in a similar way to the injection well 18. More specifically, the production well has a vertical section 26, a horizontal section 28, a heel transition 30 and a toe 32. The horizontal section 28 is drilled below the horizontal section 19 such that both horizontal sections 19, 28 run generally parallel to one another within the tar sand vein 12. In a specific example, the horizontal sections 19, 28 are spaced by a distance of about 15 feet. Also, the horizontal section 28 is provided with an internal permeable liner that can be made in a similar way to the liner used for the horizontal section 19.

Many variations of this basic SAGD configuration are possible. For instance, there may be multiple horizontal sections branching out from each vertical section of the injector and the producer wells 18, 20 in instances where it is desired to expand the wells network to reach a larger portion of the tar sand vein 12. Also, the relationship between horizontal sections 19, 28 can also be changed. More specifically, the horizontal section 19 can be put at about the same level as the horizontal section 28 or they can be inverted, for instance the horizontal section 19 of the injection well can be put below the horizontal section 28 of the production well.

Figure 2:
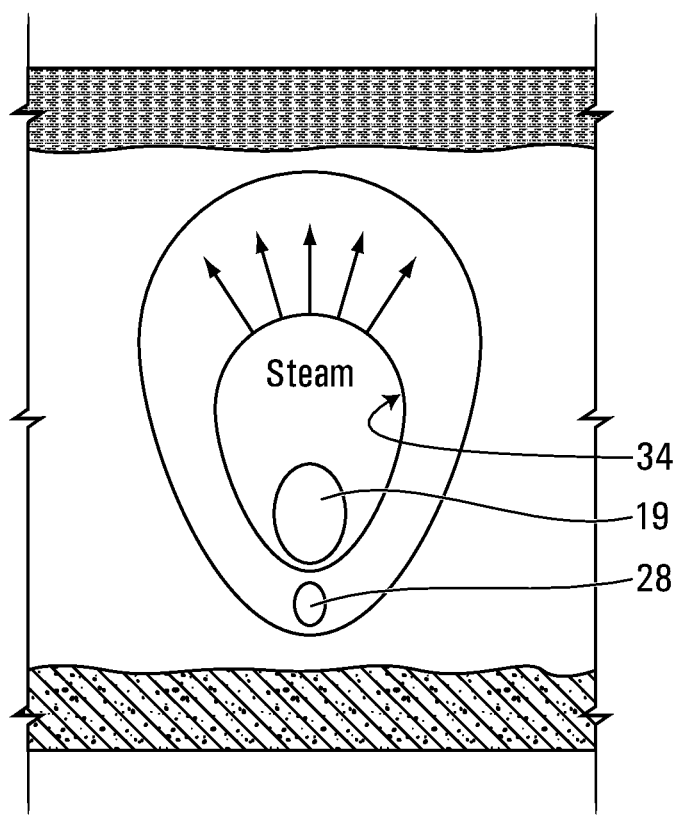
FIG. 2 is a cross-sectional view of the SAGD illustration of FIG. 1.

FIG. 2 is a cross-sectional view of the SAGD installation shown in FIG. 1. This illustration better shows the relationship between the horizontal sections 19 and 28 and also better illustrates the operation of the SAGD installation. To mobilize the heavy oil trapped in the tar sands, steam at a temperature in the range of 200 degrees Celsius to 350 degrees Celsius is injected in the injection well. As the steam travels down the well, it enters the horizontal section 19 where it is distributed to the surrounding tar sand vein through the apertures in the liner. The injection is maintained for a sufficient period of time to heat the tar sand medium and mobilize the heavy oil, and steaming is maintained continuously during the extraction phase. The heavy oil, in liquid form will flow by gravity down and pool around the horizontal section 28 of the production well 20 and enters the production well through the apertured liner. Since the SAGD installation can be considered essentially as a closed chamber, i.e. the steam pumped in the subterranean structure cannot readily escape owing to the cap rock, the steam has the effect of pressurizing the reservoir and expelling the liquefied heavy oil to the surface via the production well 20. Mechanical pumps or gas lift can also be used to help out and increase expulsion rate.

As the heavy oil trapped in the tar sand vein 12 is mobilized and collected at the surface 14, a void volume around the horizontal sections 19 and 28 is generated and progressively expands as the oil is extracted. The void volume is identified by 34 in FIG. 2. The void volume 34 is usually called "steam chamber". By "void" is meant that a substantial portion of the heavy oil has been removed but the other constituents of the tar sand vein remain in place. The resulting structure is a porous network made up of sand particles with interstices between them that allows steam to penetrate through it.

In FIG. 2 the arrows illustrate the growth of steam chamber as oil is extracted from the sand medium.

As steam injected in the steam chamber penetrates the porous geological network, it eventually cools and coverts to a liquid phase. The liquid is attracted by capillary pressure and retained in the porous network. As such, at least some of the void volume generated as a result of the mobilization and extraction of the heavy oil is filled partially with water. The amount of water thus absorbed by the tar sand vein depends on a number of factors, one of them being the porosity of the tar sand vein 12. The porosity can be characterized by a number of factors, considered individually or in combination. One of those factors is the void volume per unit volume of tar sand vein material. This essentially is a measure of the capacity of the oil depleted tar sand vein material to take up water. The void volume will normally be equivalent to the amount of heavy oil removed, assuming of course that the tar sand vein was fully saturated with heavy oil before the extraction was started. The other porosity factor that can be considered is the pore size of the oil depleted tar sand material. A network of small pore sizes will have the ability to retain better the water that has penetrated through it since it creates a more intense capillary force on the water by comparison to a network made of larger pores. On the other hand, a small pore size network will be less permeable (more time will be required for water to ingress the network) than a larger pore size network.

Accordingly, the SAGD process can be viewed as an exchange between heavy oil and water. The water replaces in the tar sand vein 12 the heavy oil that was removed therefrom. This process can be relatively efficient in practice as it allows extracting up to 60% of the heavy oil content of the tar sand vein 12, but also as low as 10% of the heavy oil content if the process is badly adjusted to the geology of the reservoir.

Figure 3:
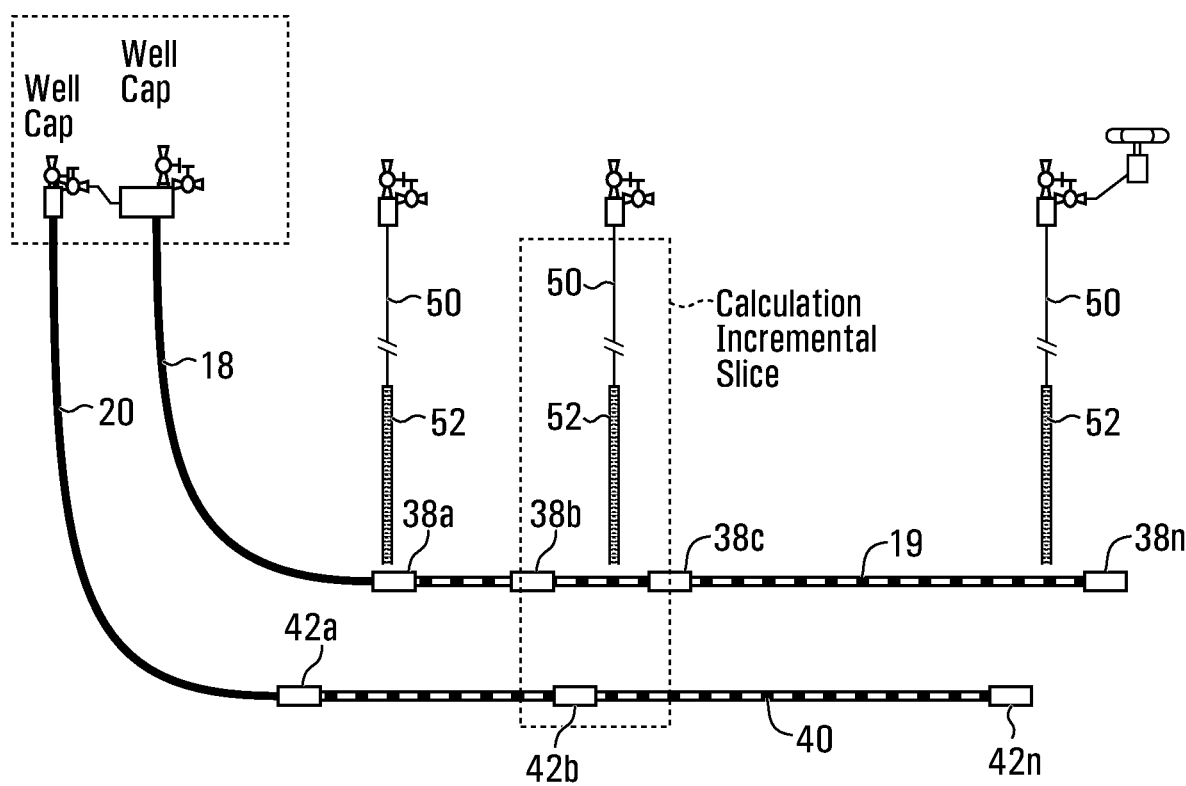
FIG. 3 is a schematical view of the various wells present in a SAGD installation showing the location of various temperature and pressure probes in the wells.

FIG. 3 is a diagram illustrating the placement of sensors of a measurement system according to a non-limiting example of the invention, in the wells of the SAGD installation shown in FIGS. 1 and 2. The injector well 18 is provided with a sensor array 36 that measures temperature, pressure and advantageously both. The sensor array 36 is implemented on an optical fiber that is run within the injector well 18. More specifically the optical fiber is placed in a protective outer casing and slid through the well cap in the well up to well toe 24. The portion of the optical fiber that has sensing capability is the portion located in the horizontal section 19. The sensors in the optical fiber are implemented by Fiber Bragg Gratings (FBG). An FBG responds to a physical force acting on the optical fiber and the magnitude of that force can be determined by examining the optical interrogation signal propagating through the optical fiber. When the optical fiber is subjected to a temperature variation, it expands or contracts and this produces a strain on the FBG and its effective refractive index changes proportionally. The strain, and proportional effective refractive index modification, changes the response of the FBG to the interrogation signal and thus allows determining the force exerted on the FBG and consequently the temperature.

The pressure sensor works on a somewhat similar principle. Pressure is sensed also by detecting strain or bend exerted on the optical fiber that changes the response of the FBG. However, in the case of pressure, a mechanism is used to convert ambient pressure into strain acting on the optical fiber or to bend the optical fiber. Various types of mechanisms can be used without departing from the spirit of the invention. One example is to provide a bellows which is a structure that moves with a variation of pressure. Typically, a bellows is a closed chamber in which or around which is created a predetermined (or reference) pressure. When the outside pressure varies, the chamber expands or contracts. The optical fiber is mechanically connected to the bellows such that expansion or contraction of it will create strain on the FBG in the optical fiber. A detailed example of a pressure sensor will be discussed later.

The response of an FBG connected to a bellows is a compound response. One component is contribution of pressure and the other temperature. However since the temperature is known via the response of the temperature reporting FBG, the pressure contribution can be isolated to determine the ambient pressure.

In the example shown in the FIG. 3, a pressure sensor is collocated with a temperature sensor. This arrangement provides a sensing pair in closed proximity to one another such that the pressure and temperature for a certain location can be determined with relative precision.

The sensor array 36 is well suited for harsh environments where the temperature and pressure can be high, such as geological and mining survey, water tables mapping, water tables control, geothermal mapping, geothermic energy control, oil and gas characterization and extraction process control. The sensor array 36 is compatible with almost all oil and gas well types such as SAGD processes using overheated steam up to 350 degrees C. and its variant Cyclic Steam Stimulation process, Vapour Extraction Process (Vapex) in which a solvent is added to the steam, hydraulic fracturing process for gas, oil or geothermal wells and water and solvent flooding processes, among others.

The sensor array 36 includes a number of sensing pairs placed at known positions in the horizontal section 19. In a specific example of implementation, a sensing pair is formed on the optical fiber at a certain interval, such as 6 inches, 1 feet, 2 feet, 5 feet, 10 feet, 15 feet, 20 feet, 30 feet, 50 feet, or more. This allows reading the pressure and the temperature at each interval in the horizontal section 19. As it will be described below, the response of every sensing pair can be distinguished from other sensing pairs. It this fashion, each sensing pair is unique and can provide a unique pressure and temperature reading.

During the installation process the sensor array is inserted in the well until the sensor array reaches the toe 24. This can be done by feeding in the well a length of optical fiber that corresponds to the length of the injector well 18 that is generally known. At this point, one can assume that the sensing portion of the optical fiber lies fully within the horizontal section 19 and that the sensing pair at the extreme end of the optical fiber is close to the toe 24. Since the distance between the sensing pairs is known, the position of each sensing pair, hence sensing location can be established relative to the toe 24 or any other reference point on the injector well 19.

In FIG. 3 the sensing pairs in the horizontal section 19 are designated by the reference numerals 38a, 38b, 38c . . . 38n. The sensing pairs and the optical fiber segments linking the sensing pairs are placed in a protective outer casing, such as for example a tubing section made of Incoloy or any other suitable material. It is advantageous to use a sensor array 36 that has the smallest possible cross-sectional shape such as to interfere as little as possible with the flow of steam in the horizontal section 19. The protective outer casing has a circular cross-sectional shape or may have another cross-sectional shape, such as an elliptic shape as it will be discussed later.

Figure 12A:
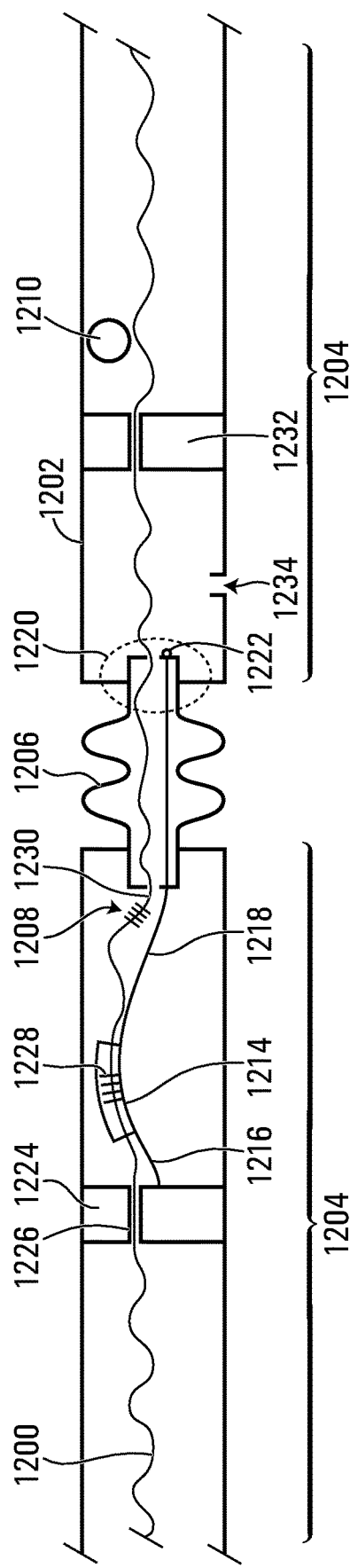
FIG. 12a is a longitudinal cross-sectional view of a non-limiting example of implementation of a sensor array.

FIG. 12a illustrates in cross-section the sensor array 36. As indicated earlier, the sensor array 36 includes an optical fiber 1200 placed in a protective outer casing 1202. The protective outer casing 1202 is in the form of a tube, but other cross-sectional shapes are possible without departing from the spirit of the invention. The outer casing 1202, in a specific example of implementation, has a diameter less than 1 inch, preferably less than 0.750 inches, more preferably less than 0.625 inches, even more preferably less than 0.5 inches and for some applications even less than 0.25 inches. A sensor array 36 having a small diameter is desirable since this allows installing the sensor array 36 in any one of the wells 18, 20. Specifically, for installations in the production well 20, a small diameter sensor array 36 does not reduce significantly the flow of oil, hence it does not impede the rate of production.

The outer casing 1202 includes a plurality of rigid sections 1204 which are separated by bellows 1206. In other words two adjacent sections 1204 are connected to one another by a bellows 1206. The bellows are a component of a pressure sensor. Each bellows is associated with a distinct pressure sensor 1208.

More generally, each pressure sensor 1208 includes a deformable component that deforms in response to a pressure differential. In the example of implementation shown in FIG. 12*a*, the bellows 1206 constitutes the deformable component. When the bellows 1202 is subjected to a pressure differential acting across the bellows wall, it expands or contracts depending on where the higher pressure area is located. When the higher pressure area is located outside the outer casing 1202, the bellows 1202 would contract, in other words the adjacent sections 1204 would move closer to one another generally along the longitudinal axis of the sensor array 36. Conversely when the higher pressure area is inside the bellows 1206, the bellows 1206 would expand thus moving the sections 1204 away from one another. The degree of movement of the bellows 1206 depends on a number of factors, namely the pressure differential and the physical construction of the bellows 1206. The physical construction is determined by the material used for making the bellows 1206, the wall thickness and the convolutions structure. Basically, the physical construction of the bellows 1206 determines the ability of the bellows 1206 to yield when exposed to pressure. Factors taken into account when designing the bellows 1206 would include the compatibly of the bellows material with the environment, namely suitable chemical compatibility and corrosion resistance, among others. Other factors include the ability to withstand the pressure differential without collapsing or bursting and the degree of deformation desired across the range of pressure differential to which the bellows 1206 would be exposed in use.

The deformable component is not limited to a bellows structure. Possible variants include diaphragms or flexible membranes that manifest a degree of deformation when subjected to a pressure differential or even a piston movable in a cavity as a result of a pressure differential. In this example, a piston is considered "deformable" in the sense that the arrangement of parts changes as a result of the pressure differential action, namely the position of the piston in the cavity changes.

When the deformable component is arranged as a diaphragm, the diaphragm can be installed on any suitable location on the outer casing 1202 in order to sense the pressure acting on the sensor array 36. FIG. 12*a* shows in dotted lines at 1210 a circle identifying the possible position where a diaphragm can be placed. The circle shows the position of a port made in the outer casing 1202 that is closed by the diaphragm. The diaphragm, when exposed to pressure differential moves transversally with relation to the longitudinal axis of the sensor array 36.

When implemented as a piston, the internal cavity of the outer casing 1202 can be used as a receptacle in which the piston slides when exposed to pressure differential.

FIG. 17 provides several examples of deformable components. FIG. 17*a* illustrates a deformable component in the form of a diaphragm 1700 separating two areas 1702 and 1704 across which different pressures exist. Accordingly, the diaphragm 1700 is subjected to a pressure differential which causes the diaphragm to yield.

Figure 17A:
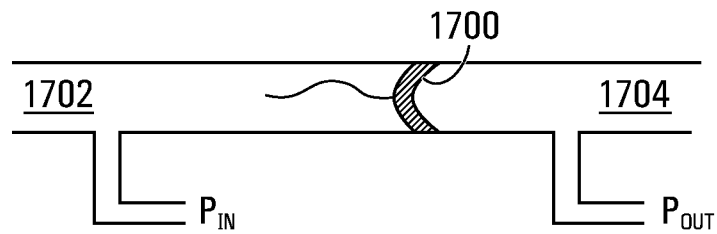
FIGS. 17a to 17d are illustrations of pressure sensors using different types of pressure transducers.
Figure 17B:
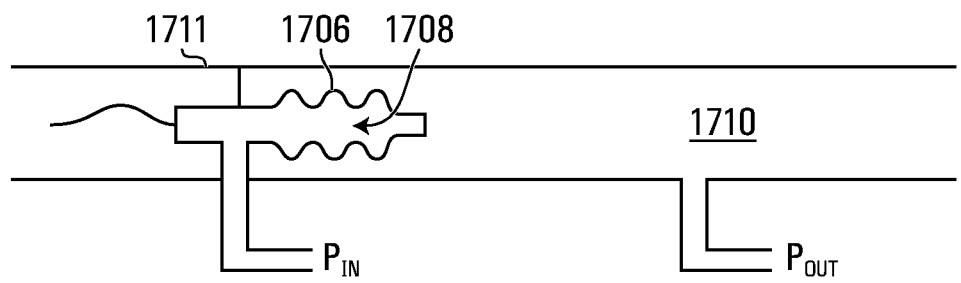

FIG. 17*b* illustrates a deformable component including a bellows structure 1706. The bellows structure 1706 can expand or contract in response to the pressure differential between the inside 1708 of the bellows structure 1706 and the outside 1710. Note that in this arrangement the bellows structure 1706 is fully contained in an outside casing 1711.

Figure 17C:
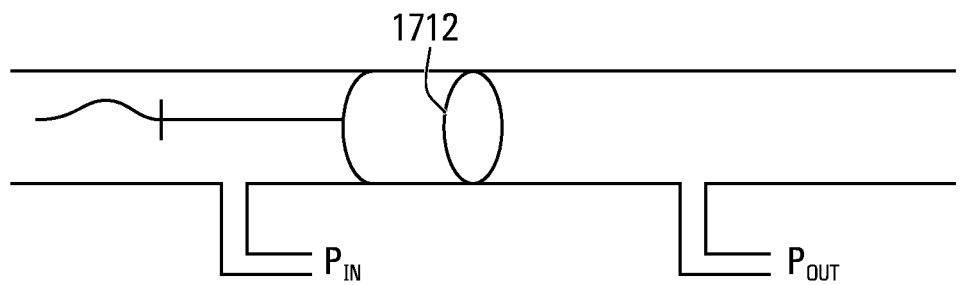

FIG. 17*c* illustrates a deformable component that uses a piston 1712 moveable in a cavity under the effect of a pressure differential created across the piston. As indicated earlier, the piston arrangement is considered to be a "deformable component" in the sense that the structure changes (the piston undergoes displacement) as a result of pressure differential changes.

Figure 17D:
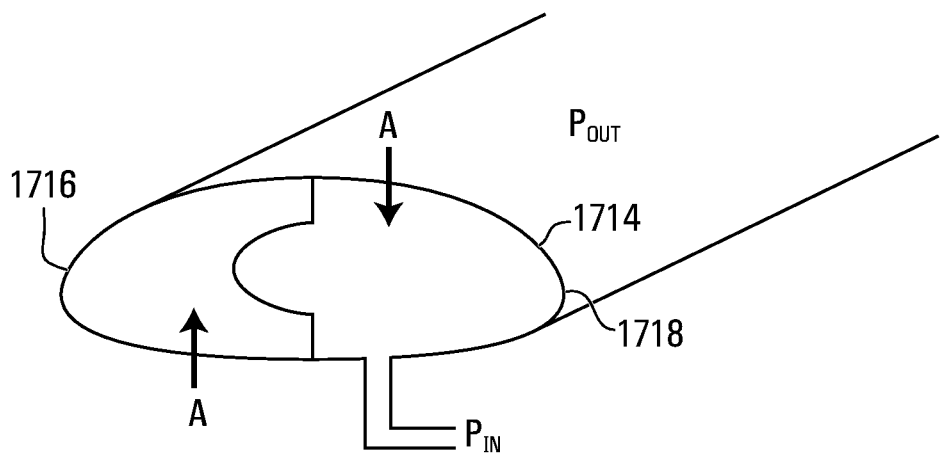

FIG. 17*d* illustrates yet another possible arrangement where an outer casing structure 1714 is subjected to a pressure differential which causes the outer casing structure 1714 to resiliently compress along the direction A. The outer casing structure 1714 approximates an oval figure with larger opposing sides connected to one another by hinge areas 1716 and 1718. The hinge areas flex when the large opposing sides move toward/away from one another when the outer casing structure 1714 is subjected to a pressure differential.

Referring back to FIG. 12, In addition to the deformable component, the pressure sensor 1208 includes a mechanical link between the deformable component and the optical fiber. The mechanical link induces changes in the optical characteristics of the optical fiber, the degree of change being related to the motion imparted to the mechanical link by the deformable component. The change in the optical characteristics is, therefore, related to the pressure differential acting across the deformable component.

Optionally, the mechanical link can be designed such that its Coefficient of Thermal Expansion (CTE) matches the CTE of the optical fiber to which it connects. In this fashion, when the pressure sensor is subjected to temperature variations, both the optical fiber and the mechanical link thermally expand by the same degree. A CTE match between the optical fiber and the mechanical link can be achieved by using for the manufacture of the mechanical link a material having the same constant of thermal expansion, by providing the mechanical link with a geometry such that its thermal expansion will be similar to the thermal expansion of the optical fiber, or using both avenues, namely controlling the material and the geometry of the mechanical link to achieve the match. Note the CTE match does not need to be achieved along all directions; the objective is to limit artificial strain on the optical fiber (that may erroneously be interpreted as pressure variation). Accordingly, the CTE match is relevant for thermal expansion of the mechanical link along directions or axes that can induce strain, such as for example axial strain in the optical fiber. In that sense, components of the mechanical link, which do not produce any strain when they thermally expand, do not need to be CTE matched with the optical fiber.

The mechanical link can operate as a strain imparting structure that induces strain in the optical fiber. The strain imparting structure changes the motion of the deformable component to produce a modified motion. The modified motion drives the optical fiber to induce strain in the optical fiber. For clarity, the term "strain" does not only refer to axial strain but may be strain in any other direction of the optical fiber, such as radial, bending, twisting or other.

The strain imparting structure can alter the motion produced by the deformable component in different ways.

In a first example, the strain imparting structure changes the amplitude of the movement. The movement amplitude change may be linear and characterized by a constant K. K can have a value more than one, in which case the movement produced by the deformable component is amplified. When the value of K is less than one, the magnitude of the movement generated by the deformable component is reduced. The changes to the amplitude of the movement can also be non-linear. In such case, the degree of amplification or reduction is not the same across the motion range; for example within a first segment of the motion range the movement amplification can be of a first value and in another segment the movement amplification is a second value.

In a second example, the strain imparting structure does not change the amplitude of the movement but limits it range. In this instance, the strain imparting structure will stop any further motion when the travel limit has been reached. This is useful to protect the optical fiber against over travel which may break it or damage it otherwise.

In a third example, the strain imparting structure changes the movement from one type to another, for example a translational movement is changed to a rotational movement or vice versa.

The reader skilled in the art will appreciate that the strain imparting structure can be designed to integrate two or more these functions and perform them at the same time or in sequence. For instance, the strain imparting structure can change the amplitude of the movement, change the movement type and also limit the motion range.

The strain imparting structure can be a single or multiple component device. For simplicity and reliability a single component is preferred, however multiple components can provide added functionality. An example of a single component is a resilient body that stretches or compresses in response to motion communicated to it by the deformable structure. An example of a multi-component device can be designed with multiple devices, such as levers, cams springs or others, linked to one another. A pivot is an example of a link between components.

Specific examples of the strain imparting structure are shown in FIGS. 13a, 13b, 13c and 13d. In those examples, the strain imparting structure is coupled to an optical fiber to apply strain to the optical fiber.

Figure 13A:
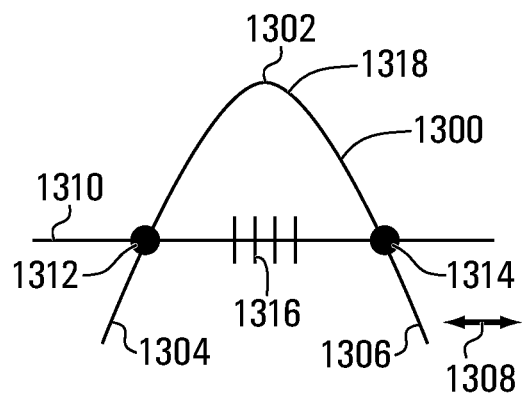
FIG. 13a illustrates a motion modifier structure used in a pressure sensor of the sensor array illustrated in FIGS. 12a and 12b.

In the example shown in FIG. 13a, the strain imparting structure 1300 changes the amplitude of the motion imparted to it by the deformable component. The strain imparting structure 1300 includes a unitary component made of resilient material and shaped for form a bend 1302 between two arms 1304 and 1306. The arm 1304 is fixed, in other words it is attached to a component or structure that does not move. The arm 1306 is attached to the deformable component. When the deformable component moves as a result of pressure differential acting on it, it causes the arm 1306 to move along the arrow 1308. The direction of the movement along the arrow 1308 depends on the direction of movement imparted by the deformable structure. For the purpose of this example, assume that a movement tending to further spread apart the arms 1304 and 1306 is produced when the pressure differential increases (the reverse movement is produced when the pressure differential decreases).

An optical fiber 1310 is connected at 1312 and 1314 to the arms 1304 and 1306, respectively. A grating 1316 is formed in the optical fiber 1310. When the arms 1304 and 1306 move apart, the optical fiber 1310 is stretched between attachment points 1312 and 1314, thus creating strain on the grating 1316. The degree of strain acting on the grating 1316 depends on the amount of stretching movement applied by the arms 1304 and 1306; i.e. the degree to which they are being forced apart. By lowering the position of the attachment points 1312 and 1314 (bringing them further away to the bend 1318) the amount of stretch imparted to the optical fiber 1300 is increased. The opposite effect is accomplished when the attachment points 1312 and 1314 are brought closer to the bend 1318.

The strain imparting structure allows decoupling the deformable component from the optical fiber. In this fashion, the deformable component does not need to be designed according to the amount of stretch that should be applied to the optical fiber for the pressure sensor to function adequately. The deformable component can be designed according to other factors, such as the environmental conditions to which it will be exposed in order to provide a satisfactory operation. The range of motion that is produced by that structure can then be adapted to the optical fiber via the strain imparting structure such that it matches the characteristics of the optical fiber (for example, limit the range of movement to a certain range to avoid overstressing or breakage of the optical fiber).

Figure 13B:
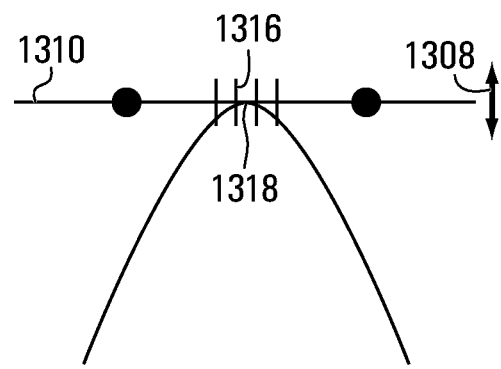

FIG. 13b is another example of implementation of the strain imparting structure. In this case the geometry and mounting arrangement of the structure is such that the bend 1318 moves radially with respect to the longitudinal axis of the optical fiber 1310. Accordingly, instead of being stretched as in the case of the previous example, the optical fiber 1310 is radially compressed at a degree depending on the displacement of the deformable component and the degree of movement amplification/reduction provided by the strain imparting structure. When the optical fiber is designed such that it can carry an optical signal according to different polarization axes, the degree of radial strain applied on the grating 1316 will induce a change in the spectral spread between the reflective peaks associated with the polarization axes. In such case the spread between the peaks will be indicative of the radial strain acting on the optical fiber.

Thus, in the example of FIG. 13b, the strain imparting structure alters the type of movement created by the deformable component. The movement is a translational motion that is converted in a compression force acting on the optical fiber. At the same time the amplitude of the movement is also changed. Specifically, the amplitude of the movement is reduced. The range of motion of the strain imparting structure acting on the optical fiber to create the radially acting compression strain is much less than the range of the translational movement that the deformable component undergoes.

Figure 13C:
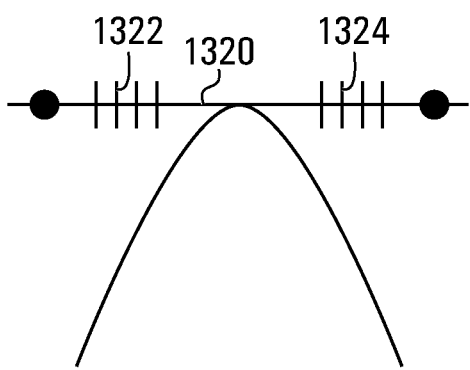

FIG. 13c is another example of the strain imparting structure. This example is structurally similar to the example illustrated in FIG. 13b, with the exception of the optical fiber. The optical fiber 1320 includes a pair of gratings 1322 and 1324 that are tuned to reflect the same optical signal wavelength. The gratings 1322 and 1324 create an optical cavity. A disturbance in those cavities, such as birefringence induced by radial stress, can be monitored by interferometric phase changes between the reflection of each individual grating of the pair 1322 and 1324.

Figure 13D:
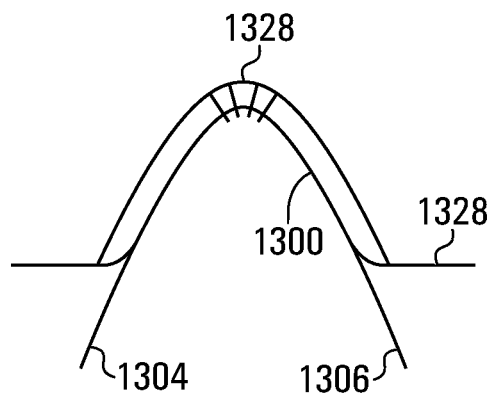

FIG. 13d provides yet another example of implementation of the strain imparting structure. In such case, the optical fiber 1326 is placed over the unitary component 1300 such that it overlaps with a portion of the arms 1304 and 1306 and passes over the bend 1318 which acts as a hinge between the arms 1304 and 1306. Relative movement between the arms 1304 and 1306 is transmitted to the optical fiber as bending strain, which changes the properties of the grating 1328. The optical fiber 1326 can be mounted on the unitary component 1300 by adhesive, electroplating or by brazing (when the optical fiber is metalized. This provides a very robust mounting arrangement where the optical fiber is protected by the unitary component 1300. An example of suitable adhesive is polyamide based adhesive that has been found to provide adequate bonding properties of use in the sensor array for an oil/gas production operation.

Figure 15:
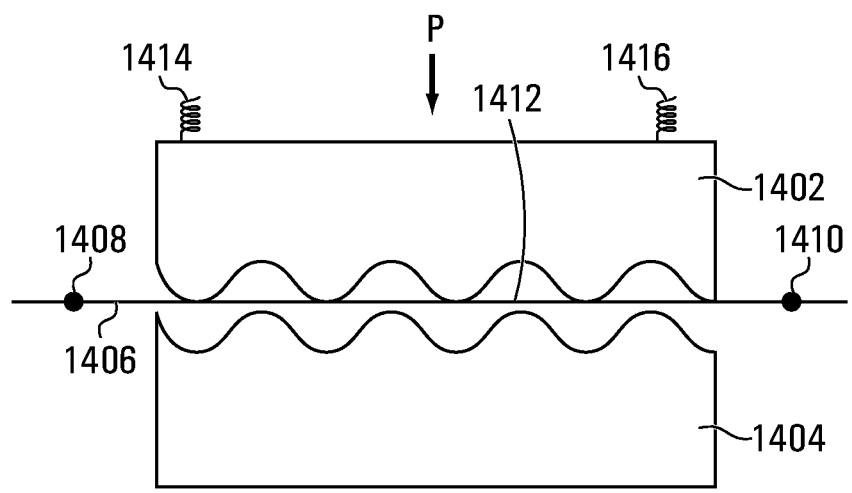
FIG. 15 is another variant of the motion modifier structure shown in the previous figures.

FIG. 15 illustrates yet another possible example of a strain imparting structure. In this case, the strain imparting structure 1400 does not use a bend or hinge to impart a bending strain on the optical fiber. Rather it uses a pair of jaws 1402 and 1404 including respective projections and recesses that dovetail in order to induce strain into an optical fiber 1406. The optical fiber 1406 has two attachment points 1408 and 1410 that define a segment 1412 between them. As the jaws 1402 and 1404 move toward one another the optical fiber 1412 is stretched as the projections enter the respective recesses.

In this form of implementation, the jaw 1404 is stationary, while the jaw 1402 is movable. The jaw 1402 is connected (not shown) to the deformable structure such that motion of the deformable structure imparts movement to the jaw 1402. Resilient components 1414 and 1416, such as springs reverse the movement of the jaw 1402 when the deformable component returns to its original position.

The profile of the projections and recesses determines the degree of strain imparting (amplification/reduction, linear or non-linear, end of travel limit).

In a possible variant, the mechanical link can induce a bend in the optical fiber. In this instance, it is the bend and not the strain that alters the optical characteristics of the optical fiber. For example, a tilted grating in the optical fiber reflects a portion of the optical signal in the cladding depending on the degree of bend; the higher the bend the larger the proportion of the optical signal that goes into the cladding. This variant can use anyone of the mechanical links shown in FIGS. 13d and 15 which cause the optical fiber to bend. While the mechanical links in those examples also induce strain in the optical fiber, the strain has little or no effect on the change of optical characteristics of the optical fiber.

Referring back to FIG. 12a, the strain imparting structure is identified by 1212. The structure 1212 includes a bend 1214 on either side of which are provided arms 1216 and 1218. The arm 1218 extends through the bellows 1206 and connects rigidly to the extremity 1220 of the bellows 1206. The attachment point is shown at 1222.

The arm 1216 connects to a plug 1224 that is rigidly mounted in the outer casing 1202.

The optical fiber 1200 runs uninterrupted through in the internal space defined by the outer casing 1202. It will be appreciated that the diameter of the optical fiber is smaller than the internal diameter of the outer casing 1202. Also note that the optical fiber 1200 is loosely laid inside the outer casing 1202 to prevent the fiber to be overstretched as a result of thermal expansion of the outer casing 1202. The optical fiber 1200 passes through a port 1226 made in the plug 1224. The port 1226 is then sealed. The sealing operation can be made by using any suitable sealing material that will make the port fluid tight. An example is brazing; the optical fiber 1200 has a metalized portion that registers with the port 1226 when the optical fiber is fed through it. Molten solder is then applied which completely fills the void and thus creates a gas tight seal. Another option is to use electroplating. Yet another option is to use an epoxy or another synthetic material based glue. Usually, epoxies or synthetic material based glue have thermal limits and may start deteriorating at higher operating temperatures, generally above 300 degrees C. For environments above that limit is generally better to use a brazing technique to provide a reliable fluid-tight seal.

The optical fiber 1200 is laid over the bend 1214 and bonded to it by using adhesive, brazing or electroplating. The arrangement is such that as the arms 1216 and 1218 move one with relation to another, bending strain is applied to the optical fiber 1200 which changes the properties of a grating 1228.

The optical fiber 1200 is also provided with another grating 1230, adjacent the grating 1228. The grating 1230 is used to provide a temperature measurement. In addition, the temperature measurement obtained in that location is used by the monitoring system to derive the degree of strain resulting from the effect of pressure, since the temperature also affects the grating 1228.

The optical fiber 1200 then exits the section 1204, passes through the bellows 1206 and enters the adjacent section 1204. The fiber then passes through another gas tight plug 1232 that is identical to plug 1224.

This arrangement therefore provides a gas tight chamber formed by the adjacent end portions of the sections 1204 and also including the bellows 1206. A reference pressure can be set inside this chamber or area, during the manufacturing stage of the sensor array 36 by pumping a gas or preferably creating a vacuum via a service port 1234. Once the desired degree of pressure has been established in the chamber, the port 1234 is closed, by soldering or using any other appropriate sealant.

The resulting chamber is therefore completely sealed. The pressure sensor responds to a pressure differential acting across the wall of the outer casing 1202. If the pressure outside is higher than the reference pressure in the chamber, the bellows 1206 will contract. The movement is transmitted to the optical fiber 1200 via the strain imparting component to create a bending strain on the optical fiber 1200.

When a known inside pressure is established in the chamber, such as intense vacuum, the pressure sensor can, therefore measure directly the absolute outside pressure. The absolute outside pressure combined with temperature measurements has value in an SAGD process since it is possible by using thermodynamics laws to compute the enthalpy or energy of the steam.

The pressure sensor 1208 can be replicated at as many positions as desired along the sensor array 36. In the example shown the pressure sensor 1208 and the associated temperature sensor are co-located but this is not absolutely necessary.

Figure 12B:
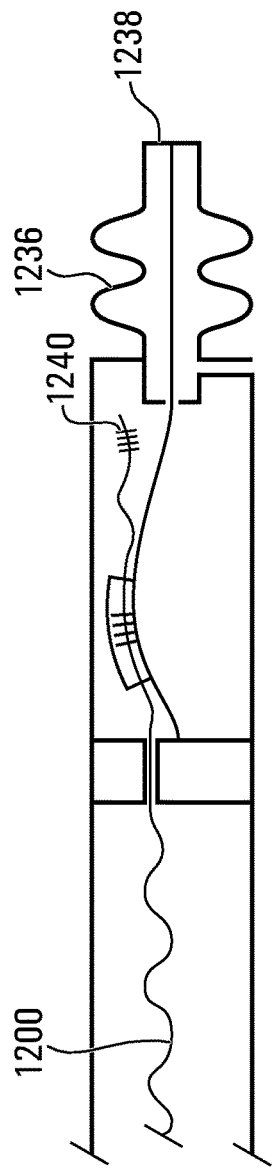
FIG. 12b is a longitudinal cross-sectional view of another example of implementation of the sensor array.

A variant of the pressure sensor 1208 is shown in FIG. 12b. The pressure sensor in this example is generally the same as the one described in connection with the earlier example, the difference being that the bellows 1236 is located at the extremity of the sensor array 36 and therefore terminates the sensor array 36. In this case, the bellows, instead of being provided with a pass-through channel of the passage of the optical fiber 1200 is closed by a cap 1238. The optical fiber 1200 also terminates with a grating 1240 which is used to measure temperature at that location. The optical fiber does not penetrate the bellows 1236.

Figures 18A, 18B:
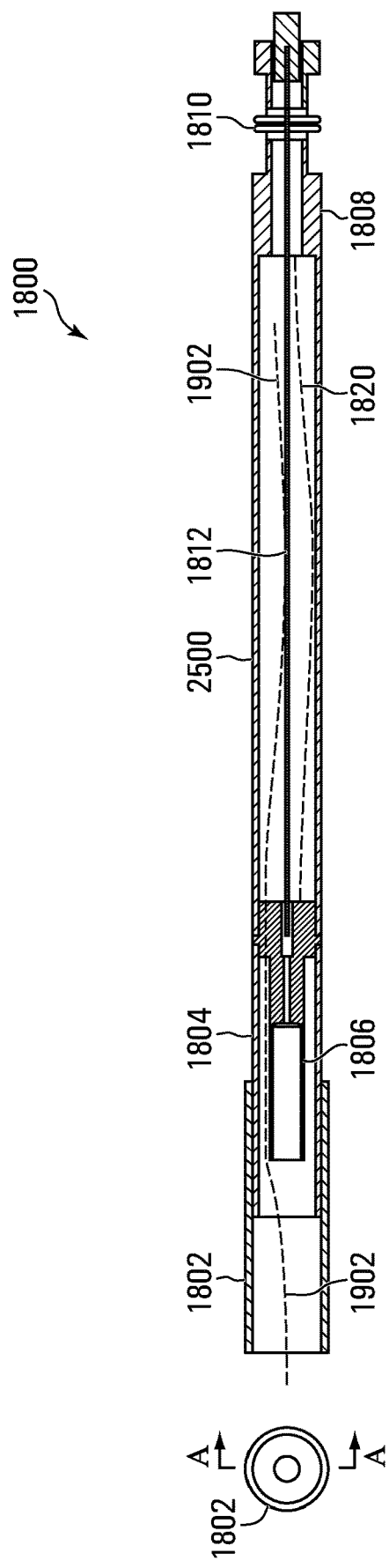

FIGS. 18a and 18b illustrate another example of implementation of a sensor array that is provided with pressure sensing capability and with other sensing capabilities as well, such as temperature sensing. The pressure sensor array 1800 can be used for similar applications such as those in connection with the sensor array 36.

The sensor array 1800 is an elongated structure that can extend to significant lengths and it is particularly suited for geological applications that require a long reach as well as a small profile.

The sensor array 1800 has an elongated metallic outer outer casing 1802 in which travels the optical fiber 1902 which carries the pressure/temperature measurements. In some cases, the outer casing 1802 may have a diameter less than 1 inch, preferably less than 0.750 inches, more preferably less than 0.625 inches, even more preferably less than 0.5 inches and for some applications even less than 0.25 inches. In this case, the metallic outer casing is round and has a diameter of about 0.25 inches. Owing to the small outer diameter, the sensor array 1800 can be inserted in wells or other areas to be monitored easily. For example, the sensor array 1800 can be inserted through swellable packers that are used to create a seal between different sections of a well, while allowing the swellable packer to maintain its integrity. The sensor array 1800 can be inserted directly into a pressurized well without the need to de-pressurize the well. Owing to the small profile of the sensor array 1800, it can be passed through a double pressure cap while gas/oil flows out of the well. Also, since the sensor array 1800 has a relatively small transverse dimension, it occupies little space in the well and as such does not impede in any significant manner the oil/gas flow in the well.

A pressure sensor 1804 is mounted to the metallic outer casing 1802. The pressure sensor 1804 is a tubular structure that is fitted at the end of the outer metallic outer casing 1802. For stability and durability purposes, the pressure sensor 1804 can be welded to the outer casing 1802. In addition to creating a durable joint, the weld also produces a highly resistant fluid-tight seal between the interior of the sensor array 1800 and the outside environment.

The configuration of the sensor array 1800 as shown in FIG. 18*b* is an arrangement where the pressure sensor 1804 is placed at the extremity of the sensor array 1800. In other words, the pressure sensor 1804 terminates the sensor array 1800. However, it should be clearly understood that the construction described allows providing multiple pressure sensors 1804 along the sensor array 1800. Multiple pressure sensors 1804 can be connected in series to provide a measurement span where pressure and temperature can be measured at different locations. The connections can be made directly to one another, in other words one pressure sensor 1804 connects directly to another pressure sensor 1804. Alternatively, the pressure sensors 1804 can be spaced apart from one another and interconnected via the metallic outer casing 1802. In this form of construction, sections of the outer metallic outer casing 1802 interconnect pressure sensors 1804.

The pressure sensor 1804 is an elongated generally tubular structure that is hollow. The internal cavity houses the optical fiber 1902 that carries the pressure and/or temperature measurements.

One extremity of the pressure sensor 1804 is closed by an end cap 1806 while the other end is closed by another end cap 1808. The end cap 1806 is provided as a closure and as a support of the internal strain imparting structure, while the end cap 1808 acts also as a closure but additionally it integrates a deformable component which converts the pressure differential between the outside and the inside into displacement. The deformable component includes a bellows structure that can contract or expand in response to pressure changes. The bellows structure movement occurs along the longitudinal axis of the pressure sensor 1804.

The bellows drives a strain imparting structure that extends from the end cap 1808 to the end cap 1806. The end cap 1806 provides an abutment against which the strain imparting structure 1812 can be resiliently compressed by the movement of the bellows structure 1810.

To facilitate the understanding of the structure and the operation of the pressure sensor 1804, reference will now be made to FIGS. 19 to 32 that illustrate in greater detail the various components of the pressure sensor 1804 and the method for assembling the components together.

Figure 19:
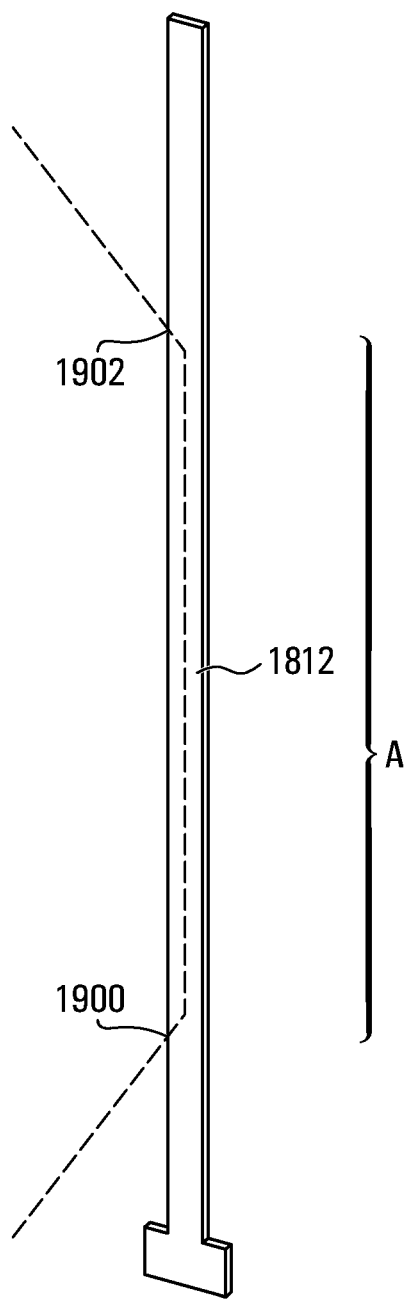
FIG. 19 is a perspective view of a movement magnitude modification structure used in the pressure sensor shown in FIGS. 18a and 18b.

FIG. 19 is a perspective view of the strain imparting structure 1812. The strain imparting structure includes an elongated beam made of material that is resilient such that it can be repeatedly bent without creating a permanent modification to its shape. Materials of choice for manufacturing the stain imparting structure include metals and some synthetic materials. In selecting the proper material consideration should be given to the thermal conditions in which the pressure sensor 1804 will need to operate such as to avoid temperature related structural failures. The geometry of the strain imparting structure 1812 and the material from which the strain imparting structure 1812 is made will determine the behavior of the strain imparting structure in terms of how the strain imparting structure alters the motion of the bellows structure 1810 and applies it to the optical fiber.

The strain imparting structure 1812 includes an elongated flat face 1900 that constitutes a mounting surface for the optical fiber. In practice, the optical fiber, which in FIG. 19 is shown in dotted lines 1902 is mounted on the surface 1900 and extends along that surface over at least a portion of its length. In the example shown, the length of the surface 1900 over which the optical fiber 1902 is mounted is identified by the bracket A.

The optical fiber 1902 can be secured to the surface 1900 in a number of different ways without departing from the spirit of the invention. Examples include brazing (when the optical fiber surface is metalized), electroplating, adhesives or mechanical connection.

Figure 20:
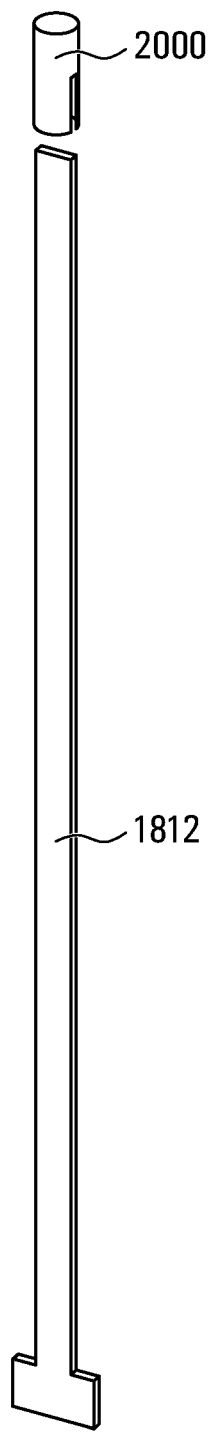
FIGS. 20 to 32 are perspective views of different components of the pressure sensor shown in FIGS. 18a and 18b, also illustrating the sequence of assembly of the various components into a complete pressure sensor.
Figure 21:
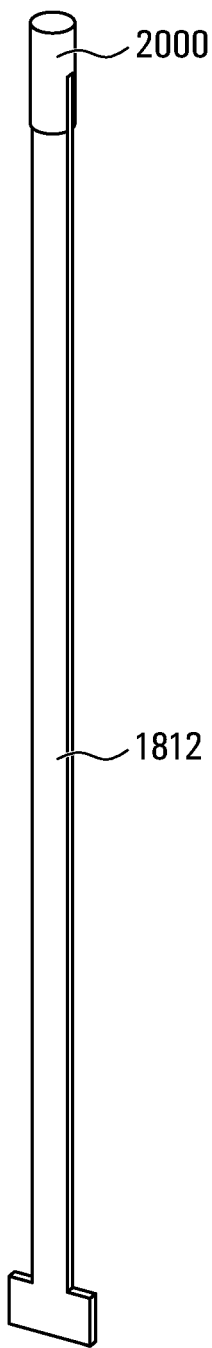

As shown in FIGS. 20 and 21, a cylindrical drive rod 2000 is provided and mounted by welding to the extremity of the strain imparting structure 1812.

Figure 22:
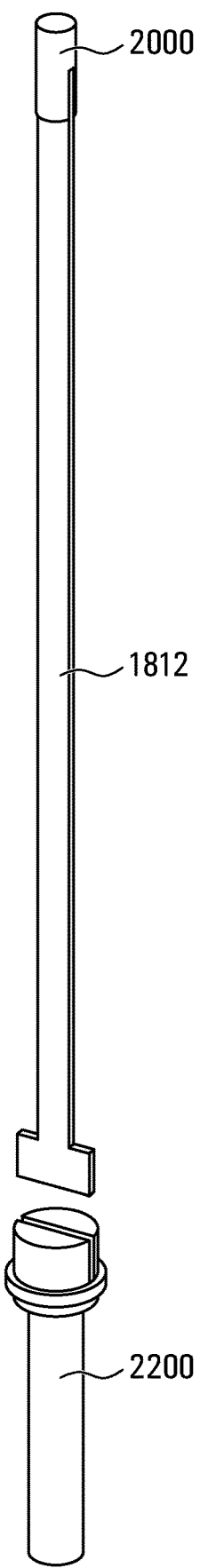
Figure 23:
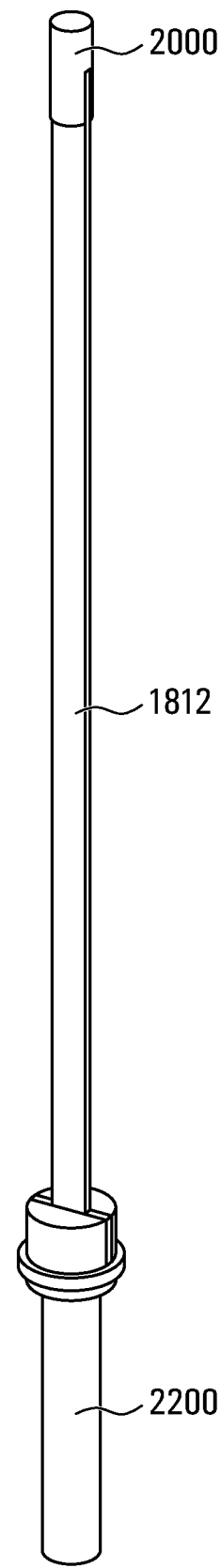

FIGS. 22 and 23 illustrate an abutment 2200 secured to the end of the strain imparting structure that is opposite the cylindrical drive rod 2000. The abutment 2200 forms the end-cap 1806 shown in FIG. 18*b*.

Figure 24:
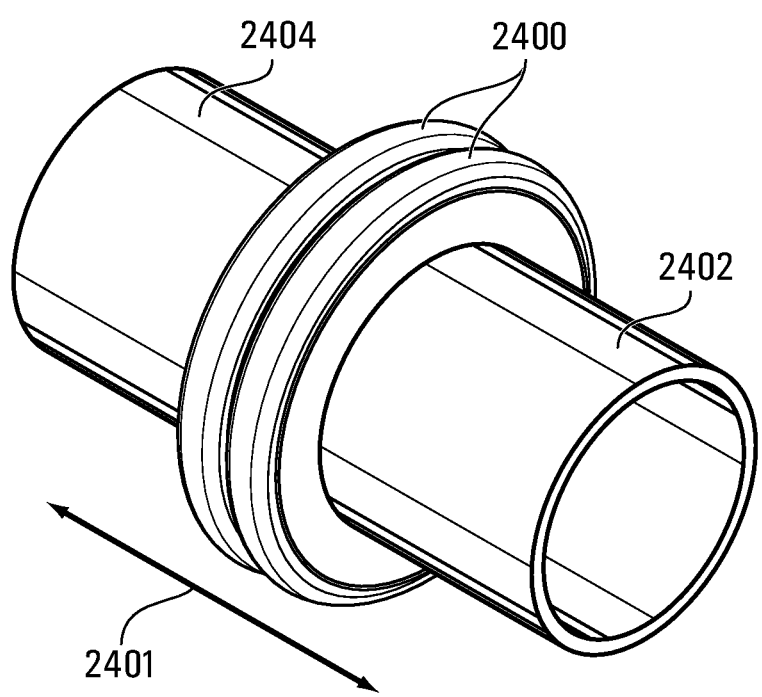

FIG. 24 illustrates the bellows structure 1810. The bellows structure includes a series of convolutions that can expand or contract axially (along the direction identified by the arrow 2401, in response to a pressure differential. The bellows structure is made of metallic material, such as stainless steel for its tensile strength and corrosion resistance. Accordingly, the bellows structure 1810 can be used in high pressure corrosive environments.

The convolutions 2400 are connected to tubular couplings 2402 and 2404. The tubular couplings 2402 and 2404 can be made from the same material as the convolutions 2400 or different material. The arrangement is such that the tubular coupling 2402 is connected to the first pleat 2400, while the tubular coupling 2404 is connected to the second pleat 2400. In this fashion, as the convolutions 2400 expand or contract axially, along the direction 2401, that expansion/contraction moves the tubular couplings 2402 and 2404 away/toward each other also along the direction of movement 2401.

Figure 25:
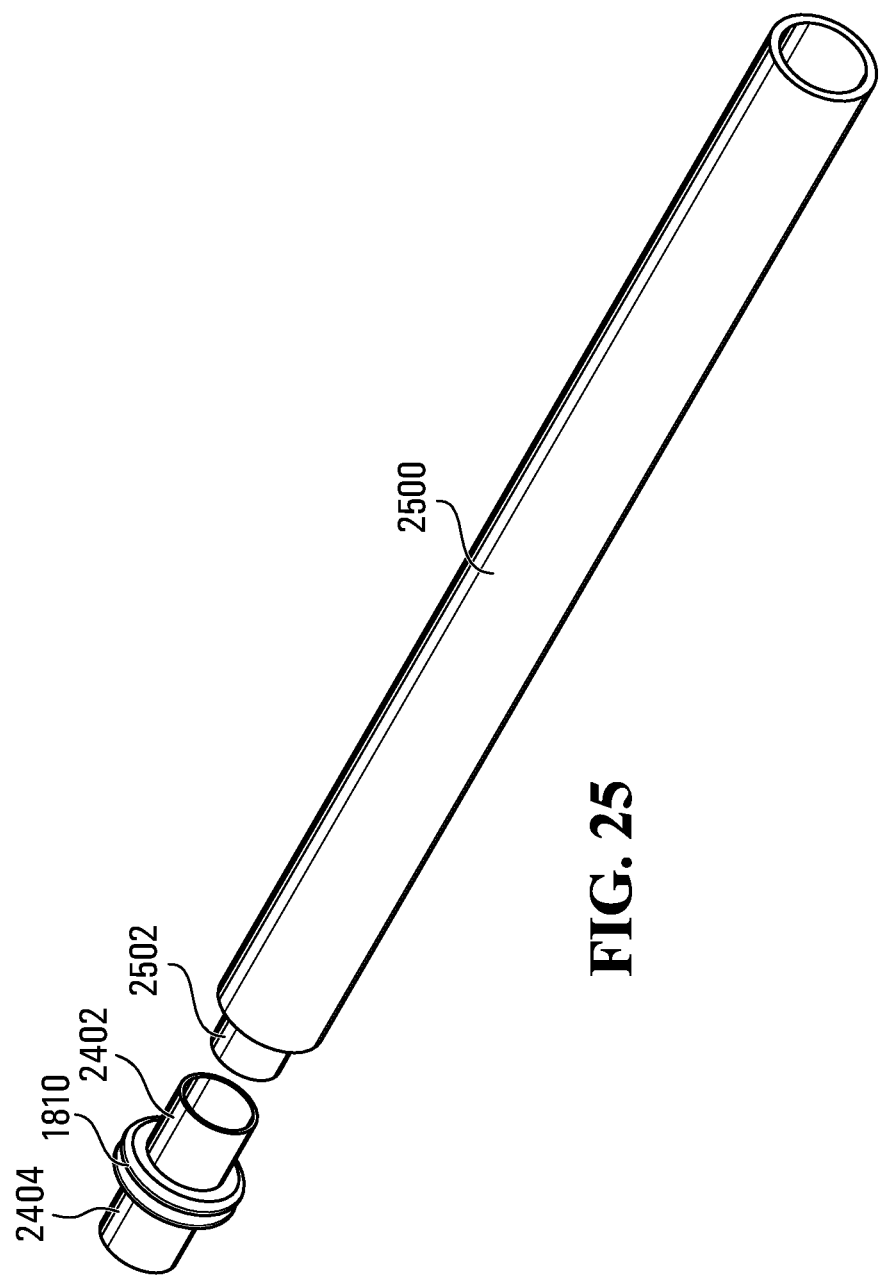
Figure 26:
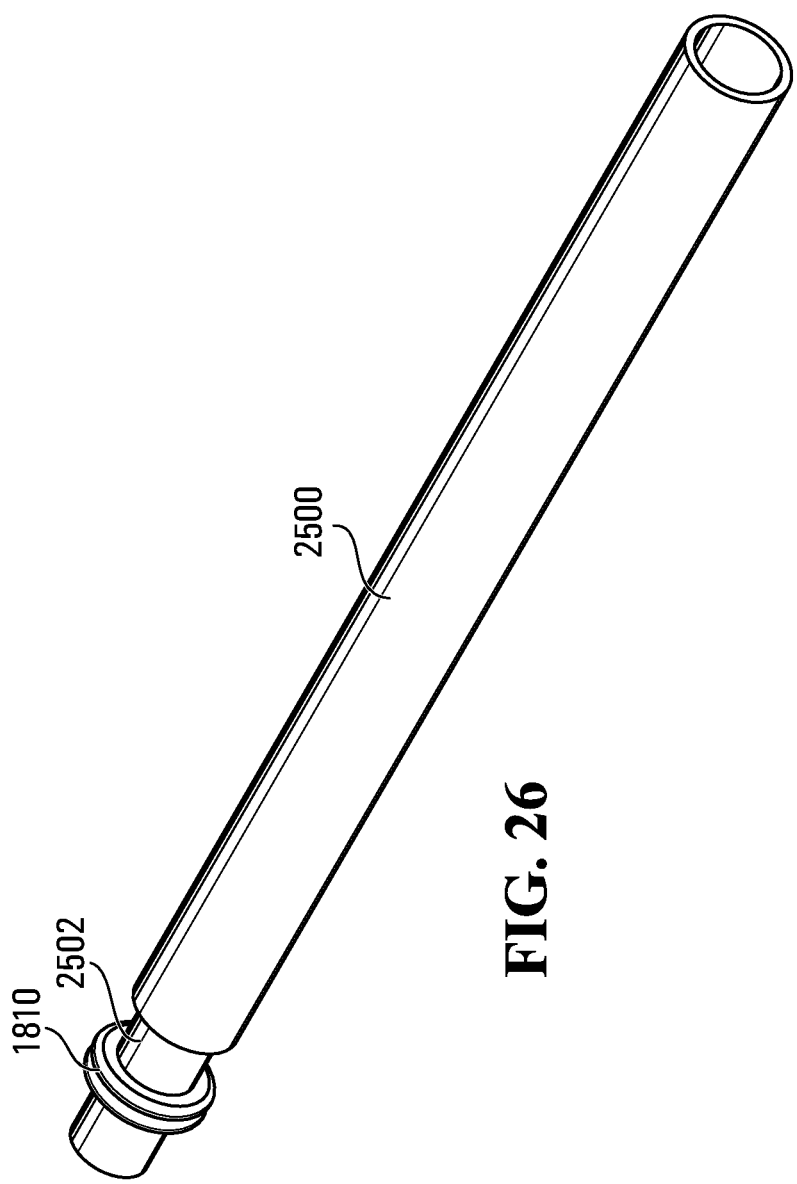

As shown in FIGS. 25 and 26, the bellows structure 1810 is mounted to an outer casing 2500. The outer casing 2500, which is also illustrated in FIG. 18*b*, encloses the strain imparting structure 1812. The connection between the bellows structure 1810 and the outer casing is made by inserting a narrowed end portion 2502 of the outer casing 2500 into the tubular coupling 2402.

Figure 27:
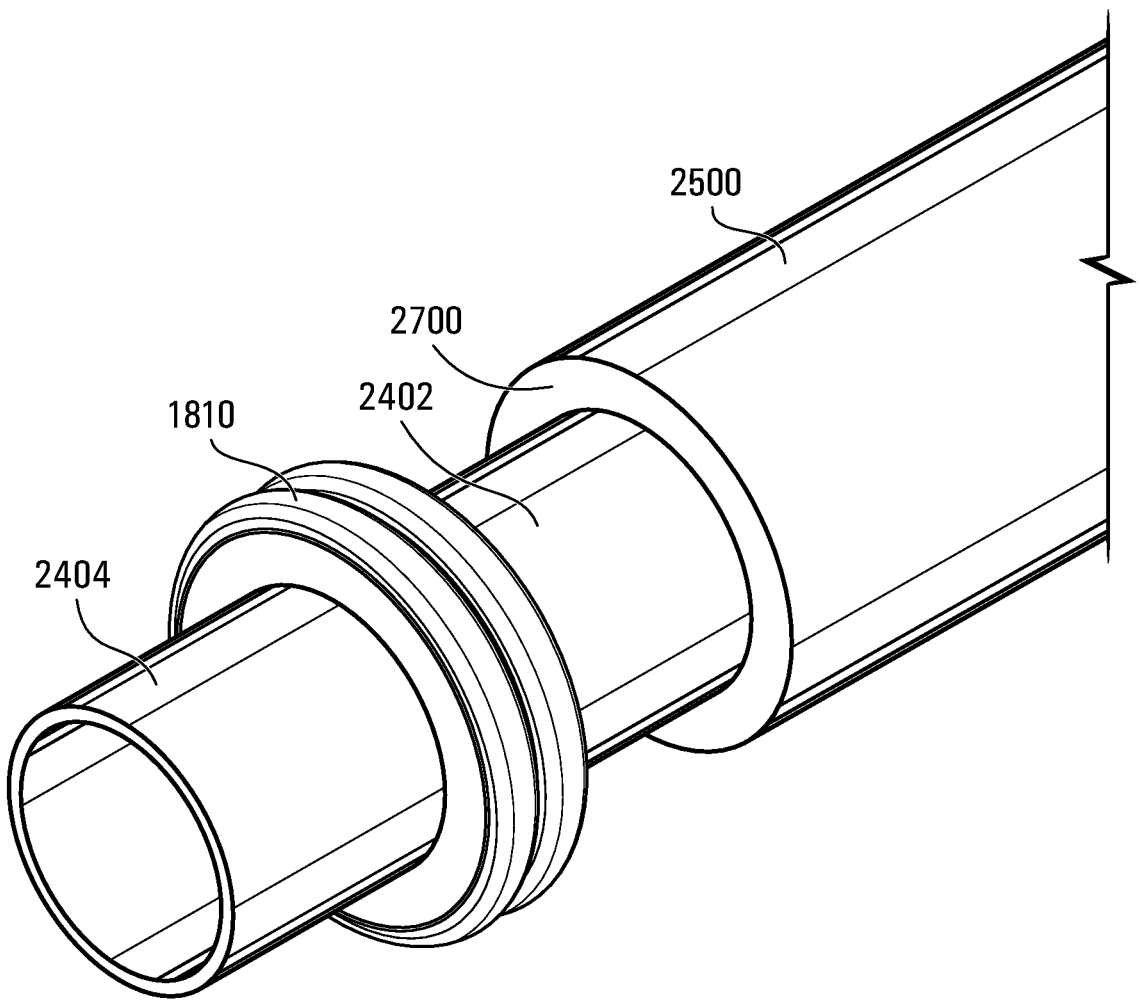

FIG. 27 illustrates in greater detail the bellows structure 1810 and its connection to the outer casing 2500. Both components are secured to one another by welding. A circular weld joint 2700 which runs along the edge of the tubular coupling 2402 permanently secures the components and also creates a fluid-tight seal.

Figure 28:
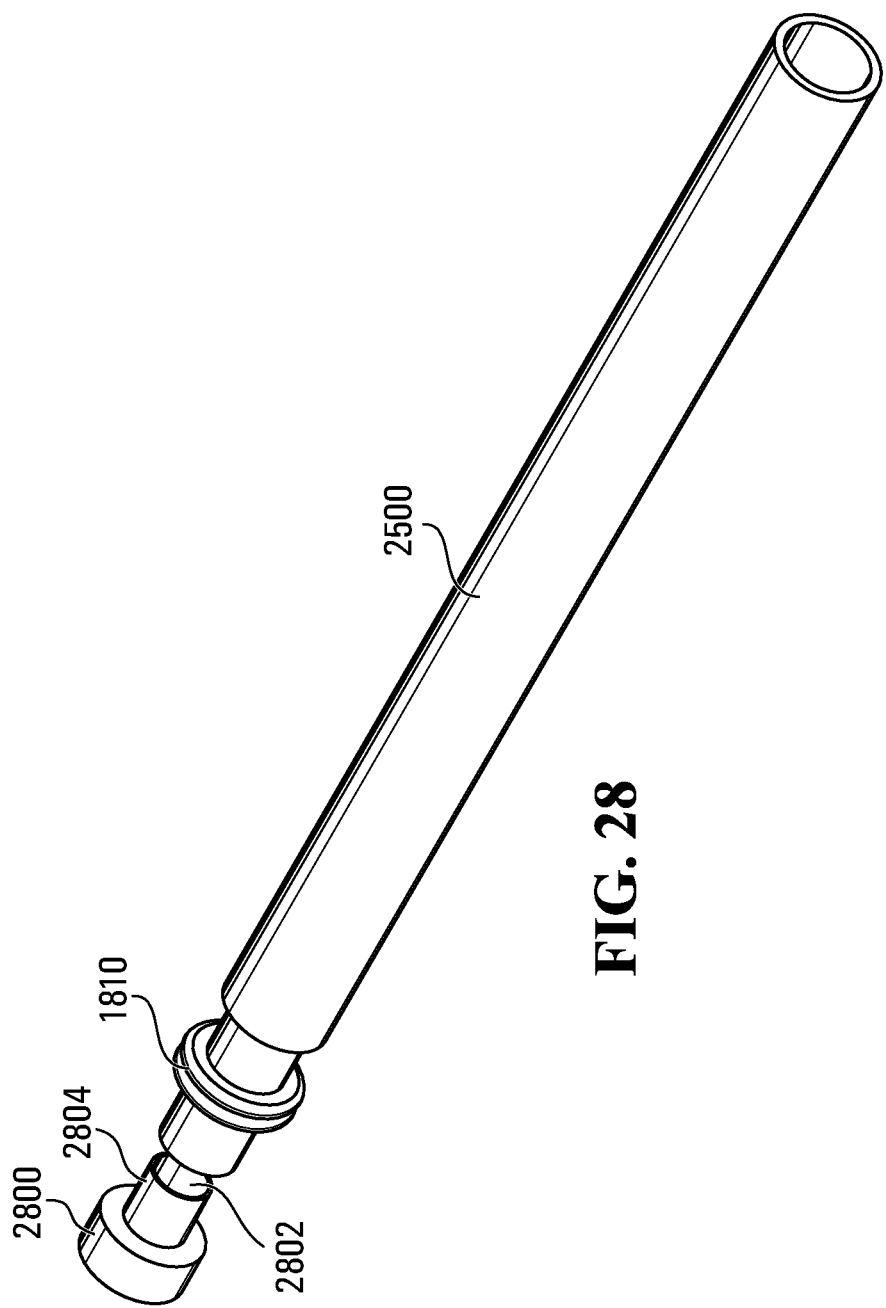
Figure 29:
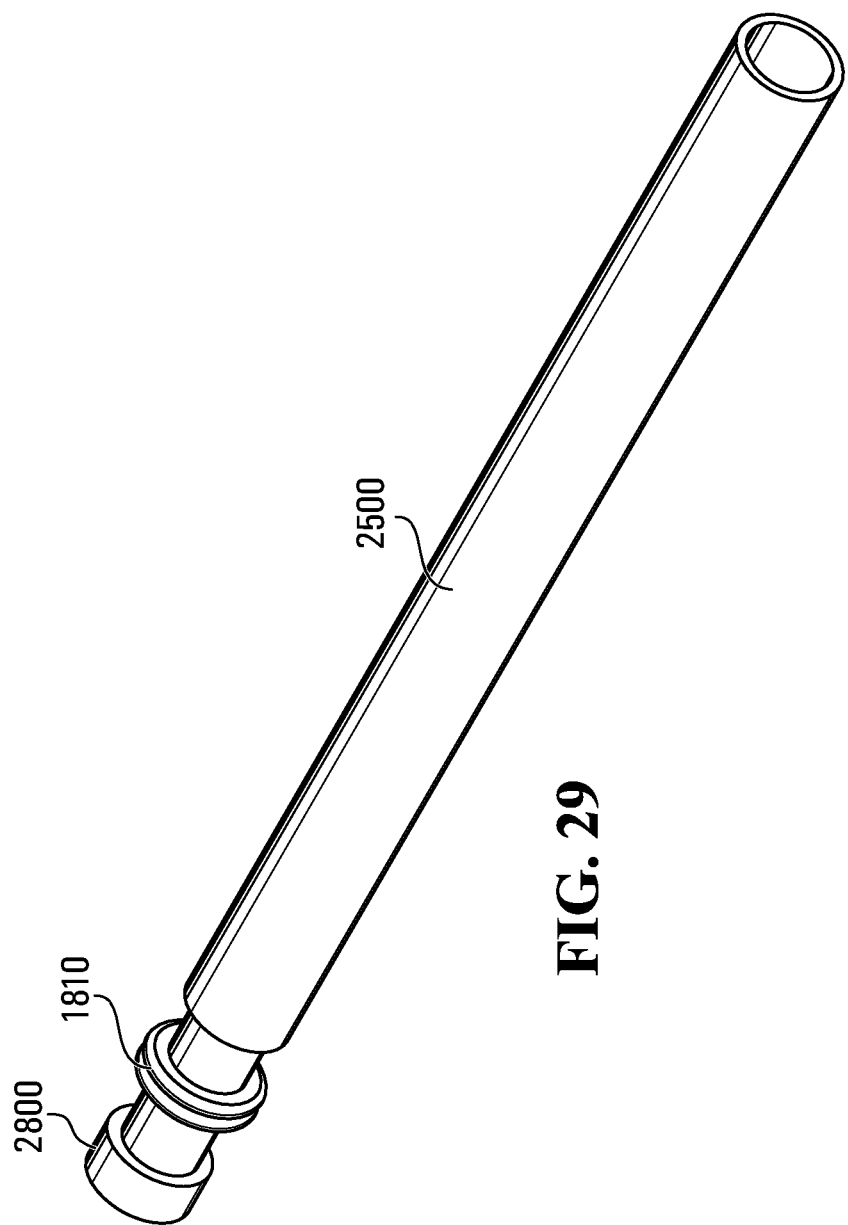
Figure 30:
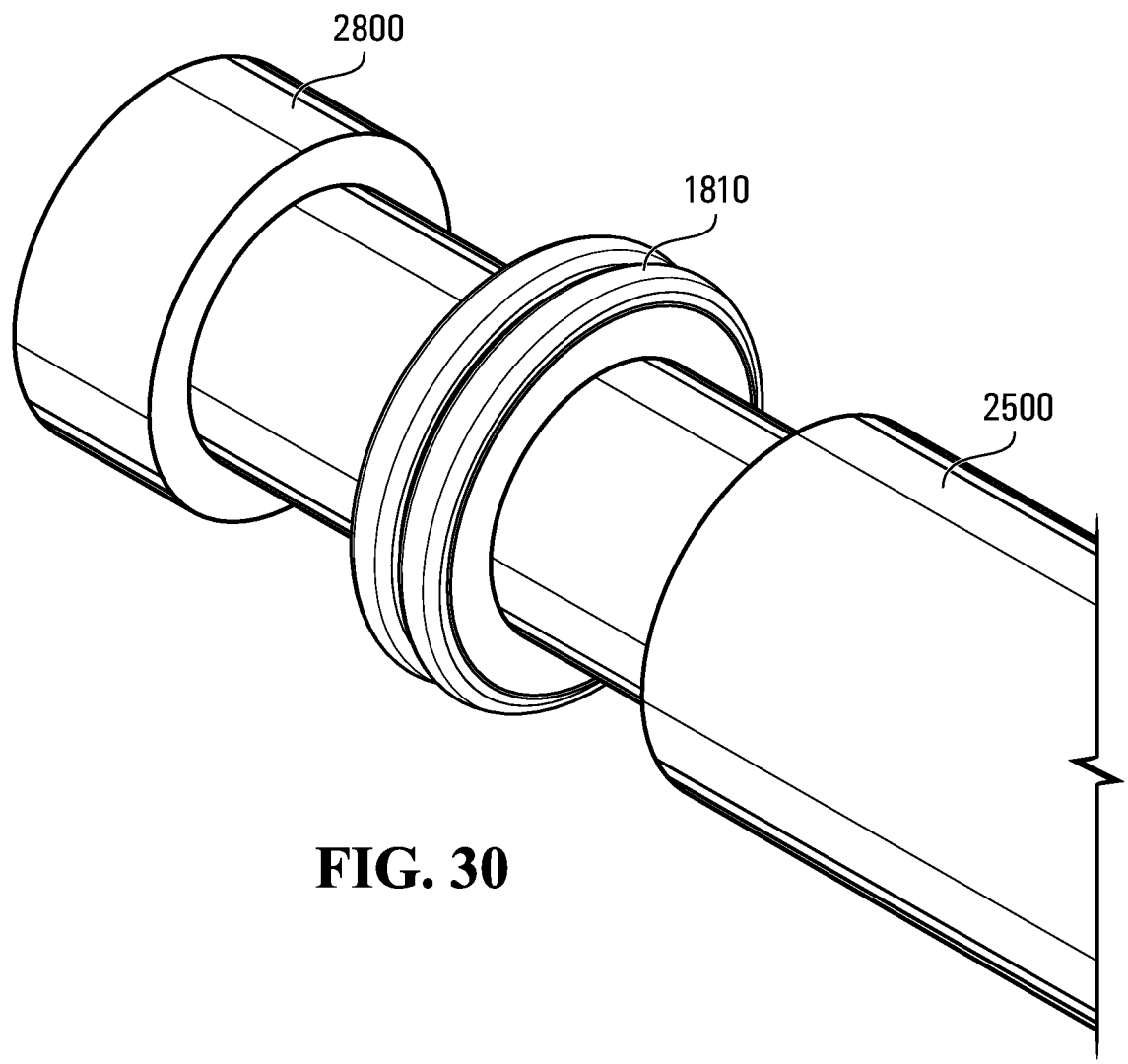

A circular closure 2800 is mounted to open end of the bellows structure 1810, as shown in FIG. 28. The circular closure 2800 includes a circular cavity 2802 which is dimensioned to receive the drive rod 2000. The circular cavity 2802 is formed in a central projection that is dimensioned to fit into the tubular coupling 2404. As illustrated in FIG. 29, the closure 2800 is welded to the tubular coupling 2404 when the central projection 2804 is received in it. FIG. 30 illustrates in greater detail the circular closure 2800 when the circular closure 2800 is mounted to the bellows 1810.

Figure 31:
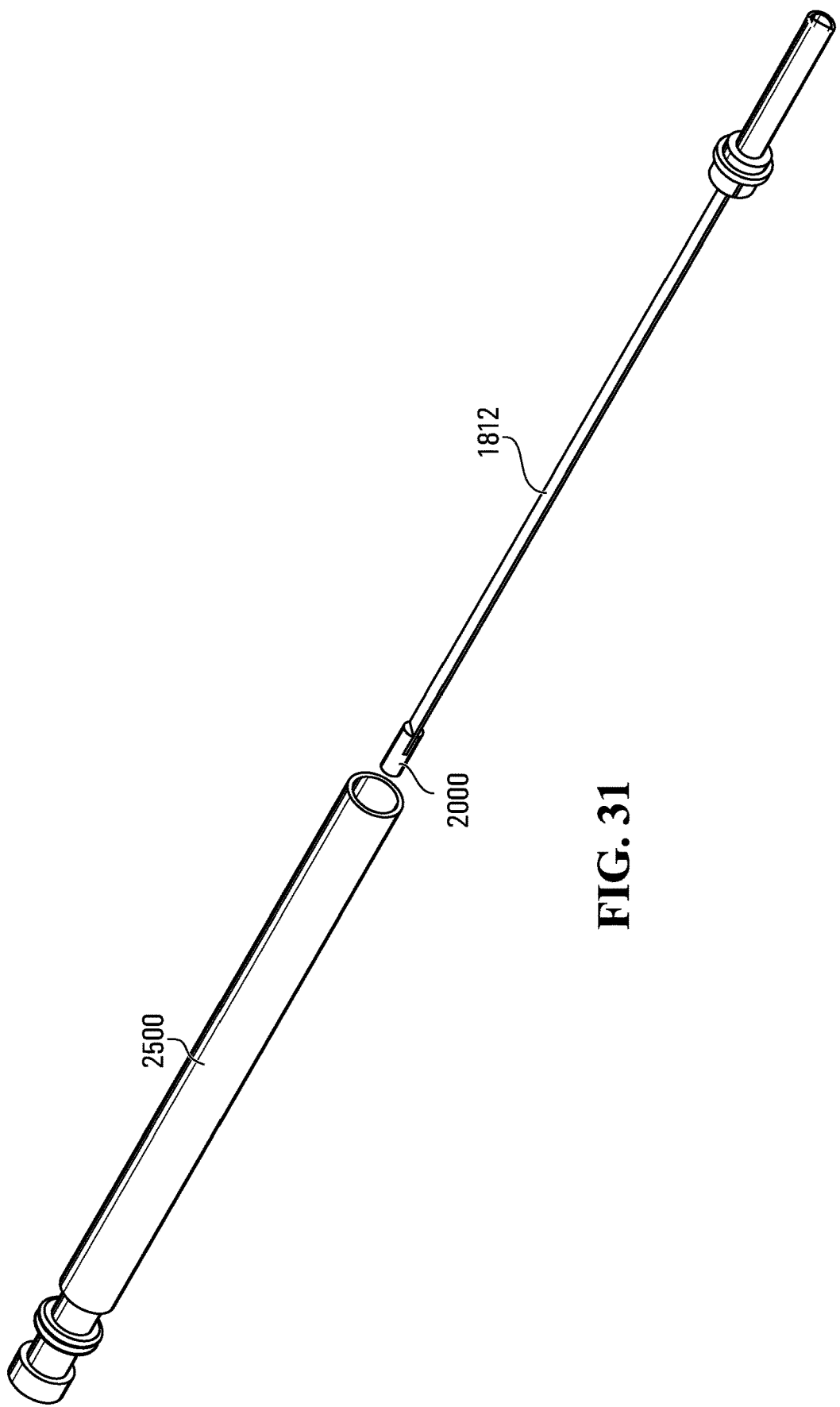

The strain imparting structure 1812 is then installed in the outer casing 2500 through its open end. This operation is shown in FIG. 31. The cylindrical drive rod 2000 is inserted first and it fits into the circular cavity 2802. When the cylindrical drive rod 2000 is fully seated into the circular cavity 2802 the abutment 2200 engages the extremity of the outer casing 2500, thus obturating it. The abutment 2200 is then welded to the outer casing 2500, competing the assembly of the pressure sensor 1804.

Figure 32:
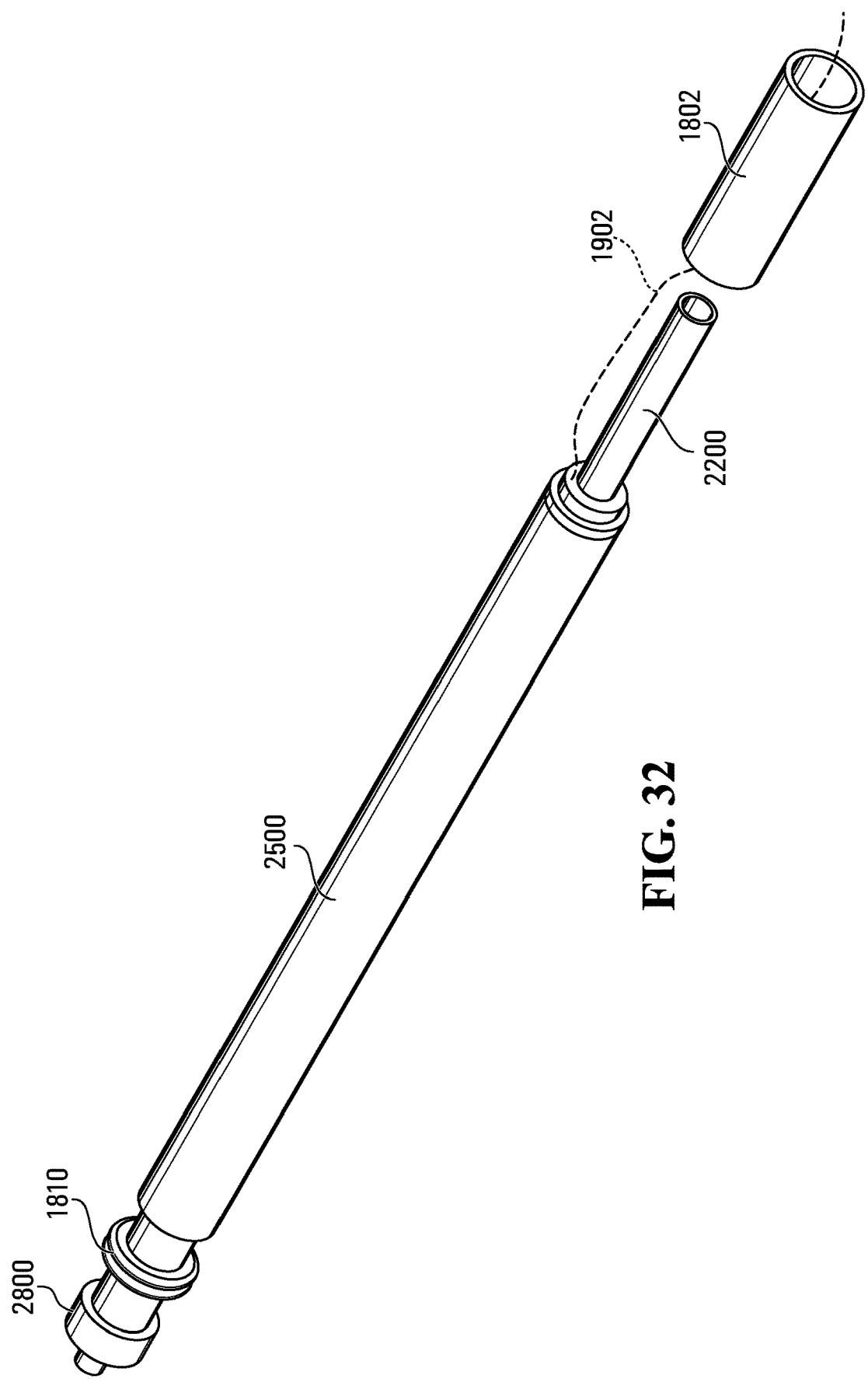

The optical fiber 1902 is mounted to the strain imparting structure 1812 before the strain imparting structure 1812 is inserted into the outer casing 2500. The optical fiber 1902 is threaded through a small aperture (not shown) in the abutment 2200 and thus extends outside the pressure sensor 1804, running through the metallic outer casing 1802 up to a point outside the sensor array 1800 for connection to a measuring apparatus or system. The optical fiber 1902 is shown in FIGS. 18*b* and 32. The aperture in the abutment 2200 is closed with glue or with brazing (assuming the optical fiber 1902 is metalized at least over a portion that passes through the aperture) to create a fluid-tight seal.

A reference pressure is established inside the pressure sensor 1804. The reference pressure is an absolute pressure value which would allow determining the absolute pressure outside pressure sensor 1804. Recall that the pressure sensor 1804 measures a pressure differential between the inside and the outside. By setting the inside pressure to a known and fixed value, it is possible to compute the absolute outside pressure on the basis of the measured pressure differential value.

The reference pressure can be set to a very low pressure (vacuum) by pumping air outside the casing 2500 during assembly or can be set to a pressure above vacuum by pressurizing the outer casing 2500 with a suitable gas. Vacuum is usually the better choice since the reference pressure remains relatively stable during temperature fluctuations. Note that if the reference pressure is not vacuum, it is still possible to compute the absolute pressure but this requires a knowledge of the ambient temperature (which is available from a local temperature sensor).

In use, as the pressure outside the pressure sensor 1804 changes, the bellows structure 1810 reacts to this pressure change by moving axially. The bellows responds to a variation of a pressure differential acting across the convolutions. The movement that occurs restores the equilibrium between all the forces acting on the bellows structure 1810, namely the fluid pressure tending to collapse the bellows structure 1810 (this assumes that the outside pressure is higher than the inside pressure) and the mechanical resistance to deformation the bellows structure 1810 manifests. When the two forces balance each other, the bellows structure 1810 does not move any more and acquires a stable condition.

As the bellows structure 1810 moves, the motion is imparted to the closure 2800 that is mounted at the free end of the bellows structure 1810. In turn, the closure moves the drive rod 2000 which causes the strain imparting structure 1812 to bend. The degree of bend is therefore related to the degree of deformation imparted by the bellows structure 1810 as a result of outside pressure forces.

The bend will induce a certain amount of strain into the optical fiber 1902 that is measurable as discussed earlier in this specification. To protect the optical fiber 1902 against excessive strain, the range of motion of the strain imparting structure 1812 is limited by the outside casing 2500. As shown in FIG. 18*b*, the strain imparting structure 1812 can bend only up to a point at which it contacts the outside casing 2500. The position of the strain imparting structure 1812 is shown by the dotted line 1820.

Figure 33:
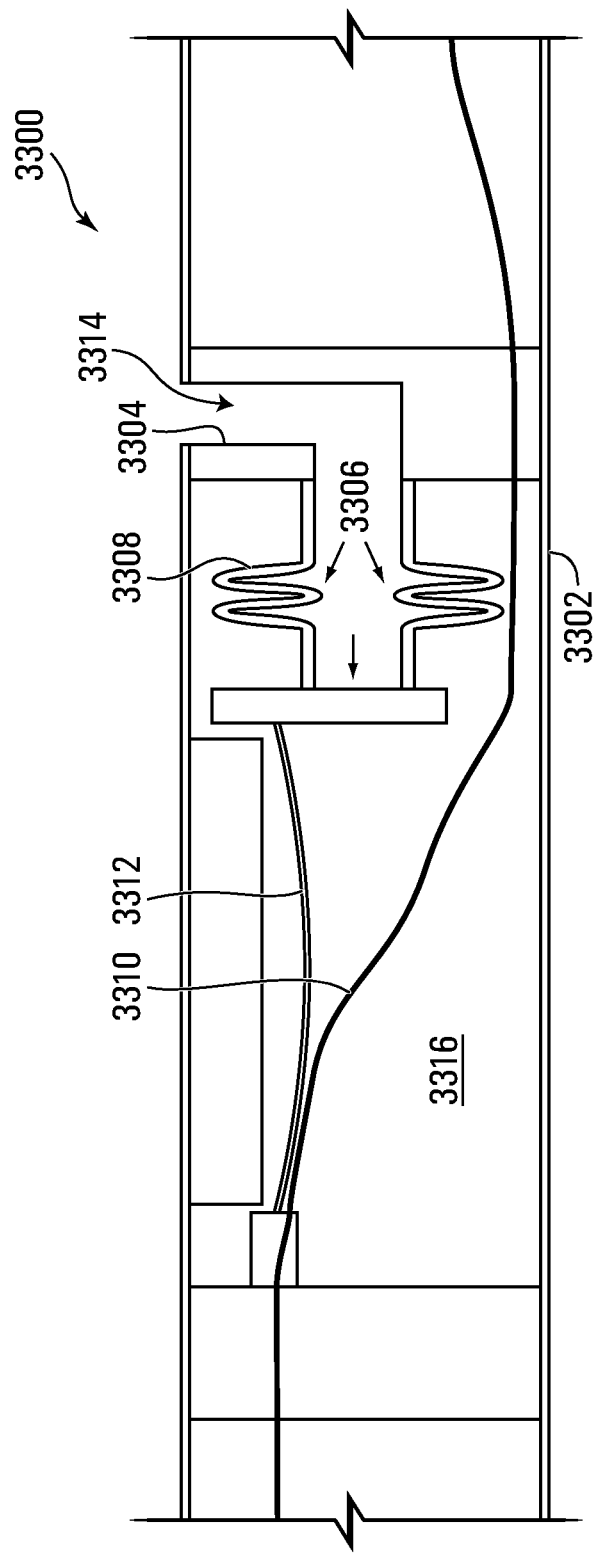
FIG. 33 is a longitudinal cross-sectional view of a pressure sensor according to a variant.

FIG. 33 illustrates a variant of the sensor array 1800 in which the deformable component is housed inside the outer casing of the pressure sensor. This form of construction is more suitable for a pressure sensor that is located away from the extremity of the array. Generally speaking, the pressure sensor 3300 has an outer casing 3302, that is continuous with the exception of a sensing port 3304 that leads to a pressure measurement chamber 3306. The chamber 3306 is closed by a deformable component in the form of a bellows structure 3308. The bellows structure 3308 is moveable axially (along the centerline of the outer casing 3302 in response to variation of pressure differential between the pressure measurement chamber 3306 and the interior of the pressure sensor 3300.

In this example of implementation, the outer casing 3302 thus defines an internal cavity that is divided in two chambers or areas, 3314 and 3316 by a fluid-tight partition which is constituted by the deformable component. In this example, the deformable component works in tension, in other words if the pressure outside the sensing array is higher, then the pressure differential will tend to expand the deformable component. A strain inducing structure 3312 is connected to the partition and the motion of the partition (deformable component) is converted into strain on an optical fiber 3310 via a strain inducing structure 3312. An advantage of this variant is that it offers a smooth outer surface with little or no external ridges or irregularities, with the exception of the port 3304. In addition, the motion of the deformable component occurs within the casing 3302. In this fashion, several pressure sensors 3300 can be mounted serially in order to measure the pressure at different points along the length of the sensing array where the pressure measurement at each measurement point is independent of measurements at other points along the sensing array.

To elaborate, the design of the pressure sensor 1800 described earlier uses a deformable component that is located outside the casing 1804 and in response to a pressure differential that deformable component yields. If several such pressure sensors are assembled serially, the motion of one deformable component will be communicated to the pressure sensors downstream. If the bellows structure 1810 expands (when the pressure sensor 1800 experiences a lower outside pressure) that expansion, albeit minute, will cause a corresponding displacement of the entire segment of the sensing array downstream. For certain applications, where this movement can occur unimpeded, this has no consequence. However, in other instances where the motion is likely to be impeded, the accuracy of the pressure measurement may be affected. When the downstream segment of the sensing array is long and it contacts geological structures which results into friction, that movement will be impeded to at least some extent.

The design of the pressure sensor 3300 has the advantage of constraining the movement of the deformable component within the outer casing 3302, in other words the deformable components of the various pressure sensors 3300 along the sensing array are allowed to move independently of one another. The motion of one deformable component does not create or induce movement in another part of the sensing array. This allows performing accurate and independent pressure measurements at different locations of the sensing array.

The chamber or area 3314 that communicates with the port 3304 is therefore opened and in use would fill with the fluid (hydrocarbon based fluid or steam) outside the pressure sensor. If the pressure in that chamber 3314 is higher than the pressure in the reference pressure chamber 3316 (which is likely to be the case in most instances where the reference pressure is vacuum), the deformable component 3306 will expand up to a point where all the forces reach equilibrium. Should the pressure differential established across the deformable component changes, the deformable component will move accordingly.

The partition dividing the chambers 3314 and 3316 prevents the ingress of fluid in the chamber 3316. As such, the chamber 3316 constitutes a clean and protected environment in which the optical fiber 3310 is located. This environment is shielded from the external harsh conditions and as such the optical fiber is protected from possible damage.

Figure 36:
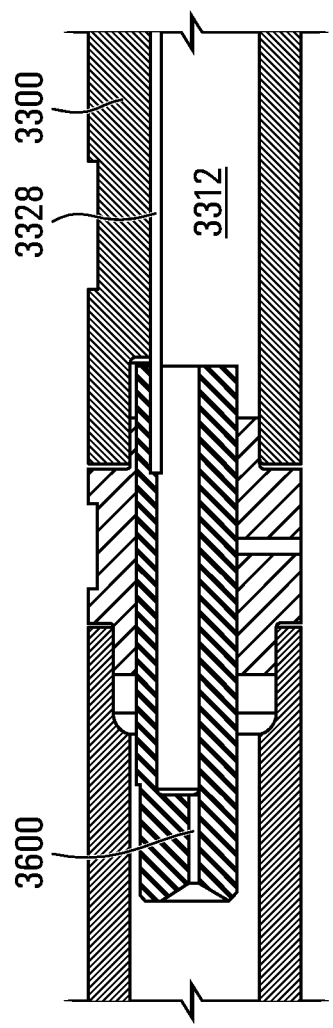
FIG. 36 is another enlarged view of components of the pressure sensor shown in FIGS. 34 and 35.

FIGS. 34, 35 and 36 illustrate in greater detail a variant of the pressure sensor 3300. In FIG. 34, the pressure sensor 3300 is shown mounted between a pair of connecting segments 3400 and 3402. A connecting segment is in essence a section of the sensing array that joins a pair of pressure sensors 3300. In its simplest form, a connecting segment has an outer casing that is continuous with the outer casing of pressure sensor 3300 and connects at one end with one pressure sensor 3300 and at the other end with another pressure sensor 3300. For applications where fewer pressure sensors 3300 are needed, several connecting segments 3400, 3402 can be connected to one another to form a longer span between adjacent pressure sensors 3300. A connecting segment 3400, 3402 also provides an internal pathway to carry one or more optical fibers running the length of the sensing array as it will be explained below.

Advantageously, the joints between a connecting segment 3400, 3402 and a pressure sensor 3300 or another connecting segment 3400, 3402 are fluid tight such as to avoid the ingress of external fluid inside the outer casing.

The pressure sensor 3300 has an outer casing 3310 that is tubular or of any other suitable shape. The outer casing defines an internal cavity which is divided in two areas or chambers 3312 and 3314. The chamber or area 3314 is exposed to the pressure outside the pressure sensor 3300 via a port 3304. In this fashion, the fluid outside the casing 3310 can penetrate into the chamber 3314. The chamber 3314 has a circular sidewall 3320 that defines a circular recess 3322. A deformable component 3318 is located into the chamber 3314. More specifically, the deformable component 3318 includes a series of convolutions, as in the previous examples, and it is fitted into the circular recess 3322. The inside of the deformable component 3318 opens into the chamber 3312. In this fashion, the pressure in the chamber 3312 and the pressure in the inside of the deformable component 3318 is the same. However, the pressure in the chamber 3314 and the inside of the deformable component 3318 are unlikely to be the same.

The deformable component 3318 is constructed in a somewhat similar way than the deformable components described earlier, in that it has an end cap 3324 which is sealed and from which runs a drive rod 3326. The drive rod 3326 connects to a strain imparting member 3328 to which is mounted an optical fiber 3330 (shown in dotted lines).

The operation of the pressure sensor and the strain inducing structure 3328 are similar to the operations of corresponding components described in detail in connection with the previous embodiment and for that reason the description will not be repeated. One difference is the reversal of the movement imparted to the deformable component 3318 as a result of the pressure differential. If the pressure in the chamber 3314 is higher than the pressure in the chamber 3312 (reference pressure chamber) the deformable component 3318 will collapse (works in compression) instead of tending to expand. Also, as in the previous case, the chamber that is at the reference pressure and which is isolated from the chamber 3314 houses the optical fiber 3330.

Each end of the pressure sensor 3300 is provided with a sealed passageway to allow the optical fiber 3330 to pass from one pressure sensor to another or from one pressure sensor to a connecting segment. Specifically, as shown in FIG. 36, one extremity of the pressure sensor 3300 has a small aperture 3600 in which the optical fiber 3310 is threaded and thus enters the chamber 3312. This aperture can be sealed with adhesives, electroplating or by brazing. Similarly, the other end of the pressure sensor 3300, as shown in FIG. 35 has an aperture 3500 to allow the optical fiber 3330 to leave. Similarly, the aperture 3500 can be sealed once the optical fiber 3330 has been inserted there through to create a fluid tight seal. In this fashion, the optical fiber 3310 enters from one end of the pressure sensor 3300 and leaves from the other.

During manufacture a segment of optical fiber is attached to the strain imparting structure 3328 by using adhesives, mechanical fasteners, electroplating, brazing or any other suitable technique. The optical fiber segment 3330 is threaded through the apertures 3600 and 3500, which subsequently are closed by adhesive or any other suitable medium. The optical fiber leads are then spliced with the upstream and the downstream optical fiber segments such as to create a continuous optical path along the entire length of the sensing array. In this fashion, the same optical path is shared with all the pressure sensors 3300. To disambiguate measurements and be able to identify the location of each measured pressure value, suitable multiplexing techniques can be used. In this fashion, a pressure measurement can be associated with a particular pressure sensor 3300. Since the location of the pressure sensor 3300 in the sensing array is known, it becomes possible to map the pressure measurement with the geographical location where that measurement has been taken.

It is also possible to use more than one optical fiber in the sensing array, where one fiber measures temperature and the other pressure.

Note that since each pressure sensor 3300 has its own reference pressure chamber 3312 which is individually sealed, those pressure chambers do not need to all be at the same reference pressure. Applications may exist where the chambers of individual pressure sensors may be set at different reference pressures.

The sensor array 1800, especially when it uses the pressure sensor 3300 is modular in that it is made up of several modules, connected to one another in series to form the elongated sensing structure. Each module may be provided with pressure and temperature sensing capabilities. The temperature sensor can use a Bragg grating located on the optical fiber 3330 run in the chamber 3312. The use of modules allows building long sensor arrays from standardized components.

In use the sensor array 36, 1800 is inserted into the production well 20 and it is held there during the operation of the well. In other words, the installation of the sensor array 36, 1800 is permanent and it is used to generate pressure and temperature data during the operation of the well and while heavy oil flows out of the production well 20. In a possible variant, the sensor array 36, 1800 can be temporarily inserted in the subterranean formation to take measurements and then removed to be re-inserted again later or to be used in a different subterranean formation.

As discussed above, owing to the small outer diameter of its outer casing, the sensor array 36, 1800 can be inserted easily in the well and does not impede in any significant manner the flow in the well.

Also, the small outer diameter of the outer casing of the sensor array 36, 1800 facilitates transportation of the sensor array to the well's site. For example, in some embodiments, the sensor array 36, 1800 may be wound on a reel (e.g., a spool) transported to the well's site by a truck or other vehicle. Due to the small outer diameter of the outer casing of the sensor array 36, 1800, a continuous length Ls of the sensor array 36, 1800 wound on the reel may be relatively long. For instance, in some examples, the continuous length Ls of the sensor array 36, 1800 wound on the reel may be at least 100 meters, in some cases at least 500 meters, in some cases at least 1 kilometer, in some cases at least 2 kilometers, in some cases at least 3 kilometers, in some cases at least 4 kilometers, in some cases at least 5 kilometers, and possibly even more (e.g., tens of kilometers). The reel has an outer diameter Dr measured with no length of sensor array wound thereon. For instance, in some examples, the outer diameter Dr of the reel may be less 1.2 meters, in some cases less than 1.1 meters, in some cases less than 1.0 meter, in some cases less than 0.9 meters, and in some cases less than 0.8 meters. A long continuous length Ls of the sensor array 36, 1800 may thus be wound on a small diameter reel. For instance, in some examples, a ratio Ls/Dr may be at least 2 kilometers of length of the sensor array per meter of outer diameter of the reel, in some cases at least 3 kilometers of length of the sensor array per meter of outer diameter of the reel, in some cases at least 4 kilometers of length of the sensor array per meter of outer diameter of the reel, in some cases at least 5 kilometers of length of the sensor array per meter of outer diameter of the reel, in some cases at least 6 kilometers of length of the sensor array per meter of outer diameter of the reel, and in some cases at least 7.0 kilometers of length of the sensor array per meter of outer diameter of the reel, and possibly even more (e.g., 10 or more kilometers of length of the sensor array per meter of outer diameter of the reel). The outer diameter of the outer casing of the sensor array 36, 1800 can allow the sensor array 36, 1800 to be wound on the reel such that the sensor array 36, 1800 has a small radius of curvature. For instance, in some examples, the sensor array 36, 1800 may be bendable to acquire a radius of curvature of less than 20 inches, in some cases less than 15 inches, in some cases less than 10 inches, and possibly even less, without damaging the sensor array 36, 1800.

Figure 14A:
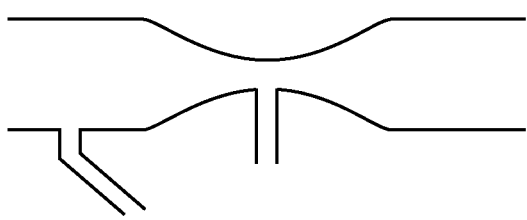
FIG. 14a is a schematical illustration of a flow meter in which the pressure sensor illustrated in FIGS. 12a and 12b can be used.

The sensing array 36, 1800 produces co-located pressure and temperature profile information. In a possible variant, flow rate information can be obtained by measuring a pressure differential between two spaced apart locations in the body of heavy oil flow through the production well 20. This arrangement is shown in FIG. 14*a*. The production well 20 is provided with a narrowed section 1400. A sensor array 36, 1800 passes through the production well. Assume that the array 36, 1800 has a first pressure sensor 1402 on one side of the narrowed section 1400 and another pressure sensor 1404 on the other side of the narrowed section 1400. The arrangement is such that the pressure in the production well can be determined on each side of the narrowed section which provides a pressure differential value that can be directly related to the flow rate.

Figure 14B:
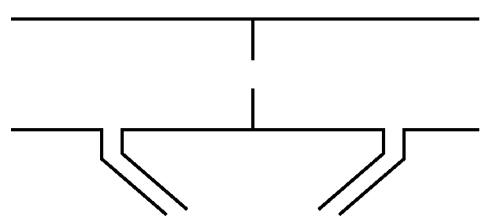

FIG. 14*b* provides another example of production well arrangement with an internal constriction 1406 that can be used to measure flow rate.

While an internal constriction such as the one shown in FIG. 14*b* or the narrowing shown in FIG. 14*a* may not be ideal since they would reduce the flow of heavy oil in the production well 20, the concept can be applied to any area of the production well where a pressure drop is known to occur. For example a bend in the production well is likely to generate a pressure drop and that pressure drop, albeit minimal can be measured with the pressure sensor according to the invention in order to determine flow rate.

Note that the pressure sensor described earlier in connection with SAGD and other oil/gas operations can also be used in other applications unrelated to the oil/gas industry.

Referring back to FIG. 3 a sensor array 40, similar to the sensor array 36, 1800 is laid in the horizontal section 28 of the production well. In the example shown, the sensor array 40 includes co-located pressure and temperature sensors, forming sensing pairs 42*a*, 42*b* . . . 42*n*. The sensing pairs 42*a* . . . *n* are placed at known intervals from one another. In a specific embodiment the spacing is constant and it is the same as in the case of the sensing pairs 38*a* . . . *n*. Also, the sensing pairs 42*a* . . . *n* are located at known positions with relations to a reference point of the production well 20. In this fashion, when a sensing pair 42*a* . . . *n*, reports a particular data and pressure values it is possible to determine the location in the horizontal section 28 where the reported temperature and pressure conditions exist.

A predetermined relationship also exists between the sensing pairs 38*a* . . . *n* and 42*a* . . . *n*. As shown in FIG. 3, the sensing pairs 38*a* . . . *n* and 42*a* . . . *n* are located such that they alternate vertically, in other words a sensing pair 42*a* . . . *n* is located at midpoint between a pair of adjacent sensing pairs 38*a* . . . *n*. This arrangement may vary, for instance the sensing pair 38*a* . . . *n*, may be located in vertical alignment with the sensing pair 42*a* . . . *n*, instead of being shifted relatively to one another.

Other variants are possible, namely:

1. The temperature and the pressure sensors may not be co-located. For example the sensor arrays 36, 40 and 1800 may be constructed such that the temperature and the pressure sensors alternate with one another, such as for example each temperature sensor is followed by a pressure sensor, a pair of consecutive temperature sensors are followed by a pressure sensor, etc.
2. The number and the spacing between the sensing pairs 38*a* . . . *n*, 42*a* . . . *n* may vary. In the example shown, the spacing between the sensing pairs 38*a* . . . *n*, 42*a* . . . *n* is constant but this may be changed to provide more or less measurement resolution in certain areas. For example, if it is desired to read the temperature and pressure with a higher resolution near the heel of the injector well 18, the density of the sensing pairs 38*a* . . . *n* can be increased in that area.

3. The sensor arrays 36, 40 1800 can include only temperature sensors or only pressure sensors or unequal numbers of each kind. Those variants will limit the type of measurements that can be obtained but in certain applications those limited measurements can suffice. For instance the sensor array 36 may include only temperature sensors while the sensor array 40, 1800 may include temperature and pressure sensors. Other permutations are possible without departing from the spirit of the invention 4. The pressure sensors can be differential pressure sensors provided, for example with a channel to reach measuring locations. The pressure sensors could also be associated to Venturi or orifice calibrated flow channel to form a flowmeter, as discussed previously.

5. Pressure sensors can be dynamic pressure sensors measuring pressure waves propagation; they could serve as geophone measuring acoustic waves propagation to determine geological composition as in seismic surveys.

The SAGD installation also includes a series of observation wells 50 that include sensor arrays 52. An observation well, in the example shown in a vertically drilled structure that extends into the steam chamber, or relatively close to it and that can accommodate a sensor array 52. Typically, an observation well 52 will not be used for steam injection or for extraction of heavy oil. The depth of an observation well can vary depending on the intended application. In the example shown, the observation wells 50 extend deeply within the steam chamber and they reach the injector well 18. Variants are possible. The observation wells 50 can be less or more deep or they can be formed at varying depths, for example some observation wells 50 can be drilled deeper than other observation wells 50.

The sensor arrays 52 installed in each observation well 50 include temperature sensors located at known intervals. As in the case of the injector and producer wells 18 and 20, the position of the respective temperature sensors in the observation wells 50 is known with respect to a certain reference, such as the lower extremity of the well. In this fashion, when a certain temperature sensor reports a temperature value it is possible to determine with a relative degree of precision with position within the well where the temperature measurement was made.

The sensor arrays 52 may include, in addition to temperature sensors, pressure sensors as well. Different combinations can be considered where some observation wells 50 include pressure and temperature sensing pairs while other observation wells 50 include only temperature or only pressure sensing pairs.

The sensor arrays 52 are made in the same manner as the sensor arrays 36, 1800 and 40, namely using optical fibers with Bragg gratings to provide the pressure and temperature sensing, among other possibilities.

The sensor arrays 52, 36, 1800 and 40 include a sensing segment that includes the Bragg gratings and a non-sensing portion without Bragg gratings and whose function is to channel the optical signals for conveying the temperature and the pressure measurement data. In the case of the injection and the production wells 18, 20 the non-sensing segments extend along the vertical portions of the wells including the heels, where measurements are not made. Note however that this is a matter of design and the sensing segment can be made longer or shorter depending on the application. One example of an application where the sensing segment extends beyond the horizontal portion of the production well 20 is the case where the production well 20 includes an in-line pump (not shown in the drawings) to assist with the extraction of the heavy oil. In such applications, it may be desirable to obtain measurements within the pump, such as the temperature of the heavy oil in the pump, the temperature of pump components, pressure values or both. In such scenario, the sensing segment can be extended from the entire horizontal portion of the production well 20, through the heel thereof and up to a point where it reaches the pump. Alternatively, two serial sensing segments can be provided where one is located at the area of the pump while the other is located at the horizontal section of the producer well 20.

Figure 4:
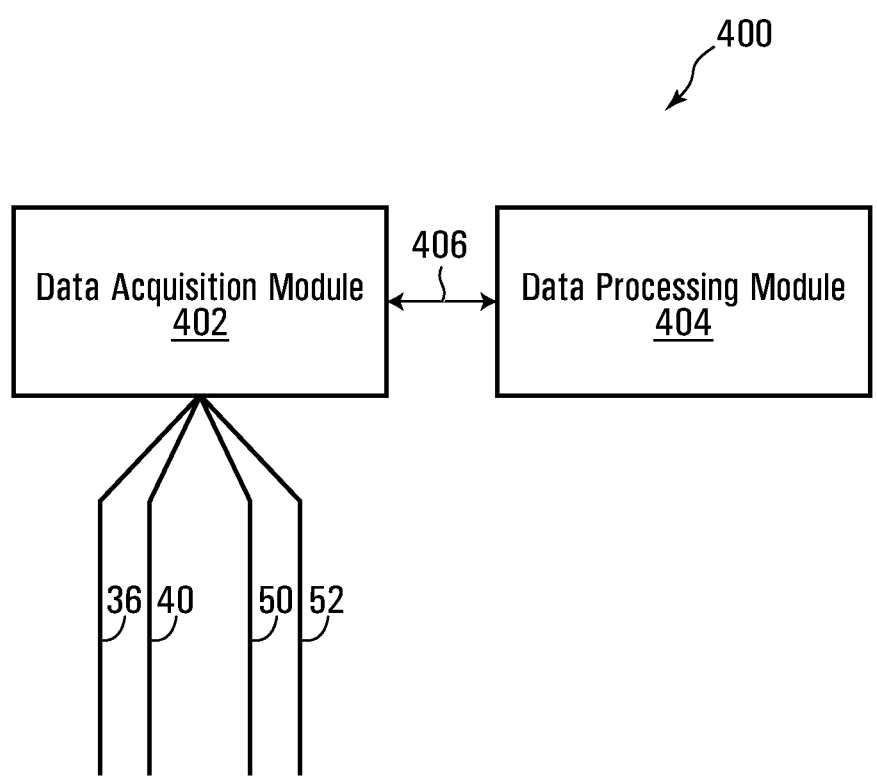
FIG. 4 is a block diagram of a data acquisition and processing system for use with the SAGD installation in FIG. 3.

As best shown in FIG. 4, the sensor arrays 36, 1800, 40 and 52 all connect to a data acquisition and processing system. Typically the data acquisition and processing system would be located above ground; however it is possible for fully automated installations to locate the system below ground. The data acquisition and processing system 400 includes a data acquisition module 402 and a data processing module 404. The data acquisition module 402 connects to the sensor arrays 36, 1800, 40 and 52 and derives from those sensor arrays temperature and pressure data. More specifically, the data acquisition module 402 includes the optical and electronic components to inject an optical interrogation signal in the sensor arrays 36, 1800, 40 and 52 and to sense the responses to the optical interrogation signals.

The responses of the Bragg gratings to the interrogation signal can be derived by sensing Bragg grating reflections or transmissions in the optical fiber. The reflection approach is generally simpler since the sensing element, the one picking up the signal reflection is collocated with the optical source, the one generating the interrogation signal. A transmission approach would also theoretically work but it requires for each sensor array 36, 1800, 40 and 52 a second optical path, to convey to the data acquisition module 402, the components of the interrogation signal transmitted through the Bragg gratings. The second optical path can be a second optical fiber running in parallel to the one containing the Bragg gratings. Both optical fibers are coupled to one another at their extremities that are remote from the data acquisition module 402.

In a specific form of implementation, frequency multiplexing is used for distinguishing the responses of the various Bragg gratings from one another. Each Bragg grating in the sensor arrays 36, 1800, 40 and 52 is tuned to operate within a specific frequency window. By "frequency window" is meant a frequency range in which the response of the Bragg grating can vary depending on the strain applied to the optical fiber. By sending an optical interrogation signal that has a frequency range spanning all the frequency windows, all the Bragg gratings are in effect interrogated. The combined responses of the Bragg gratings are received substantially simultaneously by the data acquisition module 402 where they are de-multiplexed, such as by passing then through filters, to separate them. Since each Bragg grating operates in a distinct frequency window, isolating that frequency range from the other frequencies allows determining the degree of strain applied on the optical fiber at the location of the Bragg grating. The degree of strain is the deviation of the frequency response in the window with respect to a certain frequency reference point.

The output of this process is therefore a series of strain values associated to respective frequency windows. A map is provided in the data acquisition module that correlates the frequency responses to respective locations of the Bragg gratings in the sensor arrays 36, 1800, 40 and 52, such that it is possible at that point to determine the position of the Bragg grating that has produced a given strain value. The position can be expressed in three dimensional coordinates or with relation to a certain reference point, for example, 15 feet aft of the heel of the injector well 18, or in any other suitable manner.

Once the data acquisition module 402 has mapped the strain values to respective Bragg gratings, the strain values are then converted to temperature or pressure measurements. In most cases a linear relation exists between each read strain value and the corresponding temperature. In the case of pressure, the relationship is not so direct since the strain acting on the optical fiber is the combined result of temperature and pressure effects. However, since the strain resulting from temperature is generally known, especially in the case of collocated sensing pairs, the strain induced in the optical fiber as a result of pressure can be computed, thus deriving a pressure value.

The various optical and electrical components used in the data acquisition module 402 used to perform the functions described above are generally known and it is not deemed appropriate to further describe these elements.

The output 406 of the data acquisition module 402 therefore generates a stream of pressure and temperature values correlated to location information associated with those measurements. This represents a profile of temperature and/or pressure values in the subterranean formation established along the sensor array. The level of granularity of the temperature and/or pressure profile is dependent on the spacing between the individual sensors in the sensor array. The format in which those temperature, pressure and location values are output can vary without departing from the spirit of the invention. In a simple example, the output format can be a table format mapping a location data, expressed as three-dimensional coordinates, temperature and/or pressure value and also a time stamp, the time stamp indicating the time at which the temperature and/or pressure where read.

Figure 5:
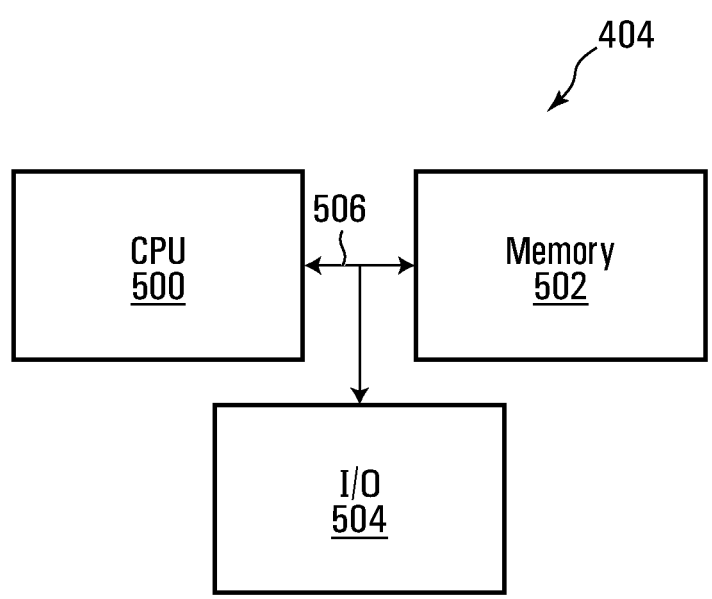
FIG. 5 is a block diagram of a data processing module of the system shown in FIG. 4.

A more detailed block diagram of the data processing module 404 is shown in FIG. 5. The data processing module has a computer based platform and includes a Central Processing Unit (CPU) 500, a machine readable storage 502 also referred to as "memory", an Input and Output (I/O) module 504. The CPU 500, the memory 502 and the I/O 504 communicate with one another via a data bus 506. The memory is encoded with the program instructions that are executed by the CPU 500 to process the temperature and/or pressure values output by the data acquisition module 402. The temperature and/or pressure values are supplied to the data processing module 404 via the I/O 504. Results of the processing are output also via the I/O 504. The results of the processing may displayed on a monitor, printed on paper, or conveyed in any other suitable way to an interested party. The processing that is performed on the temperature and/or pressure data by the processing module 404 is an analysis of the subterranean formation that uses principles of mass, energy or momentum conservation. The subterranean formation is a closed structure and by accounting for mass/energy/momentum entering or leaving the closed structure, it is possible to develop a model of the structure to characterize it from a structural point of view or from a dynamic point of view. The temperature and/or pressure measurements provide data points at known locations in the closed structure that register events, such as mass/energy/momentum changes in the fluid in the closed structure. Those changes can be used to derive useful information.

Figure 37:
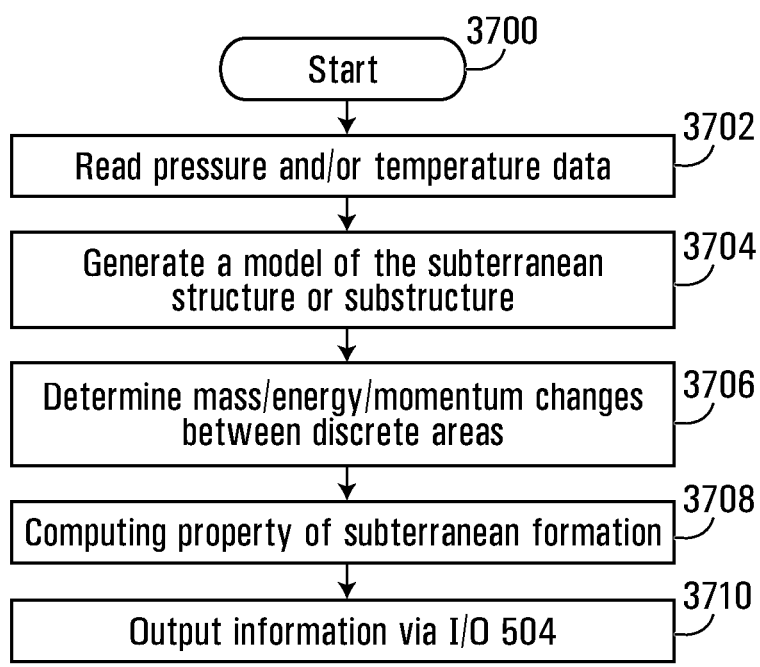
FIG. 37 is a flowchart illustrating the main processing steps performing an analysis of a subterranean formation.

The process is described in greater detail in FIG. 37 which is a flowchart that represents the various steps of the program stored in the machine readable storage 502 and executed by the CPU 500. The process starts at step 3700. At step 3702 pressure and temperature data are collected from the sensor array 36, 1800, 40 and 52, as described earlier. Note that while the sensor array 36, 1800, 40 and 52 is only used as an example; it is possible to use different data collection technologies without detracting from the spirit of the invention.

At step 3704 a model of the subterranean formation is generated. The model is a collection of data that normally resides in the machine readable storage 502. The data is a three dimensional representation (in any suitable format) of the subterranean formation, or a sub-structure thereof, sub-divided in discrete areas. The collected temperature and/or pressure values are assigned to the various discrete areas. Accordingly, the three-dimensional model of the subterranean formation depicts temperature and/or pressure variations in the underground fluid from one discrete area to another.

The subdivision of the subterranean formation into discrete areas is closely tied to the actual sensor array 36, 1800, 40 and 52 and its placement in the subterranean formation. It is generally desired to associate at least one sensor in the sensor array 36, 1800, 40 and 52 with a discrete area, thus in most instances there will be at least as many discrete areas as there are individual sensors in the sensor array 36, 1800, 40 and 52. For applications that require a pressure data point and a temperature data point for each discrete area, the number of discrete areas will be associated with at least a pair of individual sensors.

The relative orientation of the discrete areas will depend at least to some extent to the orientation of the sensor array 36, 1800, 40 and 52. With reference to FIG. 3, which shows an SAGD type installation where sensor arrays are placed in the production and the injection wells 18, 20 the subterranean formation is effectively divided into discrete areas that join each other along respective planes which are generally perpendicular to the direction of extent of the sensor arrays. In this example, the discrete areas are analogous to vertical slices taken through the subterranean formation, which in this case is the tar sand reservoir. The relationship between the actual sensors and the boundaries of the slices can vary. One possibility is to position the slices in the model such that the boundary between two adjacent slices coincides with a sensor or to position the slices such that a sensor is located in the center of the slice or in any other position that is remote from the edges of the slice.

For arrangements where the sensor array runs generally vertically, as is the case with sensor arrays 50, the subdivision of the tar sand reservoir can be done in a similar way with the exception that the slices are made generally horizontally.

The reader skilled in the art will appreciate that there are other possible ways to divide the subterranean formation into discrete areas. For instance, the discrete areas do not need to be of uniform size or shape or all sliced in the same orientation. The subdivision process is likely to be specific to each individual extraction installation.

The modeling operation can also be applied to sub-structures of the subterranean formation, not always to the entirety thereof. Examples of sub-structures include conduits in which fluid flows. In the context of an SAGD installation, the injection and the production wells 18, 20 are conduits can be modeled. Typically, a man-made conduit is easier to model since its geometric configuration is well known. A conduit has a size and boundaries that known in advance and this allows creating a precise and accurate model.

At step 3706 the mass/energy/momentum changes between discrete areas are determined. This process uses the temperature and/or pressure readings associated with the respective discrete areas. If the temperature and/or pressure readings associated with different discrete areas change, those changes reflect physical events occurring in the fluid whose temperature and/or pressure is being measured. By applying mass/energy/momentum conservation principles, it is possible to perform an analysis of the subterranean reservoir or predict future events. This is shown at step 3708. Specific examples of computations of properties of the subterranean formation will be provided later.

At step 3710, the computed information about the property of interest of the subterranean formation is output via the I/O 504. In a specific example, the output step may include displaying the information to a user via a display monitor, recording the information in a file or a log or transmitting the information for further processing or storage.

Alternatively, the computed information can be used to generate command signals to directly regulate the operations of the extraction installation.

Figure 6:
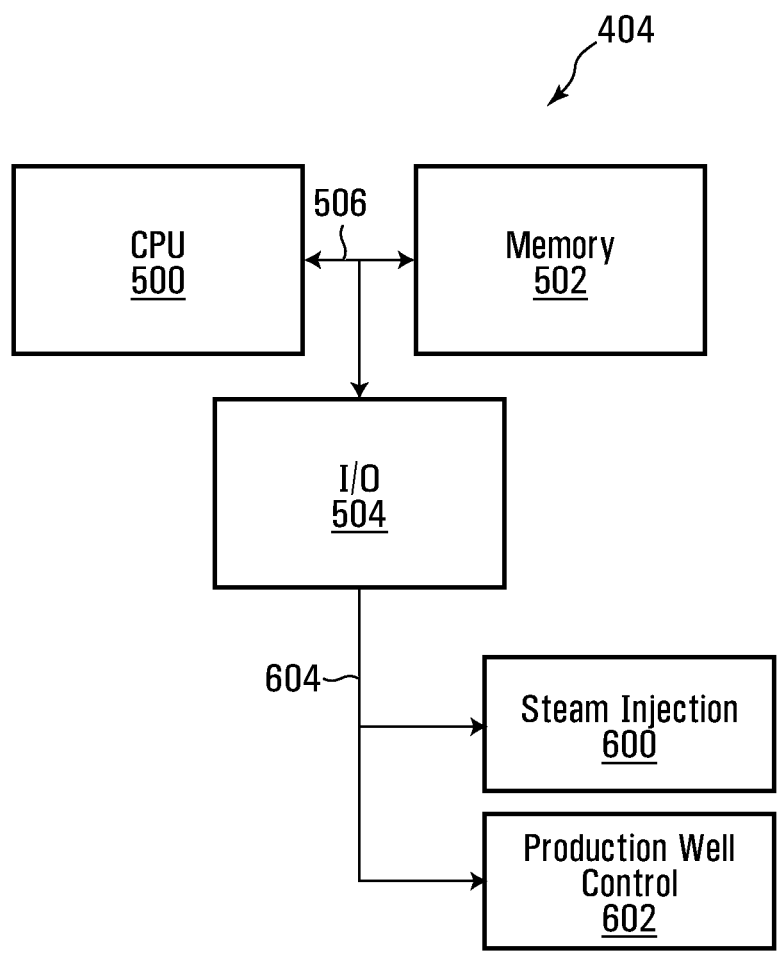
FIG. 6 is a block diagram of a data processing module of the system shown in FIG. 4, according to a variant.

A specific example of implementation of a data processing module, programmed to directly control an SAGD installation is shown in FIG. 6. The I/O 504 outputs control signals over data lines 604 that are directed to steam injection component 600 used to regulate the injection of steam into the injector well 18. Similarly, control signals are also placed on data lines 604 and directed to the production well control to regulate the operation of the production well control.

In the case of the steam injection, the control signals can vary the steam injection process. The regulation can include:
1. Start the steam injection process in the injection well 18;
2. Stop the steam injection process in the injection well 18.
3. Increase or decrease the rate at which steam is injected in the injection well 18;
4. Regulate the temperature of the steam injected in the injector well 18, such as increasing the temperature or decreasing it.

In the case of scenarios 1, 2 and 3 the control data can be applied to a suitable valve in the steam line to perform the desired operation. In the case of scenario 4, where temperature regulation is desired, the control signals are directed to the water heating device that generates the steam in order to perform the steam temperature regulation.

The regulation of the production well 20 via the control signals from the I/O 504 may involve the following:
1. starting the flow of heavy oil in the production well 20;
2. stopping the flow of heavy oil in the production well 20;
3. Increasing or decreasing the rate at which heavy oil flows in the production well 20.

The implementation of scenarios 1, 2 and 3 depends on the way heavy oil is transported through the production well 20 to the ground surface. If the oil flows solely by virtue of the pressure differential between the steam chamber the ambient pressure at the surface, a control valve may be provided in the production well 20, which can be operated by the control data generated by the I/O 504 such as to regulate the flow of heavy oil. The control valve may be located in any suitable location, typically near the ground surface. In instances where a pump is used to transfer the flow of oil, with or without steam pressure assist, the control signals from the I/O 504 regulate the operation of the pump, such as shutting the pump down to stop the flow of oil, start the pump to initiate the oil flow operation or increase or decrease the rate of oil flow by varying the speed of the pump or the selective use of gas lift.

Also, the rate of energy supplied to the reservoir, as well as its longitudinal distribution, can also be regulated in real-time according to the thermal and pressure measurements in-situ. For example, the injector well could be provided with several steam injection points spaced apart along its length. The injection points are regulated by automatic valves along it such that each injection point can be set independently to deliver a desired amount of steam. The in-situ measurements discussed earlier, namely the temperature and/or pressure measurements can be processed to derive a steam injection profile, along the length of the injector well such that the energy chamber radius or growth rate is longitudinally (with relation to the longitudinal axis of the injector well) generally uniform. Such uniform growth rate can be accomplished irrespective of geological differences in the underground. For instance, the geological parameters of the subterranean reservoir may vary along the length of injector well. The geological differences may be such that at certain locations the chamber may have a tendency to grow faster than other locations, when the steam delivery rate is constant along the length of the injector well. In such instances, the chamber is unlikely to grow in a uniform manner. By modulating the steam injection delivery profile according to the geological pattern, namely by reducing the rate of steam injection in areas that normally grow faster and increasing the rate of steam injection in the areas that normally grow slower, it is possible to grow the chamber in a more uniform manner.

In a similar fashion, longitudinal distributed heavy oil collection ports with individually controlled valves in the production wells could be used to create a determined heavy oil collection profile along the length of the production well. In this fashion, the heavy oil rate of collection will vary longitudinally; more oil will be collected at one longitudinal position of the production well than from another. In this fashion, it will be possible to maintain a desired level of melted bitumen pool all along the production well length regardless of longitudinal geological and rate of heavy oil production variations.

Another possibility is controlling the rate of steam release to insure it does not liquefy before reaching the well end, thus creating an un-heated section in the reservoir. This can be detected by a temperature reading at lower value than the phase transition (steam temperature).

Yet another possibility is controlling pumping rate of heavy oil to avoid flashing in the upstream section of the production well. As the mixture of bitumen and pressurized liquid overheated water is pumped to the surface, that mixture is subjected to a pressure drop along the flow path. If the pressure becomes too low, the superheated water will vaporize (flash) and may damage the equipment. Flashing conditions will depend on temperature, pressure and water content. The system can monitor temperature, pressure and water content and thus determine if the risk of flashing exists anywhere along a segment of the flow path. If the risk is detected an alarm can be triggered. Alternatively, the system can automatically change operational parameters to reduce the risk of flashing.

Another possible application of the system is controlling the speed and temperature of the extracted fluids to avoid overheating and damaging some system components, such as the pump.

Yet another possible application is controlling the pressure in the underground chamber by adjusting steam delivery to enable bitumen mobilization, while avoiding damage to structures close to the underground chamber. The rock cap is an example of such structure which can be damaged and literally blown away if the steam pressure exceeds the structural resistance of the rock cap. Another possible structure that can be damaged in this way is the fresh water table. If the fresh water table is close to the reservoir wall and the steam pressure is too high, the steam can puncture the reservoir wall and penetrate the fresh water table.

More generally, the data processing operations performed by the data processing module 404 can be used for different purposes in the context of the exemplary SAGD installation. Examples include:
1. In-situ monitoring of the heavy oil extraction process
2. Determination of geological parameters of the SAGD installation;
3. Reservoir field planning In-Situ Monitoring of the Heavy Oil Extraction Process The data collected by the data acquisition module 402 is processed to perform a monitoring of the SAGD installation which can be used to regulate operational parameters of the SAGD installation. Specific examples of the monitoring that can be performed include:

Determining the yield profile along the horizontal section of the production well 20.

Figure 7:
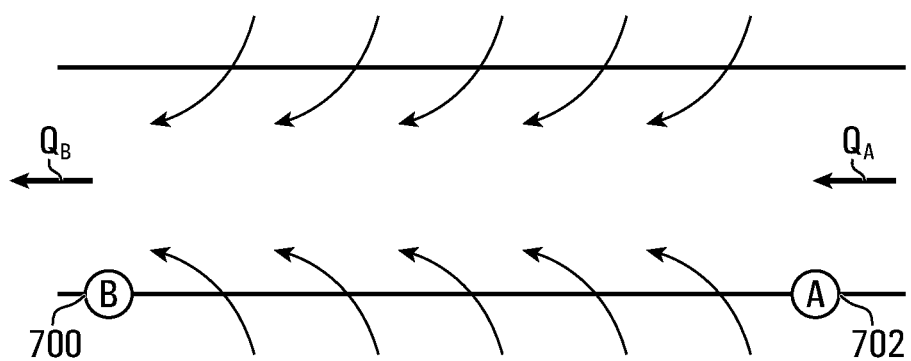
FIG. 7 is a schematical view of a section of a production well in a SAGD installation, illustrating the ingress of heavy oil in the production well.

FIG. 7 is a schematical view of the production well 20 shown in cross section, also illustrating the position of two temperature sensors 700, 702. The arrows illustrate the flow of heavy oil through the production well 20. The volumetric flow rate $Q_B$ at the location B, which is the location of temperature sensor 700 is given by the following equation:

$$Q_B = Q_A + Q_{IN} \quad (1)$$

Where $Q_A$ is the volumetric flow rate at location A, which is the location of temperature sensor 702 and $Q_{IN}$ is the volumetric flow rate of heavy oil passing through the segment of permeable lining between the locations A and B. $Q_{IN}$ can be derived from sensing the propagation of thermal transients. The thermal variation of the heavy oil passing through the production well 20 is measured by sensor 702 at location A and with a delay ($\llcorner t$) by sensor 700 at location B, but with an amplitude $T_B$. Assuming that differences in the density and heat capacity of the fluids are negligible, mass and energy balances can be expressed as:

$$Q_B \llcorner T_B = Q_A \llcorner T_A + Q_{IN} \llcorner T_{IN} \quad (2)$$

where T is the temperature. Using $T_A$ as the reference temperature, a constant flow area (S) and negligible variations of flow speed (V) in the production well 20 between the two positions (A and B):

$$Q_{av} = VS = S(A-B)/\llcorner t = Q_A + \tfrac{1}{2} Q_{IN} \quad (3)$$

This leads to a formulation to calculate the amount and temperature of fluid flowing through the perforated liner in that slice:

$$Q_{IN} = [2S(A-B)/\llcorner t] - Q_A \quad (4)$$

$$T_{IN} = [Q_A \llcorner T_B - T_A)/(2Q_{IN})] - T_A \quad (5)$$

These two equations can be solved for each slice (segment A–B) by starting by starting at a location where the volumetric flow rate is known. Once such location would be the heel where the volumetric flow rate corresponds to the volumetric flow rate produced at the surface since no additional heavy oil is introduced in the production well 20 downstream that point. Therefore, assuming that location B is the heel of the production well 20, $Q_B$ will equate the volumetric flow rate delivered by the production well at the surface. The above equations therefore allow deriving $Q_A$ and $Q_{IN}$. By working backwards (in a direction toward the toe end of the production well 20, $Q_{IN\,can}$ be determined for every segment of the production well 20 bound by temperature sensors. On the basis of the computed $Q_{IN}$ values and the associated location data in the production well 20 (segment of the production well 20 associated with a $Q_{IN}$ value) the yield profile of the production well 20 can be determined. The yield profile would show, for example, which segments of the well are the most productive.

A similar but more refined approach can also be applied by taking into account additional factors such as variations of density of the heavy oil, heat capacity, fluid flow speed and flow section. The resulting mathematical formulation would be more complex but still solvable as long as an initial parameter such as $Q_B$ is available.

Determining the steam delivery profile along the horizontal section of the injector well 18.

The approach described above could be followed to determine the profile of steam delivery along the horizontal section of the injector well 18. In this case, the amount of steam injected in the well and flowing through the heel is known (this is the amount injected at the surface). Equations 1 through 5 can be used to determine the value $Q_{IN}$, which in this example will be negative since steam is exiting the injector well 18. Here, a more refined approach that takes into account variations of density of the steam as it flows through the injector well 18 would be beneficial since steam is inherently a compressible fluid.

Determining the fluid level and composition over the length of the production well 20.

The steam chamber in the SAGD reservoir is at saturated conditions, so pressure and temperature of the chamber is usually known, it can also be measured using instrumented observation wells. In consequence, the pressure and temperature over the bitumen pool is known, the temperature and pressure at the bottom of the pool can be determine by the sensors reading in the producer well, directly when liners effect are negligible or by correcting for it. Considering that the bitumen pool is essentially composed of molten bitumen and liquid water, we can use their specific properties to determine their relative proportion using the measured temperature gradient and liquid column weight. For purpose of illustrating the principle that can be applied to compute the height ($H_{LP}$) and composition (%oil) of the liquid pool, one can assume a two phases liquid pool (water and oil) with linear variation of specific weight (⌐) and thermal conductivity (k) with composition:

$$⌐_{liquid} = \%_{oil} ⌐_{oil} + (100\% - \%_{oil}) ⌐_{water} = ⌐ P_{LP}/H_{LP} \quad (6)$$

$$k_{liquid} = \%_{oil} k_{oil} + (100\% - \%_{oil}) k_{water} = ⌐ T_{LP}/H_{LP} \quad (7)$$

Since the properties of the oil and water phases are known and both ⌐⌐$P_{LP}$ and ⌐$T_{LP}$ are measured in-situ, an easily solvable system of two equations and two unknowns: $\%_{oil}$ and $H_{LP}$, is obtained. And so, for each spatial increment (sensor in the series of sensors placed in the injector well 18 and production well 20), the height and composition of the liquid pool can be computed. If the relationships of specific density and thermal conductivity with respect to composition are non-linear, the equations would also be solvable as long as the non-linearity can be defined.

Determining the fluid incoming in the pool over the production well 20.

The calculations are made periodically to obtain average dynamic values over the calculation period, typically 1 minute. A mass balance over the pool for that calculation period can be used to determine the amount and composition of fluid that penetrate into it during that time. Equations 1 through 5 can be used to determine the value $Q_{IN}$, which correspond to the amount of fluid existing the pool, in this example we will assume that the fluid has a constant composition, the same as in the pool in the beginning of the calculation increment. By applying Equations 6 and 7 at the beginning and at the end of the calculation increment, we can determine the variation on the amounts of bitumen and water in the pool during the increment. Since, we know for each component the increase and the amount that has left the pool, we can calculate the amount that entered by a simple subtraction. More precise measurements can be obtained either by reducing the calculation time increment or by using average or integrated values during the increment in combination with iterative algorithms.

Determining the heat delivered along the injector well 18.

Equations 1 through 5 can be used to determine the value $Q_{IN}$, the amount of steam exiting the injector well 18 between two sensors and since we are using pressure-temperature sensors, we can calculate its latent enthalpy, or the energy generate during its condensation, from standard thermodynamic tables. We can then easily determine the profile of energy delivered to the reservoir by multiplying the flow rate by the calculation increment period and the average latent energy.

Determining the characteristics of the newly energized layer of the chamber.

Since the steam chamber is at saturated conditions, we can assume that there is no loss of mass or energy through it. So, all the steam existing the injector will rise to the chamber edge without mass or energy losses and then will serve to heat up the reservoir ground, heat-up its bitumen contain and mobilized it, so it flows downward by gravity into the bitumen pool, the free space liberated by the bitumen being replaced by steam. Energy balance on this newly energized layer over the calculation incremental time will equalized the amount of energy incoming to the sum of the energy consumed to heat-up the layer and mobilized the bitumen plus the energy lost on the edge of the chamber. The energy incoming is equal to the energy existing the injector, due to the saturated nature of the steam chamber, and the energy lost outside the chamber can either be calculated using a semi-infinite solid or a more complex model or be monitored by an observation well having distributed thermal sensors. Global mass balance on the calculation slice can be used to calculate the amount of bitumen liberated and the amount of water used to replace it, or the apparent porosity of the newly energized layer. The amount of water retained in the newly energized layer is simply given by the amount of steam exiting the injector well over that particular calculation slice and calculation time minus the amount of water entering the pool over the same period and slice. A similar balance can be done on the bitumen, leading directly that the amount of bitumen mobilized is equal to the amount of bitumen entering the pool. The apparent amount of energy used to mobilize the bitumen is simply the energy consumed in the newly energized layer during the calculation step divided by the amount of bitumen liberated. So, we obtain two geological parameters: the apparent porosity and the apparent bitumen mobilization energy; knowing the different geological phases composing the newly energized layer, we can calculate the dimension of this layer. Observation wells can be used to monitor the energy chamber growth and confirm the calculation; in that case, these measurements can be used to determine the layer dimension and the apparent geological properties can be used to determine more precisely the geological phases it contains and would globally give the same apparent resulting properties.

Alarm system to signal that potentially steam may be breaking through the production well 20.

Such an alarm system monitors the temperature along the horizontal segment of the production well 20 through which heavy oil is being collected. The temperature monitoring at the production well provides a series of temperature values, each associated with a certain location with respect to time. The temperature of the steam injected in the injector well 18 is also monitored. Both temperatures are compared and if they get too close to one another, which is an indicator that the steam head over the heavy oil pool approaches the production well 20, the flow rate of heavy oil through the production well 20 is reduced to avoid steam break through. This is best shown in FIG. 8 which is a schematical illustration of the SAGD installation showing the relationship between the steam head, the heavy oil pool, the injector well 18 and the production well 20.

Figure 8:
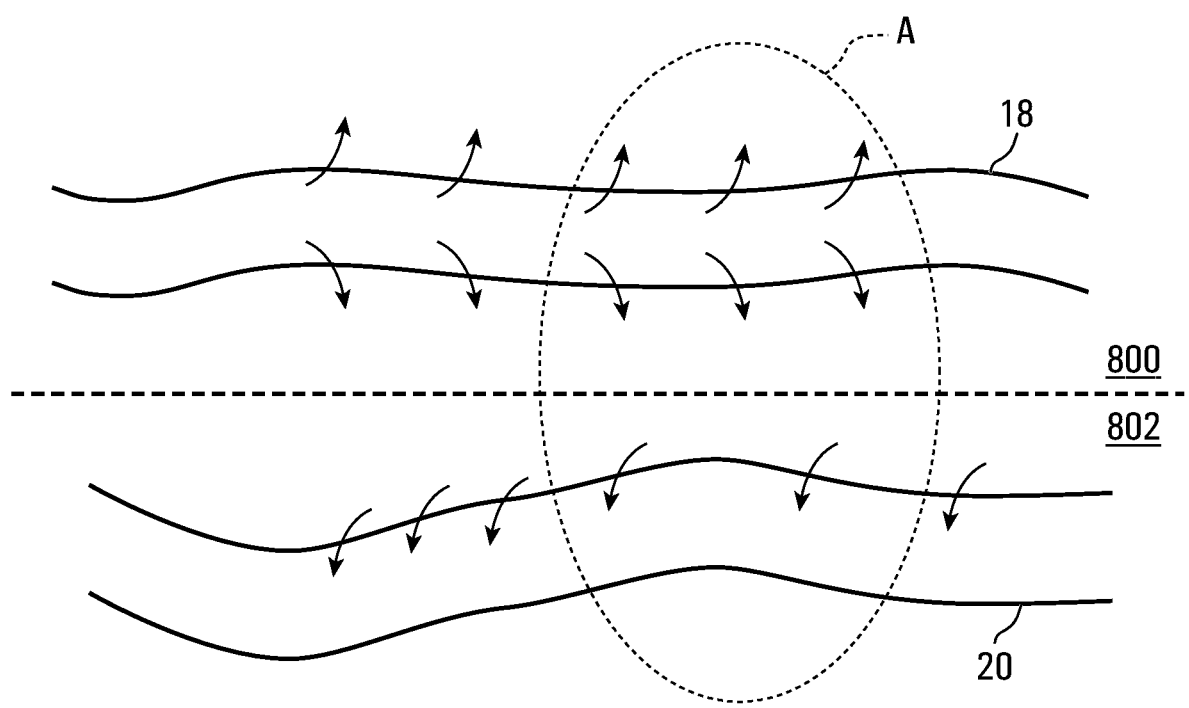
FIG. 8 is a schematical illustration of the SAGD installation showing the relationship between the steam head, the heavy oil pool, the injector well and the production well.

As FIG. 8 shows, in practice the horizontal sections of the production and the injection wells 20, 18 are rarely perfectly straight. In most cases they are of wavy nature. Accordingly, the distance that separates the injector and the production wells 18, 20 vary along the length of the wells. During the operation of the SAGD installation, steam is injected from the injector well 18 and forms a steam head 800 that sits atop a heavy oil pool 802. The pressure of the steam, acting on the heavy oil drives or at least assists with the passage of the heavy oil through the permeable lining of the production well 20. Normally, the level 804 of the oil pool remains well above the production well 18. This is the case when the rate at which heavy oil is transferred out of the pool 802 is less than or about the same as the rate at which oil flows into the pool as a result of steam mobilizing oil in the subterranean reservoir.

In instances where the rate of oil extraction has been set too aggressively and exceeds the rate at which the pool is replenished or for some reason the rate at which the pool is replenished drops suddenly, the level 804 will drop and expose a portion of the production well 20 to the pressurized steam. This will cause a steam break-through where pressurized stream can flow through the production well 20. Since the steam is at a very high temperature (in excess of 200 degrees C.), the steam flow can damage the oil production well 20 and related equipment above ground that is not designed to withstand such high temperature fluid.

A correlation exists between the temperature in the production well 20 and the level 804 of the heavy oil pool 802. In particular, when the temperature in the production well 20 approaches the temperature of the steam chamber 800, this is an indication that boundary between the steam chamber 800 and the heavy oil pool 802 is close to the production well 20.

The temperature that can be considered "critical" in the sense of indicating an imminent steam break-through will vary according to the intended application. In a first possibility, that temperature is a preset value. When the temperature of the steam chamber is well known and assumed to be generally uniform, the critical temperature ($T_C$) is set at that value, optionally taking into account a safety factor. For example, when the temperature in the steam chamber is approximately 250 degrees C., with a safety factor of 20 degrees C., $T_C$ is set a 230 degrees C. Evidently, the safety factor can vary according to the intended application and can also be omitted if desired.

In use, the temperature in the production well 20 is continuously compared to $T_C$. If the temperature exceeds $T_C$, which indicates that a steam break-through may occur, an alarm is generated to alert a human operator, and/or a corrective action is initiated. The temperature comparison process is a multi-step operation. Each temperature value from the sensor array 40 is compared to $T_C$. Since the horizontal portion of the production well 20 is not straight, hence its spacing from the steam chamber 800 boundary varies, the temperature reported by the temperature sensors 42a . . . n, is unlikely to be the same. For instance, in FIG. 8, the zone A shows a portion of the production well 20 that is closer to the boundary of the steam chamber 800 than the adjoining portions of the production well 20. The temperature in the production well 20 is likely to be more elevated in that area than in an adjoining area of the production well 20. Longitudinal variations in the rate of bitumen mobilized in the reservoir and flowing down to the bitumen pool, as well as variations in the restrictions in those specific flowing paths, also contribute significantly in the level variations along the bitumen pool. One possible monitoring strategy is to trigger an alarm when any one of the temperature values reported by the sensor array 40 equals or exceeds $T_C$. Another monitoring approach is to trigger an alarm only when a set of adjacent temperature sensors report a temperature equal to or exceeding $T_C$. This variant offers the advantage of protecting against false alarms due to a faulty sensor or a localized rise in temperature that is due to a steam-breakthrough.

Another criteria to detect potential steam breakthrough is the rate of change, either local temperature increasing or local pressure decreasing in the producer. Although the absolute value will indicate catastrophic event, the rate indicates how fast it is about to append and how much time we have to re-act or re-adjust.

Figure 9:
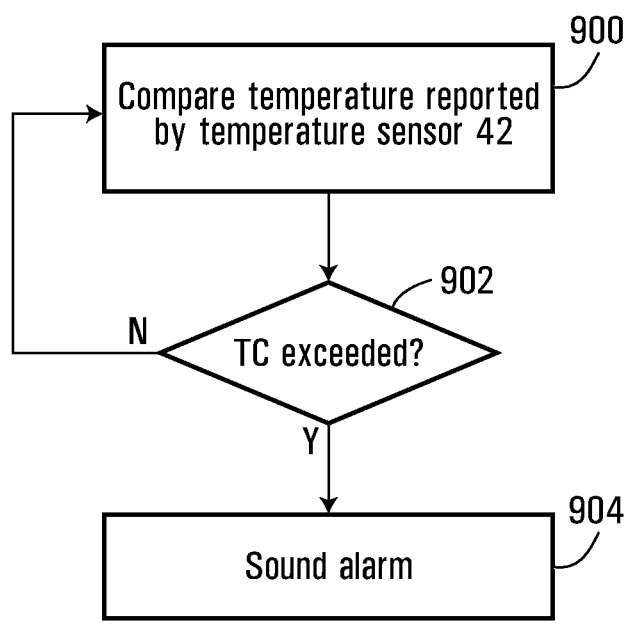
FIG. 9 is a flowchart illustrating steps of a process for monitoring the operation of the SAGD installation for steam-breakthrough conditions.

The monitoring process that would be performed by the data processing module 404 is illustrated by the flowchart at FIG. 9. At step 900 the temperature of reported by a temperature sensor 42a . . . n is compared to $T_C$. If $T_C$ is exceeded, as determined at comparison step 902, an alarm is triggered at step 904.

Otherwise, the loop continues with the comparison step 900 performed between the temperature value reported by the next temperature sensor 42a . . . n and $T_C$.

In addition to or instead of triggering an alarm, a corrective action can be implemented automatically. The corrective action can include reducing the rate at which heavy oil is being transferred through the production well 20, for in turn reducing the rate at which the pool of heavy oil 802 is being depleted. The reduction can be operated by controlling a valve in the oil path to reduce the rate at which oil flows and/or regulating the operation of a pump (reducing the pumping speed) if a pump is used to transfer the oil.

Another possible corrective action is to reduce the rate of steam injection so as to lower the pressure in the steam chamber. This can be accomplished by regulating a valve in the steam flow path leading to the injection well 18.

Figure 10:
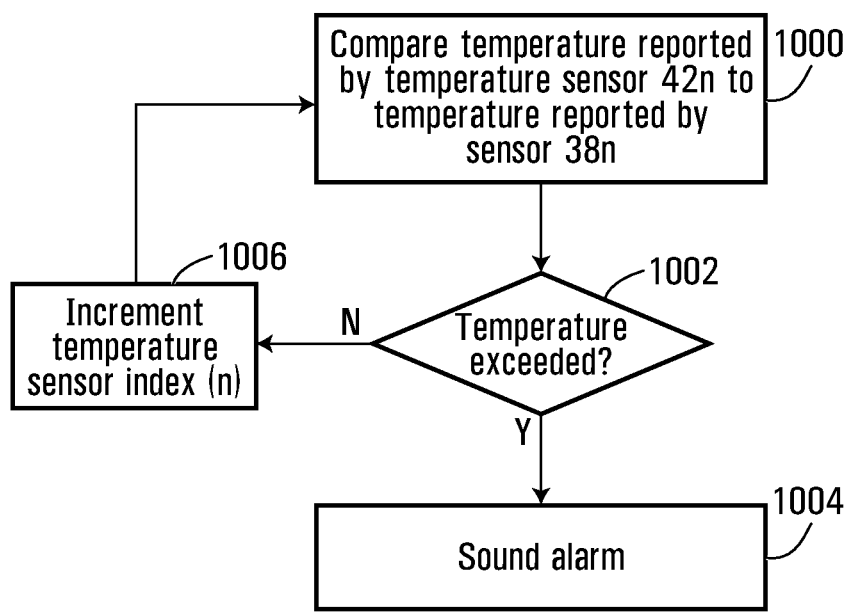
FIG. 10 is a flowchart illustrating steps of a process for monitoring the operation of the SAGD installation for steam-breakthrough conditions, according to a variant.

Another possibility that can be considered for monitoring the SAGD for steam-breakthrough conditions is to compare the temperature in the production well 20 to the temperature measured in the injection well 18. This allows a more precise temperature assessment in the steam chamber, more particularly in the area close to the boundary between the steam head 800 and the heavy oil pool 802. This approach is useful in instances where the temperature in the steam chamber may not be considered constant along the length of the injection and production wells 18, 20 horizontal sections. This approach is illustrated by the flowchart in FIG. 10.

At step 1000 the temperature between a temperature sensor 38a . . . n in the injector well 18 (say the one nearest the heel) is compared to the temperature reported by a temperature sensor 42a . . . n in the production well 20 that is in proximity to the sensor in the injector well 18. This will be the temperature sensor 42a . . . n, closest to the heel of the production well 20. The comparison can be made by taking into account a safety factor of the desired magnitude. A specific example could be 20 degrees C. Accordingly, if at step 1000 the temperature in the production well 200 plus the safety factor equals or exceeds the temperature in the injector well (step 1004) then the alarm is triggered, as shown by step 1002. If the comparing step 1004 is answered in the negative (no alarm) then the processing continues at step 1006 where the temperature sensor index in the injection well 18 and in the production well 20 is incremented. In this fashion the next run through the processing loop will compare the temperature between the next two vertically aligned temperature sensors. The process is run continuously to provide an uninterrupted monitoring. The temperature values are thus compared between vertically aligned sensor pairs, repeatedly scanning the horizontal sections of the injector and the production wells 18, 20.

As discussed in connection with the previous variant, the one using the critical temperature $T_C$, in addition to or instead of triggering an alarm, corrective measures can be implemented, including reduction of the rate at which heavy oil is transferred out of the pool 802 or the rate and/or temperature at which steam in injected in the steam chamber.

Yet another possible variant can be considered for monitoring steam break-through conditions, which senses the weight of heavy oil head above the production well 20. When the weight goes below a certain value, which means that the level 804 is dropping below a certain minimum and the production well 20 may be uncovered, the alarm is triggered and/or corrective measures are taken.

The pressure in the pool of heavy oil 802, at the level of the production well 20 or slightly above it, is the sum of the pressure resulting from the weight of the oil head and the sum of pressure of the steam head. Assuming that the permeable liner creates a negligible pressure drop, the pressure measured inside the production well 20, via the pressure sensors 42*a* . . . *n*, reflects the pressure acting on the outside surface of the production well 20.

The pressure in the steam chamber can be obtained by directly measuring the pressure above the level 804 of the heavy oil pool 802. This can be done by using a pressure sensor in any one of the observation wells 52. The pressure sensor can be identical to the pressure sensors used with the sensor array 40, namely based on a Bragg grating in series in an optical path with other Bragg gratings used to report temperature measurements. The heavy oil pressure, at any particular location is the pressure reported by a pressure sensor 42*a* . . . *n* at or near that location minus the pressure in the steam chamber.

Figure 11:
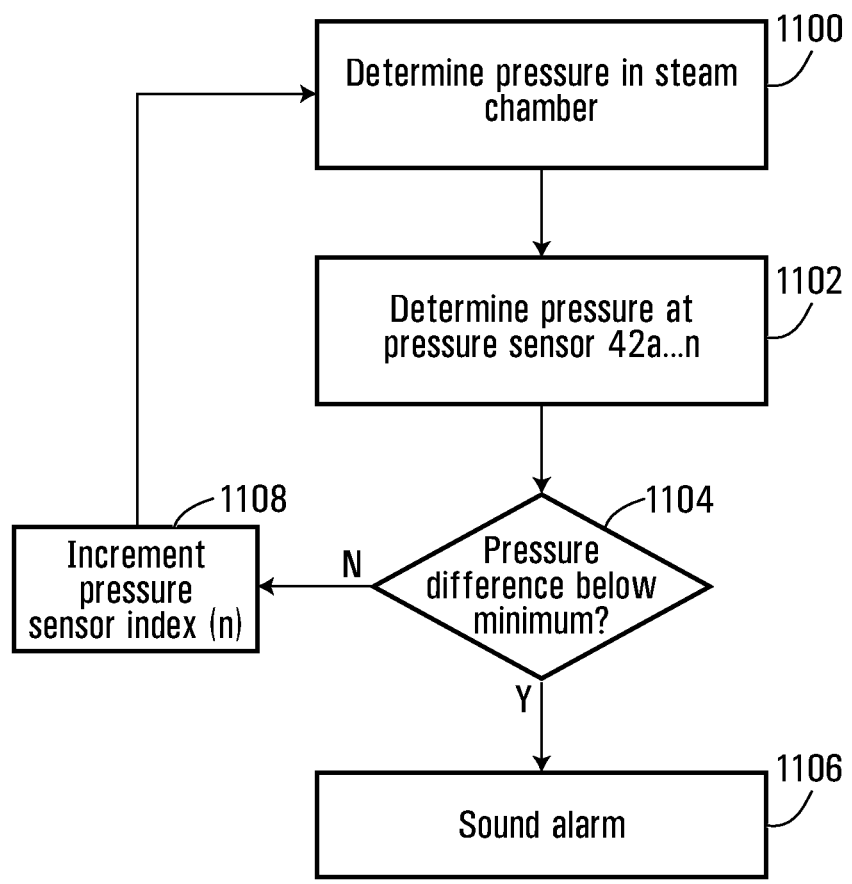
FIG. 11 is a flowchart illustrating steps of a process for monitoring the operation of the SAGD installation for steam-breakthrough conditions, according to yet another variant.

The process is illustrated best by the flowchart at FIG. 11. At step 1100 the pressure in the steam chamber is read. As indicated previously, the pressure can be measured by a pressure sensor in anyone of the observation wells 50. At the next step 1102 the pressure is read from a pressure sensor 42*a* . . . *n* in the production well. The pressure would typically be read from the first pressure sensor relative to a reference point, say the heel. The pressure readings are compared at 1104. If the pressure is below a certain minimal value, indicating that the weight of the liquid head above the production well 20 is too low for a continued operation without undue stream-breakthrough risk, then an alarm is triggered, at step 1106. In addition to the alarm or alternatively to triggering the alarm corrective actions can be initiated, such as discussed earlier.

If the pressure difference assessed at step 1104 is within acceptable limits, the processing continues at step 1108 where the pressure sensor index is incremented. This in effect sets the next iteration of the pressure monitoring to be run in connection with the following pressure sensor in the sensor array 40. The process is therefore repeated with every pressure sensor 42*a* . . . *n*, therefore scanning the entire length of the horizontal run of the production well 20 for localized pressure drops signaling the possibility of steam-breakthrough conditions.

For more accuracy, it is possible to take into account the pressure drop introduced by the permeable liner. This can be accomplished by applying a mathematic model that simulates the influence that the liner structure has on the pressure measurement read within the production well 20. The application of the model would modify the pressure reading such that the resulting pressure value will more accurately reflect the pressure acting on the outer surface of the production well. The mathematical model used may vary according to the application. One possible example is to use a model that is dependent in the volumetric flow of heavy oil through the permeable liner; the larger the volumetric flow the higher the pressure drop across the permeable liner. The value $Q_{IN}$ in the equations presented earlier represents the volumetric flow rate of heavy oil through the permeable liner. The model could therefore be:

$$P_{out} = P_{in} * A * Q_{IN}$$

Where $P_{out}$ is the computed pressure acting on the surface of the production well 20, $P_{in}$ is the pressure measured in the production well 20, A is a constant and $Q_{IN}$ is the volumetric flow rate of the heavy oil through the permeable liner.

In another possible variant the monitoring for steam-breakthrough can be made by determining the height of the heavy oil column above the production well 20 instead of looking at the pressure value.

The difference ($\bot T_{LP}$) between temperatures measured in the injector and producer wells 18, 20 can be used to compute a thermal gradient in the heavy oil pool. For purpose of illustrating the principle that can be applied to compute the height ($H_{LP}$) and composition (%oil) of the liquid pool, one can assume a two phases liquid pool (water and oil) with linear variation of specific weight ($\bot$) and thermal conductivity (k) with composition:

$$\bot_{liquid} = \%_{oil} \bot_{oil} + (100\% - \%_{oil}) \bot_{water} = \bot P_{LP}/H_{LP} \quad (6)$$

$$k_{liquid} = \%_{oil} k_{oil} + (100\% - \%_{oil}) k_{water} = \bot T_{LP}/H_{LP} \quad (7)$$

Since the properties of the oil and water phases are known and both $\bot \bot P_{LP}$ and $\bot T_{LP}$ are measured in-situ, an easily solvable system of two equations and two unknowns: $\%_{oil}$ and $H_{LP}$, is obtained. And so, for each spatial increment (sensor in the series of sensors placed in the injector well 18 and production well 20), the height and composition of the liquid pool can be computed. If the relationships of specific density and thermal conductivity with respect to composition are non-linear, the equations would also be solvable as long as the non-linearity can be defined.

The computation of the height of the heavy oil head for monitoring for steam break-through conditions may be more precise in applications where the pool of liquid at the bottom of the subterranean reservoir includes both oil and water. In such case the pressure measurement used in the previously described embodiment provides less reliable results since the weight of the liquid head may not allow readily determining how much oil remains above the production well 20. The weight of the liquid head may be only oil, only water or a combination of both. In those instances the determination of the height of the oil head may a more precise measurement.

Feed-back controlled SAGD process example.

Now that we have an approach to monitor in real time well's profiles of not only pressure and temperature, but also energy chamber growth and bitumen pool level, the wells can be equipped of distribution system of steam injection and bitumen extraction using automated valves. Fluids extraction profile can be controlled to maintain an optimal level of the bitumen pool all along the well regardless geological variations, the automated valves just have to be reacting to the calculated local pool level. In the same way, the steam injection can be controlled to maintain an optimal chamber growth rate all along the well regardless geological variations, the automated valves just have to be reacting to the calculated local chamber growth rate. Designs for automated distribution system of steam and extraction fluids exist, but in the absence of local measurands, are not used since we have no criteria to adjust them.

Expert system for SAGD process example.

The proposed approach enables a wide range of new information that serves for daily operation and also to better understand the reservoir characteristics and behavior. In consequence, it can serve as a base for an expert system continuously updating reservoir characteristic, on which simulation can be run and strategies tested for wells layout and operative scenarios. By integrating it with daily operation, this expert system can also manage the alarms and feed-back control automated operations. Integrating the two aspects, it is possible to develop or refine the geological model to take into account daily performances and also develop a platform that can display the process full life cycle (past and future as expected) to enable global optimization; it can also generate an alarm if the response differs from the expectation, enabling models and strategies update to account for it, the expert system becoming self monitoring and melting geological modeling, exploitation strategies and daily operations into a single platform forcing inter-considerations and enabling global optimization. For the geological modeling, real-time in-situ apparent porosities and bitumen mobilization energies can be combined to all other geological characterization measurements, these constitute a bank of global properties. A library of the individual geological properties of all geological phases potentially present can also be build. Then standard combination optimization algorithms can be used to determine the most representative geological phases repartition in the geological model matching the ensemble of the measured properties bank.

Figure 16:
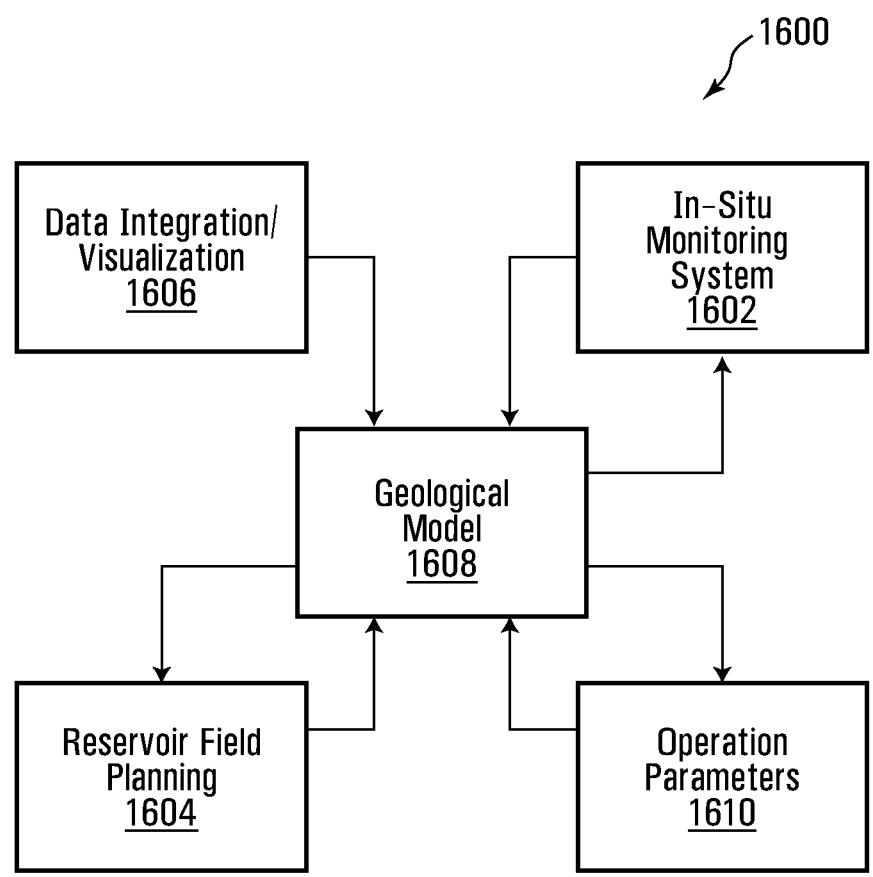
FIG. 16 is a block diagram of a computerized system for performing monitoring of an SAGD operation.

FIG. 16 shows schematically an example of such a higher level system which is an example of implementation of the invention. The representation in FIG. 16 illustrates modules that perform functions which typically would be performed by software on the basis of the temperature and/or pressure information supplied by one or more sensor arrays in the subterranean formation. The system 1600 includes the following modules:

1. An in-situ monitoring system 1602, which includes the sensor array as described earlier and the attendant data collection devices. More specifically, the in-situ monitoring system 1602 includes in this example (1) collocated pressure and temperature sensors along the injector, (2) spatially coordinated collocated pressure and temperature sensors along the producer, (3) collocated pressure and temperature sensors along vertical observation wells in the steam chamber, where all the sensor arrays are connected to the same surface units synchronizing the data acquisition. Optionally, the in-situ monitoring system 1602 can be provided with subsystems such as pump monitoring temperature sensor, chemical concentration sensors, localized flow-meters, etc.
2. A reservoir field planning module 1604 which uses the temperature and/or pressure information to make suggestions/recommendations about subterranean reservoir planning;
3. A data integration and visualization module 1606 with a SAGD simulator;
4. A geological model 1608 which describes the subterranean formation;
5. An operational parameters module 1610 with includes an alarm status management function to monitor well performance deviations from models.

The system illustrated in FIG. 16 can be used to perform the following:

1. Initial/periodic geological measurements, such as seismic surveys, core samples, LIDAR . . .
2. Real-time continuous well data logging, including temperature and pressure profiles in the injector, producer and observation wells; fluid pool level profile monitoring; computation of incremental apparent porosity and bitumen enthalpy of mobilization for newly steamed region during time step; alarms status level, such as local pool level, ESP overheating, etc . . .
3. Real-time continuous operational data logging, including steam injected temperature, pressure, flow-rate and toe/heel ratio, as well as, producer flow-rate;
4. Real-time visualization and alarm reports, including those generated by operational parameters module 1610 and also deviations from actual chamber growth and performance from the ones predicted by models;
5. Generation of geological phases data bank; well layout scenarios, including retrofits; operational scenarios, such as steaming and extraction strategies;
6. Multiple dimension, such as 4D visualization with or without history revision to include latest information; geological model, including steam chamber and fluid pool growths; performance parameters resulting from scenarios, including instantaneous and cumulative extraction rates and steam-to-oil ratios and bitumen mobilization ratios.
7. Real-time geological model corrections based on in-well measurements and including steam chamber and fluid pool growth;
8. Studies of operational scenarios, via the SAGD simulator, based on actual well conditions;
9. Planning of wells layout, including retrofits, in association to operational scenarios before and during exploitation;

10. Upgradeability to include other field measurements, even in real-time; to change in well configurations, including multi-ports adjustable injector and/or producer; to process and manage auxiliary information such as ESP aging, field containment, etc.

The system 10 can assist the operator of the extraction installation with the following:
1. lowering the sub-cool while preventing steam breakthrough through distributed monitoring in the producer;
2. well layout planning to reduce the occurrence of poor performing wells;
3. retrofitting wells planning to increase in service wells, either by adding injector and/or producer;
4. adjust operational parameters to steam chamber growth in real-time to avoid cold zone inclusions;
5. optimization tool for instantaneous and cumulative CDOR, SOR & mobilization fraction.

The examples of implementation of the invention discussed earlier using mass/energy/momentum balances on in-situ multi-point measurements of temperature and/or pressure applied to the SAGD extraction process can also be used in the context of other extraction installations. For instance, a similar approach can be used to model a VAPEX extraction process by modifying steam/water properties to include the physical properties of the solvent solution injected in the well. Cyclic Steam Stimulation (CSS) would also require a simple adaptation as this process is similar to SAGD but it uses a single well, working alternatively as an injector and then as a producer. Steam chamber growth can be monitored by applying the model for the injector during the steaming period; and bitumen and steam chamber depletion can be modeled using the producer analysis during the extraction phase; successive steaming phases would then take into account the mass and energy of steam to computationally re-build the old steam chamber, prior to monitor additional steam chamber growth with the SAGD approach.

Toe to heel air injection (THAI) processes do not use steam to energize the reservoir, but controlled internal combustion inside the well controlled by metering the amount of oxygen supplied. The multi-point temperature and pressure monitoring enables identifying the location of the combustion wave and the amount of energy it generates through combustion gases temperature and pressure. The same approach of applying mass and/or energy and/or momentum balances on successive slices characterized by thermal and pressure measurements can be tailored for specific THAI process variants. The same approach can also be used for extraction processes using buried electrodes to generate the energy to mobilize the oil. In this instance, the main advantage to monitor temperature and/or pressure along the electrode is to be able to correlate the actual energy input with predicted profiles in the extraction model. Deviations from the predicted profile allow detecting areas of the electrodes that are less effective in supplying energy, which phenomena occurs as a result of a non-uniform aging of the electrodes along their length.

Energy can also be required a subterranean formation to mobilize the geological resource not due to its high viscosity, but due to low porosity and permeability. These resources can be oil, even light oil, as in shale oil; gases, as in shale gas, sand gas or tight gas; or even heat as in geothermal wells. Two major approaches are used to extract these types of resources: water flooding, with or without solvents, and hydraulic fracturing. The invention can be used to monitor water flooding processes in a similar way as it used to monitor a liquid pool height and composition in the bitumen pool of the SAGD process. Pressure measurements can be used to determine the liquid column height and the temperature measurements can be used to determine the thermal conductivity of the liquid, and so, its composition. Also, since the temperature of the liquid used for flooding is different than the subterranean formation, a temperature wave or gradient can be monitored by the multi-point thermal measurements and used to calculate flows and contributions similar to equations (4) and (5). Specific mass and/or energy and/or momentum balances formulation, as well as multi-point temperature and/or pressure monitoring arrays will need to be adapted to specific flooding and well layouts.

Hydraulic fracturing consists in flooding a subterranean formation with pressurized fluid, usually water, containing small particles. The fluid pressure is increased until it is able to fracture the rock surrounding the well in which the pressurized fluid is being injected. The pressurized fluid enters the cracks in the rock and causes the cracks to grow. The crack growth continues until the fluid pressure drops below the rock strength. When no more fluid is injected into the well, the crack propagation stops, the fluid pressure stabilizes and fluid movement stops. The small particles carried in the fluid settle into the newly formed cracks to prevent those cracks from closing when the fluid pressure drops.

Hydraulic fracturing is usually done by pressurizing successive section along the well depth, each section separated from the other by temporary plugs, such as swellable packers. This process increases considerably the permeability of the reservoir section surrounding the well. This process is more and more used to extract oil and gas trapped in rock and sand formations, as well as to increase heat extraction in large scale geothermal energy station.

Since this process creates multiple channels having very small cross-sections, flow inside them generates both a significant pressure drop and thermally traceable signatures by either viscous dissipation for fluids or Joule-Thomson effects for gases. So, the combined ability of measuring multi-point temperature and pressure inside the well in which the pressurized fluid is injected can be used to derive flows in the cracks in addition to the flow in the well. For illustration, but without limiting the invention, a specific example will now be provided of how the invention can be applied in the context of a natural gas extraction installation using hydraulic fracturing.

Figure 38:
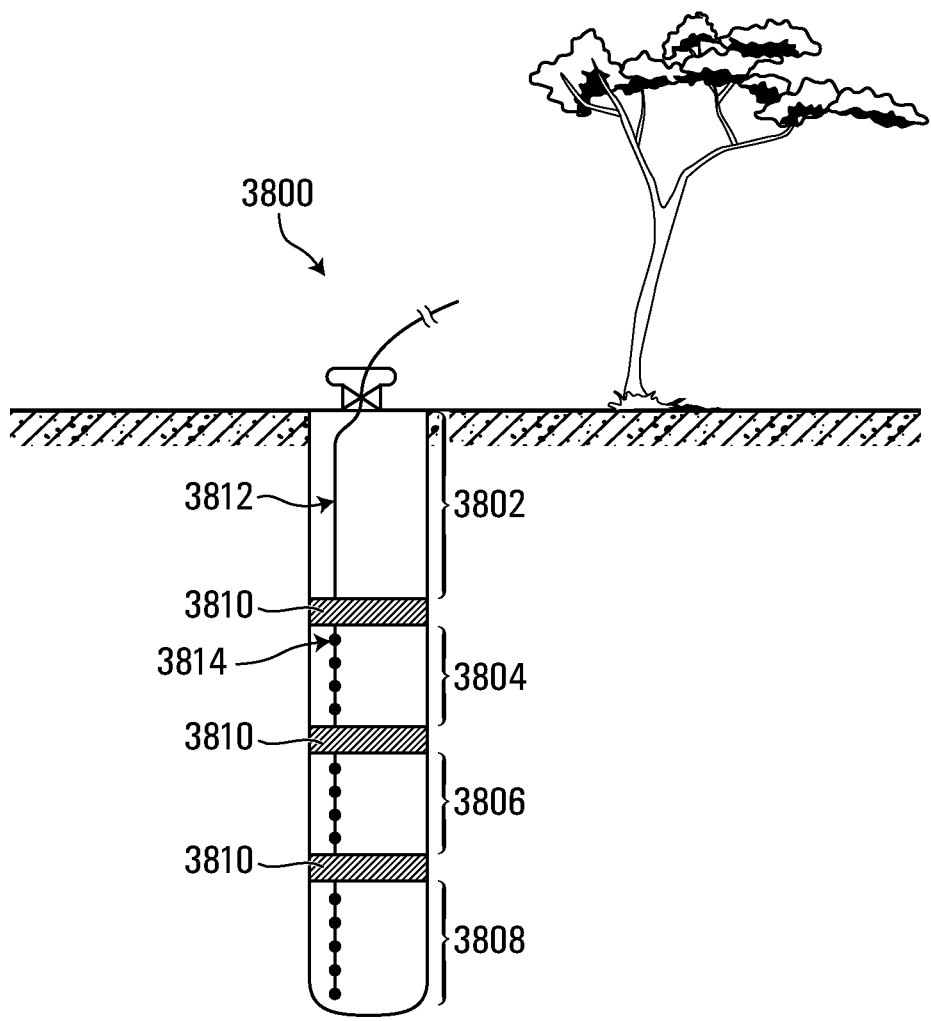
FIG. 38 is a general diagram of a shale gas extraction operation in which is used a sensor array according to an example of implementation of the invention.

FIG. 38 illustrates in cross-section a tight gas well 3800 where natural gas is trapped inside shale rock. The first portion of the well 3802, which is near the surface just serves to reach the deeper sections containing gas reserves. The following sections 3804, 3806 and 3808 are the producing zones and are separated by swellable packers 3810. A sensor array 3812 is placed in the well and extends through the zones 3802, 3804, 3806 and 3808. The sensor array 3812 includes multiple temperature and pressure sensor pairs to provide to an operator at the surface with temperature and pressure measurements at various depths in the well. The sensor pairs are identified by 3814. The sensor array 3812 is inserted through a through a pressure seal at the well head 3816.

In a specific example of implementation, the sensor array and the pressure sensor illustrated in FIG. 35 can be used for this application.

Measurement locations coincide with the locations of the pressure and temperature sensing pairs 3814, which are concentrated in the producing zones 3804, 3806 and 3803, although some sensors could also be placed in the leading zone 3802. For simplicity, this example considers that each measurement point monitors both temperature and pressure, but a different arrangement is possible where only pressure or temperature is measured, or the number of thermal sensors is different from the number of pressure sensors.

The hydraulic fracturing process is performed consecutively for each individual section 3804, 3806 and 3810. Each section 3804, 3806 and 3810 is isolated from each other by injecting fluid into the packers 3810 at each end of the selected section, the fluid causing the packers to swell and form seals. Then fracturing fluid is injected into the sealed section 3804, 3806 and 3810 until the trapped fluid pressure raises high enough to crack the rock. Once the desired level of fracturing has been reached, the fracturing liquid is removed and the swellable packers are deflated. The same process is then performed on other sections until all the producing sections 3804, 3806 and 3810 are cracked.

The hydraulic fracturing liquid contains small particles that get wedged in the newly formed cracks and prevent them to close back as the pressure is released. Pressure higher than the rock resistance is required to crack the rock, and so the sensor array 3812 should be able to sustain this high pressure while reporting accurately the pressure and without collapsing or damaging the temperature and/or pressure sensors. Preferably the sensor array 3812 is capable of sustaining outside pressure without collapsing and reporting accurately the pressure of at least 30 MPa, preferably of at least 50 MPa, even more preferably of at least 70 MPa and yet more preferably of at least 80 MPa. The pressure reporting function at those pressure levels implies that the deformable component is designed to allow for sufficient range of motion, the mechanical link is designed such that it transmits strain to the optical fiber within the range that the optical fiber can tolerate (the optical fiber will not be damaged) and structurally the assembly will be strong enough to sustain the pressure.

It is preferred to design the sensor array such that it is in fact capable to structurally resist to even higher pressure levels in the event a pressure spike arises. At a certain point, the pressure is so high that the deformable component is at the end of its range of motion (completely compressed or completely expanded) and can no longer report accurately the pressure. However, structurally, the assembly can still sustain the outside pressure. For example, it is possible to encounter pressure spikes up to 120 MPa in a well and the sensor array is designed to withstand those pressure levels without collapsing or undergo any other permanent damage. In this example, as the pressure rises above the limit at which the pressure function works, the sensor array will stop reporting accurate pressure values but once the pressure falls below that level then the accurate pressure reporting resumes.

The sensor array 3812 is inserted through the swellable packers 3810, usually passing into a slit in each packer 3810 that can swell to form a complete seal around the sensor array 3812. Small diameter sensor arrays can provide the desired crush resistance and at the same time the ability to be inserted into a swellable packer while allowing the swellable packer to achieve an effective seal. It has been found that a sensor array 3812 having transverse dimension of less than 0.60 inches works well. Preferably, the transverse dimension is less than 0.5 inches, more preferably less than 0.35 inches and most preferably is less than 0.25 inches. The transverse dimension is the maximal transverse dimension if the cross-section is not circular. An oval cross-section is an example of a non-circular cross-section. Note that it is not absolutely necessary to provide the sensor array 3812 with a constant cross-sectional dimension along its entire length. The cross-section can vary. To achieve the desired seal it is advantageous to provide the sections of the sensory array 3812 that pass through the swellable packers 3810 with a cross-sectional dimension which falls in the ranges above, but the sections of the sensor array 3812 that are located between the swellable packers 3810 can be made larger.

The multi-point pressure and temperature measurements can be used to derive a series of information at the different step of the hydraulic fracturing process.

At a pre-fracturing stage, the in-situ monitoring can be used to establish the native subterranean formaltion characteristics in term of temperature and pressure that can be used later on as a base line to evaluate flows through temperature and pressure data in the well 3800. The well drilling process can affect these native parameters by creating a pathway between the underground and the surface, and by potentially forming a skin layer around the drilled conduit. In consequence, monitoring for a reasonable time the down-hole conditions in the sealed well may be useful to enable recovering the stable conditions by letting the reservoir environment diffuse through the well skin. The in situ multi-points temperature and pressure sensors enable the monitoring of the stabilization of these conditions, even locally, to determine when the native reservoir conditions are reached. This way also, the drilling effects can also be evaluated. The formed skin thickness and permeability can be calculated by deriving the Joule-Thomson effect created by the gas flow through the skin.

For analysis purposes, the well can be modeled in consecutive horizontal slices having a pressure and temperature measurements at its center. These slices are considered uniform so the read pressure and temperature are applied on the whole volume of the slice. In this fashion, it is possible to calculate the mass of gas that each slice contains at every chronological increment. This application of the mass conservation theory implies that the mass flow rate in the skin during that chronological step is equal to the variation of mass in this slice divided by the duration of the chronological step. The mass flow rate can be supplied to the momentum balance in the skin as well as the pressure and temperature on both sides of the skin; on the well side, the average pressure and temperature during the chronological step; and on the reservoir side, the temperature and pressure obtained after reaching equilibrium. The momentum balance can then be combined with the energy balance in the skin which is characterized by the friction dissipation and Joule-Thomson effects as parameters; one could also include a parameter for the skin thermal specific heat. For the calculate flow rate, only one set of flow conduit length and cross section will solve simultaneously the momentum and energy balance. This method enables obtaining the skin permeability and thickness profile.

Once the skin layer profile is modeled, it can be matched to the drilling operational data to deduce the drilling effects and potentially control them for adjacent future wells. If adjacent wells exist, correlating the new well's instrumentation response to operational changes observed in the adjacent wells can be used to determine inter well communication effects.

These effects can be quantified using a reservoir model and even allow adjusting to more realistic values the permeability and porosity used in the model.

During the hydraulic fracturing operation, the presence of in situ thermal and pressure monitoring sensors can be used for a number of purposes. As discussed earlier, hydraulic fracturing is usually done successively on specific zones by confining the pressurized fluids into a specific zone, by using swellable packers. Monitoring for temperature and/or pressure changes in the adjacent zones serves to validate that there is no leakage, or to quantify the level of leakage, through the swellable packers. Since the temperature of the pressurized fluids is different than the one the reservoir, fluid migration is indicated by sensing a moving the thermal front, which indicates that leakage is present. Since the flow rate of the fluid injected in the well and the well dimension are known, the mass balance can be expressed with equations similar to equations (4) and (5), thus quantifying leakage. Pressure measurements on both sides of the swellable packers, associated with the calculated flow rate, can be used in a momentum balance computation to determine the leaking channel cross-section. Similarly, both type of measurements, associated with similar balances, can be used inside the zone being hydro-fractured to monitor the cracking fluid progress and coverage of the zone.

As the amount of fluid injected in the zone increases, its pressure also increases until it reaches the surrounding rock ultimate cracking value. When this value is reached, cracks start to form in the rock and the pressure suddenly drops a bit as the fluid penetrates in the newly formed cracks. Since the mechanical properties of the rock usually vary slightly along the well and pressure stabilizes rapidly inside the zone, the weakest rock fraction will tend to crack first, weakening it even more. In consequence, the natural tendency is to create long, large and numerous cracks in the weakest rock and little to none in the strongest rock. This creates very permeable pockets in an almost unchanged permeability reservoir, resulting in a poor extraction.

Real-time dynamic computation on the basis of pressure and temperature profiles in the pressurized zone (updated at the appropriate time interval), enables to determining where the cracks are created and where the fluid went, and to adjust fluid injection and pressurization accordingly to reach ultimate rock pressure at the strongest side before the cracks created in the weakest portion reach too far. This real-time feedback loop permits obtaining much more uniformly cracked zone in term of permeability, so as to mobilize a higher fraction of the gas trapped in the reservoir. One important step is to insure that cracking fluid is pressurized uniformly throughout the zone before the weakest crack is formed, so a slow injection rate is preferred during this phase. Once the rock starts cracking, an immediate fast pressurization permits to reach fracture stresses for the strongest rock portion prior a too far propagation in the weakest rock, and so to initiate cracks all along the zone. The uniformity of crack propagation is then controlled by adjusting fluid injection on the basis of the monitored thermal and pressure profiles.

Since the fracturing fluid contains small particles, such as fine sand, to prevent the created crack to close down, these small particles can create plugs that clog up flow in the supplying line, the well or the newly formed cracks. Here again, in situ monitoring of temperature and pressure can be used to determine flow profiles, and so, detect clogging. Once a clog is detected, fluid injection pulsation can be used to create pressure wave to break down the plugs, since these fluids are almost incompressible, sudden increases of fluid injection rate have a hammer effect. Since, the in situ monitoring permits determining the flow of fluid entering in the cracks along the zone, it is possible to calculate the profile of the volume of cracks created using local mass balances. The dynamic analysis of the pressure and temperature variations in each modeling slice enables determining the length of the cracks. If there are instrumented adjacent wells, their potential thermal and pressure responses can also be used to determine if partial communication has been created between the wells, and so, determine newly created cracks length and concentration. Finally, the amount of energy supplied to the well can be calculated.

When the hydraulic fracturing is performed, pressure is released by letting the cracking fluid expand in the newly formed cracks. Once again, the in situ thermal and pressure monitoring enables computing information by using mass, energy and momentum balances. In a first rapid step, fluid will exit to release extra pressure (excess pressure over the pressure in the native well); during that phase, there will be almost no fluid motion in the cracks. Once the fluid pressure drops under the reservoir pressure, the gas will start to push the liquid out of the cracks and exit to the surface. This motion can be monitored since, the gas and liquid are usually at very different temperatures. In addition, since the cracks form long and narrow channels, viscous energy dissipation occurs as a result of the liquid flow, causing a thermal increase at the well side of the cracks. The level of thermal increase is a function of the crack length and its cross-section. As the liquid exits the crack, the effective length decreases, and so does the viscous dissipation. Once all the fluid has been expulsed from the crack, only the gas flow remains, which can be modeled as gas flow in a pipe between the reservoir pressure and the well monitored pressure. Mass, energy and momentum balances can be applied on this pipe flow considering a constant reservoir pressure, viscous dissipation, Joule-Thomson and integrated volumetric well flow rate to compute the crack length and cross-section. These calculations can be performed on a slice by slice section containing individual monitoring points or on a fractured global reservoir model with three dimensional porosity and permeability.

After the release of the fracturing fluid, the well will simply release the gas under reservoir pressure to the surface through the cracks and the well. The restricted flow in the cracks will drive the process, the flow in the well being quasi uniform except for the gravity component. Once again, the flow in the cracks can be modeled as flow in a pipe between reservoir pressure and well monitored pressure, but this time the reservoir pressure cannot be considered constant; rather it can be considered as a fixed volume reservoir. Mass balance on this fixed volume considering the flow rate in the cracks as a negative component will determine its pressure drop chronological profile (pressure drop over time). Similar mass, energy and momentum balances as discussed before can be applied on this pipe flow model considering a constant reservoir pressure, viscous dissipation, Joule-Thomson, integrated volumetric well flow rate, previously established crack length and cross-section. By combining these to the mass balance of the fixed reservoir volume, dimension of the pocket of mobilized gas, as well as gas quantity it contains, the gas that can flow out through the crack can be obtained. This can be used to establish the global production of the fractured well and to update the reservoir model. From the updated reservoir model the layout of future adjacent well can be planed.

During the lifetime of the well, the in situ monitoring can serve additional purposes. As mentioned before, the in situ instrumentation response during adjacent wells fracturing can be used to determine the lengths of the newly created cracks in this adjacent well and the level of communication they create between the two. This information can be used to control the fracturing process of the adjacent well to mobilize the desired section of the global reservoir. Continuous monitoring of the depletion of fractured section surrounding the well and the calculated liberated gas pockets can be used to detect cracks clogging or collapsing that could re-trap the desired reserves and calculate their amount. Dynamic behavior of those events can be used to segregate between clogging by heavier hydrocarbons and cracks collapsing. Knowing the amount of re-trap reserve and the trapping mechanism are important informations to decide on the relevance of either cleaning the well with solvent solution to un-clog the cracks or to perform another hydraulic fracturing to reopen collapsed cracks. Having thermal and/or pressure profiles enables locating where these remedial operations are required instead of risking of increasing the permeability all along the well and creating undesired inter-well communications or extending its reach over the desired section of the global reserve.

Integrating all these in situ and balances into a field level reservoir model enables the operator to optimize his well layout and hydraulic fracturing operations to minimized capital and energy to extract the maximal gas percentage out of the reserve. It can also be used to insure that the hydraulic fracturing will not liberate hydrocarbons resource into surrounding environment, especially water tables; nor weaken the ground structure and liberate the trapped hydrocarbons by soil settling.

The examples provided earlier should not limit the scope of the invention as many variants are possible. The invention allows performing multi-point measurements along the well to generate profiles instead of average values. Combined with the mass and/or energy and/or momentum balances, profiles of geological behaviors can be generated which enables the detection of energy thief zones and energy storage zones, as well as quantifying sectional contribution to the production and resource three dimensional mapping. Using a high frequency multi-point monitoring system enables detecting dynamic events propagation and calculates flows of material and energy using the balance equations. This innovative approach can be applied on almost any type of geological formation, but is especially useful for processes using energy to mobilize the desired resources since it permits to quantify both delivered energy and liberated resources profiles along the well.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. An apparatus for measuring pressure, comprising:
a deformable component disposed in a casing between an internal volume of the casing and another volume in fluid communication with an environment external to the casing;
an optical fiber disposed in the internal volume of the casing; and
a mechanical link disposed in the internal volume of the casing and coupled between the optical fiber and the deformable component, such that a deformation of the deformable component due to a pressure differential between the internal volume of the casing and the other volume is configured to cause a first motion of at least a first portion of the mechanical link and a strain in a portion of the optical fiber, wherein:
a magnitude of thermal expansion of the mechanical link in a direction is similar to a magnitude of thermal expansion of the optical fiber in the direction;
a coefficient of thermal expansion (CTE) of the mechanical link differs from a CTE of the optical fiber; and
a combination of a disposition of the mechanical link, the CTE of the mechanical link, a disposition of the optical fiber, and the CTE of the optical fiber is configured to cause the magnitude of thermal expansion of the mechanical link in the direction to be similar to the magnitude of thermal expansion of the optical fiber in the direction.

2. An apparatus for measuring pressure, comprising:
a casing, wherein the casing is a deformable component with an internal volume that is separated from another volume external to the casing;
an optical fiber disposed in the internal volume of the casing; and
a mechanical link disposed in the internal volume of the casing and coupled between the optical fiber and the deformable component, such that a deformation of the deformable component due to a pressure differential between the internal volume of the casing and the other volume is configured to cause a motion of at least a portion of the mechanical link and a strain in a portion of the optical fiber, wherein the mechanical link comprises a bend, wherein the mechanical link has a first end coupled to a first portion of the casing and a second end coupled to a second portion of the casing.

3. The apparatus of claim 2, wherein the casing has an oval-shaped cross-section.

4. The apparatus of claim 2, wherein opposing sides of the casing are connected together by hinge areas configured to flex as the opposing sides move toward or away from one another due to the pressure differential.

5. The apparatus of claim 1, wherein the deformable component comprises a diaphragm attached to the casing.

6. The apparatus of claim 5, wherein one side of the diaphragm is exposed to the environment external to the casing.

7. The apparatus of claim 5, wherein the diaphragm is internal to the casing and the other volume is in fluid communication with the environment external to the casing via an opening in the casing.

8. The apparatus of claim 5, wherein the diaphragm is configured to move transversally with relation to a longitudinal axis of the casing due to changes in the pressure differential.

9. The apparatus of claim 1, wherein the deformable component comprises a piston disposed within the casing and configured to move along a longitudinal axis of the casing due to changes in the pressure differential.

10. The apparatus of claim 1, wherein the optical fiber has a grating disposed in the portion of the optical fiber and wherein the strain in the portion of the optical fiber is configured to impose a change in a frequency range of the grating.

11. The apparatus of claim 1, wherein:
the first motion of the first portion of the mechanical link is configured to cause a second motion of a second portion of the mechanical link; and
the optical fiber is attached to the mechanical link such that the second motion of the second portion of the mechanical link is configured to cause the strain in the portion of the optical fiber.

12. A system for sensing pressure, comprising:
the apparatus of claim 1;
an optical source configured to inject an optical interrogation signal into the optical fiber, wherein the optical fiber has a grating disposed in the portion of the optical fiber; and
a sensing element configured to sense a response of the grating to the optical interrogation signal.

13. The apparatus of claim 2, wherein the first end of the mechanical link is coupled to one side of the casing and wherein the second end of the mechanical link is coupled to an opposite side of the casing.

14. The apparatus of claim 2, wherein the mechanical link is disposed transverse to a longitudinal axis of the casing.

15. The apparatus of claim 14, wherein a portion of the optical fiber is disposed transverse to the longitudinal axis of the casing and is coupled to at least one point on the mechanical link.

16. An apparatus for measuring pressure, comprising:
a casing, wherein the casing is a deformable component with an internal volume that is separated from another volume external to the casing;
an optical fiber disposed in the internal volume of the casing; and
a mechanical link disposed in the internal volume of the casing and coupled between the optical fiber and the deformable component, such that a deformation of the deformable component due to a pressure differential between the internal volume of the casing and the other volume is configured to cause a motion of at least a portion of the mechanical link and a strain in a portion of the optical fiber, wherein the mechanical link is a unitary component comprising two arms with a bend disposed between the two arms.

17. The apparatus of claim 16, wherein the casing has an oval-shaped cross-section.

18. The apparatus of claim 16, wherein opposing sides of the casing are connected together by hinge areas configured to flex as the opposing sides move toward or away from one another due to the pressure differential.

19. The apparatus of claim 16, wherein the mechanical link is disposed transverse to a longitudinal axis of the casing.

20. The apparatus of claim 19, wherein a portion of the optical fiber is disposed transverse to the longitudinal axis of the casing and is coupled to at least one point on the mechanical link.

* * * * *